(12) United States Patent
Sala

(10) Patent No.: US 11,364,462 B2
(45) Date of Patent: Jun. 21, 2022

(54) FILTER ASSEMBLY

(71) Applicant: Donaldson Company, Inc., Minneapolis, MN (US)

(72) Inventor: Mark A. Sala, Lino Lakes, MN (US)

(73) Assignee: Donaldson Company, Inc., Minneapolis, MN (US)

(*) Notice: Subject to any disclaimer, the term of this patent is extended or adjusted under 35 U.S.C. 154(b) by 0 days.

(21) Appl. No.: 16/650,338

(22) PCT Filed: Sep. 25, 2018

(86) PCT No.: PCT/US2018/052691
§ 371 (c)(1),
(2) Date: Mar. 24, 2020

(87) PCT Pub. No.: WO2019/060904
PCT Pub. Date: Mar. 8, 2019

(65) Prior Publication Data
US 2021/0205752 A1 Jul. 8, 2021

Related U.S. Application Data

(60) Provisional application No. 62/562,917, filed on Sep. 25, 2017.

(51) Int. Cl.
*B01D 46/52* (2006.01)
(52) U.S. Cl.
CPC ......... *B01D 46/526* (2013.01); *B01D 46/527* (2013.01); *B01D 2275/206* (2013.01)
(58) Field of Classification Search
CPC ............... B01D 46/525–527; B01D 2275/206
See application file for complete search history.

(56) References Cited

U.S. PATENT DOCUMENTS 2,556,521 A 6/1951 Chase
2,683,537 A 7/1954 Dobrolet
(Continued)

FOREIGN PATENT DOCUMENTS

CN 101039734 9/2007
CN 102039072 5/2011
(Continued)

OTHER PUBLICATIONS

International Patent Application No. PCT/US2018/052691 filed Sep. 25, 2018, PCT International Preliminary Report on Patentability dated Mar. 31, 2020, 10 pages.
(Continued)

*Primary Examiner* — Robert Clemente
(74) *Attorney, Agent, or Firm* — Mueting Raasch Group

(57) ABSTRACT

The technology disclosed herein generally relates to fluted filter assemblies, where flutes formed in the filter media extend from a first flow face of the filter assembly to a second flow face of the filter assembly, where one flow face is an inlet and one flow face is the outlet. Some embodiments relate to first flute distance between the first flow face and the second flow face differing from a second flute distance between the first flow face and the second flow face by greater than 2 mm. In some embodiments at least one of the first flow face and the second flow face is non-planar, while in other embodiments at both of the first flow face and the second flow face are planar and non-parallel. Other embodiments are described.

23 Claims, 25 Drawing Sheets

(56) References Cited

U.S. PATENT DOCUMENTS

| | | | |
|---|---|---|---|
| 2,862,624 A | 12/1958 | Stokes | |
| 2,936,855 A | 5/1960 | Allen et al. | |
| 2,980,208 A | 4/1961 | Neumann | |
| 3,058,594 A | 10/1962 | Hultgren | |
| 3,124,441 A | 3/1964 | Rivers | |
| 3,265,550 A | 8/1966 | Lindqvist | |
| 3,386,232 A | 6/1968 | Gaines, Jr. | |
| 3,401,803 A | 9/1968 | Bub | |
| 3,410,062 A | 11/1968 | Hart | |
| 3,440,807 A | 4/1969 | Gaines, Jr. | |
| 3,531,920 A | 10/1970 | Hart | |
| 3,640,396 A | 2/1972 | Brownell | |
| 3,937,663 A | 2/1976 | Bessiere | |
| 3,966,646 A | 6/1976 | Noakes et al. | |
| 4,012,932 A | 3/1977 | Gewiss | |
| 4,430,223 A | 2/1984 | Miyakawa et al. | |
| 4,640,779 A | 2/1987 | Taki et al. | |
| 4,673,503 A | 6/1987 | Fujimoto | |
| 4,734,195 A | 3/1988 | Lhuillier et al. | |
| 4,925,561 A | 5/1990 | Ishii et al. | |
| 5,128,039 A | 7/1992 | Gabrielson | |
| 5,230,455 A | 7/1993 | Price | |
| 5,306,321 A | 4/1994 | Osendorf | |
| 5,389,175 A | 2/1995 | Wenz | |
| 5,522,909 A | 6/1996 | Haggard | |
| 5,622,583 A | 4/1997 | Ernst et al. | |
| 5,772,883 A | 6/1998 | Rothman et al. | |
| 5,804,073 A | 9/1998 | Ter Horst | |
| 5,897,776 A | 4/1999 | Mallabone | |
| 5,902,365 A | 5/1999 | Haggard | |
| 6,273,938 B1 | 8/2001 | Fanselow et al. | |
| 6,312,489 B1 | 11/2001 | Ernst et al. | |
| 6,641,637 B2 | 11/2003 | Kallsen et al. | |
| 6,776,814 B2 | 8/2004 | Badeau et al. | |
| 6,790,397 B2 | 9/2004 | Richerson et al. | |
| 6,824,581 B1 | 11/2004 | Tate et al. | |
| 7,056,271 B2 | 6/2006 | Schloer et al. | |
| 7,314,558 B1 | 1/2008 | Jaroszczyk et al. | |
| 7,625,419 B2 | 12/2009 | Nelson et al. | |
| 7,637,976 B2 | 12/2009 | Dirnberger et al. | |
| 7,645,312 B2 | 1/2010 | Hamlin et al. | |
| 7,648,546 B2 | 1/2010 | Haberkamp et al. | |
| 7,704,292 B2 | 4/2010 | Hu | |
| 7,959,702 B2 | 6/2011 | Rocklitz et al. | |
| 8,328,022 B2 | 12/2012 | Mbadinga-Mouanda et al. | |
| 8,397,920 B2 | 3/2013 | Moy et al. | |
| 8,448,980 B1 | 5/2013 | Kalisz | |
| 8,479,924 B2 | 7/2013 | Mbadinga-Mouanda et al. | |
| 8,491,691 B2 | 7/2013 | Raether | |
| 8,545,589 B2 | 10/2013 | Rocklitz et al. | |
| 8,608,819 B2 | 12/2013 | Patel et al. | |
| 8,746,462 B2 | 6/2014 | Mbadinga-Mouanda et al. | |
| 8,888,885 B2 | 11/2014 | Barreteau et al. | |
| 9,233,332 B2 | 1/2016 | Caliendo et al. | |
| 9,242,199 B2 | 1/2016 | Nelson et al. | |
| 9,415,337 B2 | 8/2016 | Hasenfratz et al. | |
| 9,498,744 B2 | 11/2016 | Hasenfratz et al. | |
| 9,504,950 B2 | 11/2016 | Holzmann et al. | |
| 9,623,362 B2 | 4/2017 | Brown | |
| 10,337,471 B2 | 7/2019 | Kaufmann et al. | |
| 10,384,158 B2 | 8/2019 | Pflueger et al. | |
| 2002/0090324 A1 | 7/2002 | Badeau et al. | |
| 2005/0144916 A1 | 7/2005 | Adamek et al. | |
| 2006/0086075 A1 | 4/2006 | Scott et al. | |
| 2006/0272305 A1* | 12/2006 | Morgan | B01D 25/001 55/521 |
| 2007/0157589 A1 | 7/2007 | Haberkamp et al. | |
| 2007/0270095 A1 | 11/2007 | Shimoyama et al. | |
| 2008/0276582 A1* | 11/2008 | Boehrs | B01D 46/526 55/497 |
| 2008/0282890 A1 | 11/2008 | Rocklitz et al. | |
| 2009/0038276 A1 | 2/2009 | Gunderson et al. | |
| 2010/0011725 A1 | 1/2010 | Babb | |
| 2010/0043366 A1 | 2/2010 | Boehrs et al. | |
| 2010/0326396 A1 | 12/2010 | Patel et al. | |
| 2011/0113736 A1 | 5/2011 | Raether et al. | |
| 2011/0186504 A1 | 8/2011 | Rocklitz | |
| 2012/0031060 A1 | 2/2012 | Iddings et al. | |
| 2013/0062276 A1 | 3/2013 | Barreteau et al. | |
| 2014/0223868 A1 | 8/2014 | Kaufmann et al. | |
| 2014/0325946 A1 | 11/2014 | Rocklitz et al. | |
| 2015/0007535 A1 | 1/2015 | Hasenfratz et al. | |
| 2015/0007732 A1 | 1/2015 | Hasenfratz et al. | |
| 2015/0013542 A1* | 1/2015 | Hasenfratz | B01D 46/10 96/134 |
| 2016/0131094 A1 | 5/2016 | Pereira Madeira et al. | |
| 2016/0214052 A1 | 7/2016 | Moser et al. | |
| 2016/0263513 A1 | 9/2016 | Pflueger et al. | |
| 2017/0028339 A1 | 2/2017 | Savstrom | |
| 2017/0096971 A1 | 4/2017 | Kaufmann et al. | |
| 2017/0096972 A1 | 4/2017 | Kaufmann et al. | |
| 2017/0096973 A1 | 4/2017 | Kaufmann et al. | |
| 2017/0246571 A1 | 8/2017 | Nelson et al. | |
| 2017/0304760 A1 | 10/2017 | Kaufmann et al. | |
| 2018/0008923 A1 | 1/2018 | Burton et al. | |
| 2018/0290153 A1 | 10/2018 | Bannister et al. | |
| 2019/0374897 A1 | 12/2019 | Adamek et al. | |
| 2020/0306682 A1 | 10/2020 | Campbell et al. | |

FOREIGN PATENT DOCUMENTS

| | | |
|---|---|---|
| CN | 102743930 | 10/2012 |
| CN | 102762270 | 10/2012 |
| CN | 104039422 | 9/2014 |
| CN | 102612398 | 1/2015 |
| CN | 102612397 | 8/2015 |
| CN | 105381650 | 3/2016 |
| DE | 42 23 723 | 1/1994 |
| DE | 200 05 756 | 8/2000 |
| DE | 10128937 | 1/2003 |
| DE | 10-2004025274 | 12/2004 |
| DE | 10-2014015907 | 5/2015 |
| DE | 20-2014004897 | 9/2015 |
| DE | 10-2014008699 | 12/2015 |
| DE | 10-2015013370 | 4/2016 |
| DE | 10-2015006383 | 11/2016 |
| DE | 10-2016002248 | 12/2016 |
| DE | 10-2014008699 | 5/2018 |
| EP | 0 058 994 | 9/1982 |
| EP | 0 206 182 | 3/1990 |
| EP | 1 197 254 | 4/2002 |
| EP | 1 681 087 | 7/2006 |
| EP | 1 256 369 | 10/2007 |
| EP | 2 042 359 | 4/2009 |
| EP | 2 217 350 | 10/2012 |
| EP | 2 475 449 | 11/2013 |
| EP | 2 477 718 | 3/2014 |
| EP | 2 475 450 | 8/2016 |
| FR | 2 791 579 | 10/2000 |
| GB | 2 098 317 | 11/1982 |
| JP | S60-112320 | 7/1985 |
| JP | H6-079836 | 10/1994 |
| JP | 5898075 | 4/2016 |
| RU | 2 548 413 | 4/2015 |
| WO | 00/40319 | 7/2000 |
| WO | 2005/037408 | 4/2005 |
| WO | 2005/058461 | 6/2005 |
| WO | 2008/106375 | 9/2008 |
| WO | 2008/111923 | 9/2008 |
| WO | 2009/003119 | 12/2008 |
| WO | 2009/071636 | 6/2009 |
| WO | 2010/017407 | 2/2010 |
| WO | 2014/059014 | 4/2014 |
| WO | 2015/157408 | 10/2015 |
| WO | 2016/014549 | 1/2016 |
| WO | 2017/133796 | 8/2017 |
| WO | 2018/111923 | 6/2018 |
| WO | 2019/060904 | 3/2019 |

(56) References Cited

FOREIGN PATENT DOCUMENTS

| WO | 2019/241284 | 12/2019 |
|----|-------------|---------|
| WO | 2020/198702 | 10/2020 |

OTHER PUBLICATIONS

International Patent Application No. PCT/US2018/052691 filed Sep. 25, 2018, PCT International Search Report and Written Opinion dated Mar. 22, 2019, 16 pages.

International Patent Application No. PCT/US2018/052691 filed Sep. 25, 2018, PCT Invitation to Pay Additional Fees dated Jan. 30, 2019, 10 pages.

International Application No. PCT/US2020/025524, filed Mar. 27, 2020, PCT International Search Report and Written Opinion, dated Jun. 2, 2020, 11 pages.

News Release, "VarioPleat revolutionizes air filter elements—R&D project from MANN+HUMMEL", Sep. 10, 2013, MANN+HUMMEL, Ludwigsburg, Germany, 2 pages. Obtained from the internet on Sep. 27, 2013.

U.S. Appl. No. 62/683,542, first-named inventor Daniel E. Adamek, entitled "Filter Media, Filter Media Packs, and Filter Elements", filed Jun. 11, 2018, 86 pages.

\* cited by examiner

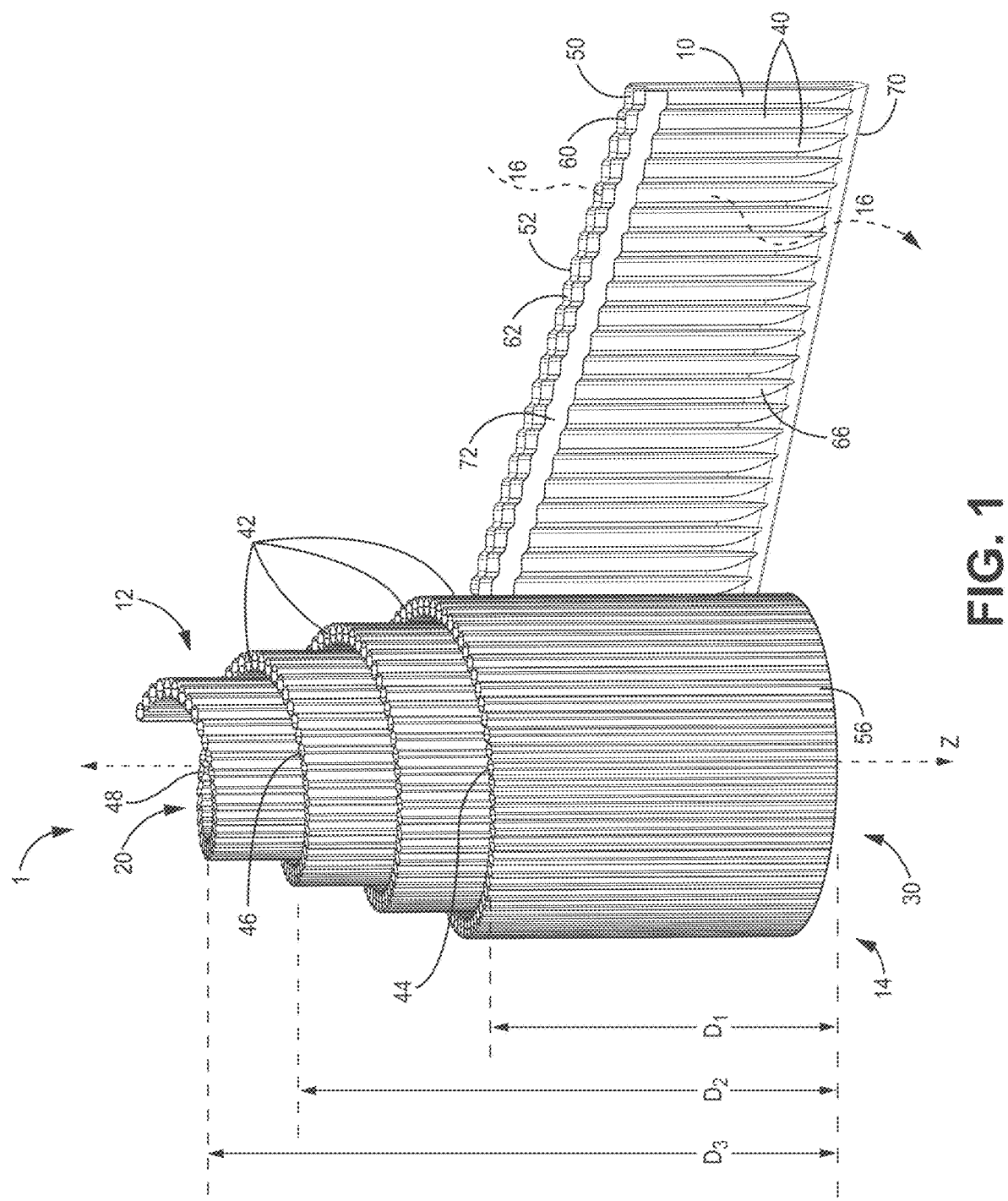

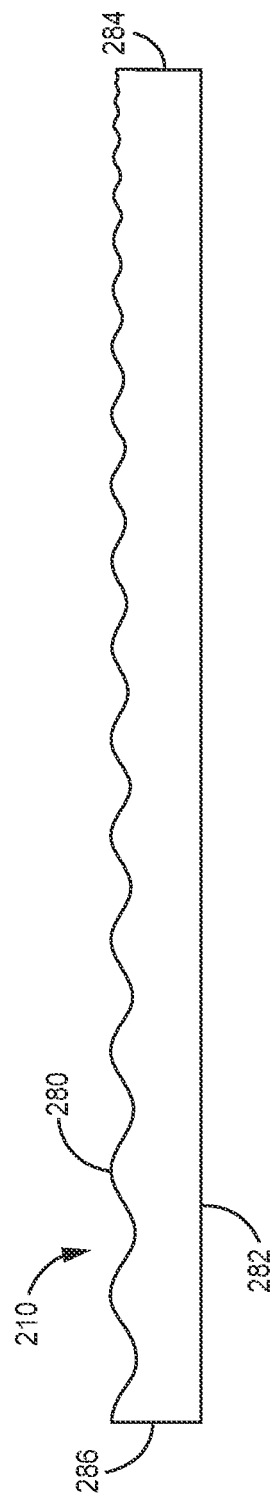

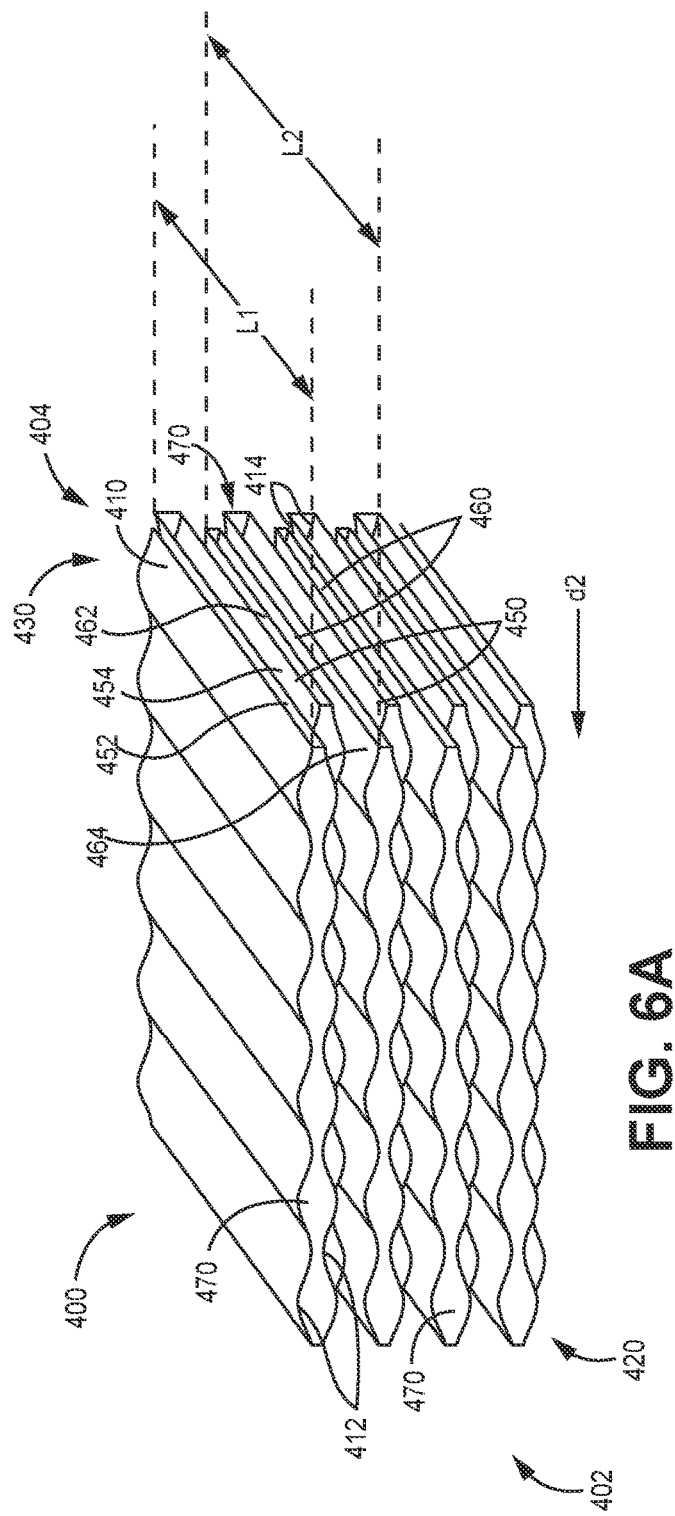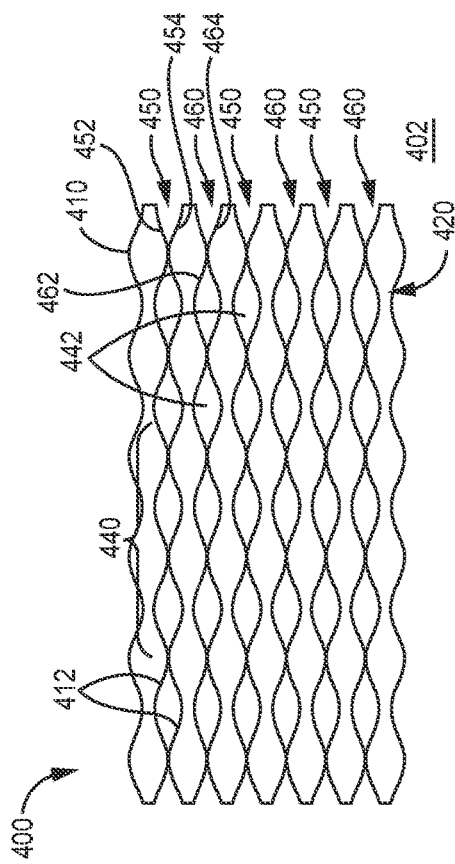

FILTER ASSEMBLY

This application is a U.S. national stage under 35 U.S.C. 371 claiming priority to PCT Application No. PCT/US2018/052691, filed Sep. 25, 2018, which claims the benefit of U.S. Provisional Application No. 62/562,917, filed Sep. 25, 2017, the disclosure of which is incorporated by reference herein in its entirety.

FIELD OF THE TECHNOLOGY

The technology disclosed herein generally relates to filters. More particularly, the technology disclosed herein relates to filter assemblies.

BACKGROUND

Fluid streams, such as air and liquid, carry contaminant material therein. In many instances, it is desired to filter some or all of the contaminant material from the fluid stream. For example, air streams to engines for motorized vehicles or for power generation equipment, air and gas streams to gas turbine systems, air and gas streams to various combustion furnaces, and air and gas streams to heat exchangers (e.g., heating and air conditioning) carry particulate contaminants that should often be filtered. Liquid streams in engine lube systems, hydraulic systems, coolant systems, and fuel systems can also carry contaminants that should be filtered. It is preferred for such systems that selected contaminant material be removed from (or have its level reduced in) the fluid. A variety of fluid filters (gas or liquid filters) have been developed for contaminant reduction. In general, however, continued improvements are sought.

SUMMARY

In some embodiments, the technology disclosed herein is directed to a filter assembly having filter media defining a coiled configuration about a z-axis. The filter media defines a first flow face, a second flow face and a plurality of flutes extending from the first flow face to the second flow face. Each of the plurality of flutes defines a flute opening and a flute closure. The plurality of flutes has a first flute defining a first flute distance between the first flow face and the second flow face and a second flute defining a second flute distance between the first flow face and the second flow face, where the first flute distance differs from the second flute distance by greater than 2 mm.

In some embodiments the second flow face is non-parallel to the first flow face. Additionally or alternatively, the first flow face is non-planar and the second flow face is planar. Additionally or alternatively, the first flow face in non-planar and the second flow face is non-planar. Additionally or alternatively, one of the first flow face and the second flow face is recessed. Additionally or alternatively, one of the first flow face and the second flow face protrudes outward.

Additionally or alternatively, the filter assembly has a first sheet of filter media and a second sheet of filter media adjacent to the first sheet of filter media, where the first sheet and the second sheet defines a coiled configuration about the z-axis and the first sheet and the second sheet mutually define the plurality of flutes. Additionally or alternatively, the first sheet and the second sheet are discontinuous. Additionally or alternatively, the first sheet and the second sheet are continuous and separated by a fold that defines the second flow face. Additionally or alternatively, the first sheet of filter media has a first width defined by the first flow face and the second flow face and the second sheet of filter media has a second width defined by the first flow face and the second flow face and the first width differs from the second width by greater than 2 mm. Additionally or alternatively, the first sheet of filter media is a fluted sheet and the second sheet of filter media is a facing sheet.

Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm.

In some embodiments the technology disclosed herein is related to a panel filter assembly having a plurality of sheets of filter media in a stacked configuration mutually defining a first flow face, a second flow face, and a plurality of flutes extending from the first flow face to the second flow face. The plurality of sheets of filter media defines a regularly alternating pattern of first flute layers and second flute layers, where each of the first layers defines a first layer distance between the first flow face and the second flow face and each of the second layers defines a second layer distance between the first flow face and the second flow face. The first layer distance and the second layer distance differ by greater than 2 mm.

In various embodiments, each of the plurality of flutes defines a flute opening and a flute closure. Additionally or alternatively, each of the first layers and second layers is defined by a fluted sheet and an adjacent facing sheet. Additionally or alternatively, each fluted sheet and facing sheet in each flute layer defines substantially equal distances between the first flow face and the second flow face. Additionally or alternatively, each fluted sheet and facing sheet in at least one flute layer defines distances between the first flow face and the second flow face that differ by greater than 2 mm. Additionally or alternatively, each of the first layers and second layers is defined by two adjacent fluted sheets of filter media. Additionally or alternatively, the plurality of sheets of filter media are discontinuous. Additionally or alternatively, the plurality of sheets of filter media are continuous and separated by a first set of folds forming the first flow face and a second set of folds forming the second flow face.

Additionally or alternatively, the plurality of sheets of filter media further defines a regularly alternating pattern of third flute layers, where each third flute layer has a third layer distance between the first flow face and the second flow face, wherein the third layer distance differs from the first layer distance and the second layer distance by greater than 2 mm. Additionally or alternatively, the plurality of sheets of filter media further defines a regularly alternating pattern of fourth flute layers, where each fourth flute layer has a fourth layer distance between the first flow face and the second flow face, wherein the fourth layer distance differs from the first layer distance, the second layer distance, and the third layer distance by greater than 2 mm.

Additionally or alternatively, the second flow face is planar. Additionally or alternatively, the first flow face and the second flow face are non-planar. Additionally or alternatively, one of the first flow face and the second flow face is recessed. Additionally or alternatively, one of the first flow face and the second flow face protrudes outward. Additionally or alternatively, the first layer distance differs from the second layer distance by at least 5 mm. Additionally or alternatively, the first layer distance differs from the second layer distance by 3 mm to 20 mm. Additionally or alternatively, the first layer distance differs from the second layer distance by at least 8 mm. Additionally or alternatively, the first layer distance differs from the second layer distance by at least 14 mm.

In some embodiments the technology disclosed herein relates to a filter assembly having a first sheet of filter media and a second sheet of filter media mutually defining a first plurality of flutes, a first flow face, and a second flow face. Each of the first plurality of flutes extends from the first flow face to the second flow face and each of the first plurality of flutes defines a flute opening at the first flow face and a flute closure towards the second flow face. At least one of the first flow face and the second flow face is non-planar.

In some such embodiments, the first sheet is a fluted sheet of filter media and the second sheet is a facing sheet of filter media. Alternatively, both the first sheet and the second sheet are fluted sheets of filter media. Additionally or alternatively, the flute closure is adjacent to the second flow face. Additionally or alternatively, one of the first flow face and the second flow face is recessed. Additionally or alternatively, one of the first flow face and the second flow face protrudes outward.

Additionally or alternatively, the filter assembly has a third sheet of filter media, where the third sheet of filter media and the second sheet of filter media mutually define a second plurality of flutes, the first flow face, and the second flow face. Each of the second plurality of flutes extends from the first flow face to the second flow face and each of the second plurality of flutes defines a flute opening at the second flow face and a flute closure towards the first flow face. Additionally or alternatively, the first plurality of flutes has a first flute that defines a first flute distance between the first flow face and the second flow face and a second flute defining a second flute distance between the first flow face and the second flow face. The second plurality of flutes has a third flute defining a third flute distance between the first flow face and the second flow face, and each of the first flute distance, second flute distance, and third flute distance differ by greater than 2 mm.

Additionally or alternatively, the filter assembly is a panel filter. Additionally or alternatively, the first sheet of filter media and the second sheet of filter media define a coiled configuration about a z-axis. Additionally or alternatively, the first sheet of filter media and the second sheet of filter media are continuous and separated by a fold that defines the second flow face. Additionally or alternatively, a first flute of the first plurality of flutes defines a first flute distance between the first flow face and the second flow face and a second flute of the first plurality of flutes defines a second flute distance between the first flow face and the second flow face, and the first flute distance differs from the second flute distance by greater than 2 mm.

Additionally or alternatively, the first flow face and the second flow face are both non-planar. Additionally or alternatively, one of the first flow face and the second flow face is recessed. Additionally or alternatively, one of the first flow face and the second flow face protrudes outward. Additionally or alternatively, the first sheet and the second sheet are discontinuous. Additionally or alternatively, the first flow face is opposite the second flow face relative to the filter assembly. Additionally or alternatively, the plurality of flutes are parallel.

In some embodiments, the technology disclosed herein relates to filter assembly having a first sheet of filter media and a second sheet of filter media mutually defining a first plurality of flutes, a first flow face on a first end of the filter assembly, and a second flow face on an opposite, second end of the filter assembly. Each of the first plurality of flutes defines a distance from the first flow face to the second flow face and each of the first plurality of flutes defines a flute opening at the first flow face and a flute closure towards the second flow face. A first flute of the first plurality of flutes defines a first flute distance and a second flute of the first plurality of flutes defines a second flute distance, where the first flute distance and the second flute distance differ by greater than 2 mm.

In some such embodiments the first sheet of filter media and the second sheet of filter media are discontinuous, while in other embodiments the first sheet of filter media and the second sheet of filter media are continuous and separated by a fold. Additionally or alternatively, the flute closure is adjacent to the second flow face.

Additionally or alternatively, the filter assembly has a third sheet of filter media, wherein the third sheet of filter media and the second sheet of filter media mutually define a second plurality of flutes, the first flow face, and the second flow face. Each of the second plurality of flutes extend from the first flow face to the second flow face and each of the second plurality of flutes defines a flute opening at the second flow face and a flute closure towards the first flow face. Additionally or alternatively, the second plurality of flutes has a third flute defining a third flute distance from the first flow face to the second flow face, where the third flute distance differs from the first flute distance and the second flute distance by greater than 2 mm.

Additionally or alternatively, the first plurality of flutes has a third flute defining a third flute distance, wherein the third flute distance differs from the first flute distance and the second flute distance by greater than 2 mm. Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm.

Additionally or alternatively, the first flow face and the second flow face are non-parallel. Additionally or alternatively, at least one of the first flow face and the second flow face is non-planar. Additionally or alternatively, one of the first flow face and the second flow face is recessed. Additionally or alternatively, one of the first flow face and the second flow face protrudes outward. Additionally or alternatively, at least one of the first flow face and the second flow face is planar. Additionally or alternatively, the first flow face and the second flow face are both non-planar. Additionally or alternatively, the first sheet is a fluted sheet of filter media and the second sheet is a facing sheet of filter media. Additionally or alternatively, both the first sheet and the second sheet are fluted sheets of filter media.

In some embodiments the technology disclosed herein is directed to a panel filter assembly having a plurality of stacked sheets of filter media each having a width extending in a direction parallel to an x-axis and a length extending in a direction parallel to a z-axis. The plurality of sheets of filter media are stacked in a direction parallel to a y-axis. The plurality of sheets of filter media define a plurality of flutes, a first flow face, and a second flow face and each of the plurality of flutes defines a flute opening at the first flow face and a flute closure towards the second flow face. A first flute of the plurality of flutes defines a first flute distance between the first flow face and the second flow face, a second flute of the plurality of flutes defines a second flute distance between the first flow face and the second flow face, and a third flute of the plurality of flutes defines a third flute distance between the first flow face and the second flow face, where the second flute is adjacent the first flute in an x-axis direction, and the third flute is positioned relative to the first flute in a y-axis direction. The first flute distance differs from the second flute distance by greater than 2 mm and the first flute distance differs from the third flute distance by greater than 2 mm.

In some such embodiments the plurality of stacked sheets of filter media are discontinuous. Additionally or alternatively, the plurality of stacked sheets of filter media are continuous and separated by folds. Additionally or alternatively, the first flute distance, the second flute distance, and the third flute distance differ by greater than 2 mm. Additionally or alternatively, at least one of the first flow face and the second flow face is non-planar. Additionally or alternatively, the first flow face and the second flow face are both non-planar. Additionally or alternatively, one of the first flow face and the second flow face is recessed. Additionally or alternatively, one of the first flow face and the second flow face protrudes outward. Additionally or alternatively, the first flow face and the second flow face are non-parallel.

Additionally or alternatively, the first flute distance differs from the second flute distance and the third flute distance by at least 5 mm. Additionally or alternatively, the first flute distance differs from the second flute distance and the third flute distance by 3 mm to 20 mm. Additionally or alternatively, the first flute distance differs from the second flute distance and the third flute distance by at least 8 mm. Additionally or alternatively, the first flute distance differs from the second flute distance and the third flute distance by at least 15 mm. Additionally or alternatively, the plurality of stacked sheets of filter media has alternating fluted sheets of filter media and facing sheets of filter media. Additionally or alternatively, each of the plurality of stacked sheets of filter media are fluted sheets of filter media.

Some embodiments are directed to a filter assembly having filter media defining a plurality of flutes, a first edge defining a first flow face, and a second flow face opposite the first flow face relative to the filter assembly. Each of the plurality of flutes defines a flute opening at the first flow face and a flute closure towards the second flow face. The plurality of flutes has at least one flute defining a flute opening that is non-planar.

In some such embodiments the filter media is a plurality of sheets of filter media in a stacked configuration. Additionally or alternatively, the plurality of sheets of filter media has alternating fluted sheets of filter media and facing sheets of filter media. Additionally or alternatively, the plurality of sheets of filter media are fluted sheets of filter media. Additionally or alternatively, the filter media has a first sheet of filter media and a second sheet of filter media in a coiled configuration about a z-axis. Additionally or alternatively, the first sheet of filter media is a fluted sheet and the second sheet of filter media is a facing sheet. Additionally or alternatively, the filter assembly is a panel filter.

Additionally or alternatively, the first flute of the plurality of flutes defines a first flute distance between the first flow face and the second flow face and a second flute of the plurality of flutes defines a second flute distance between the first flow face and the second flow face, and the first flute distance differs from the second flute distance by greater than 2 mm. Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm. Additionally or alternatively, the first flow face and the second flow face are both non-planar. Additionally or alternatively, one of the first flow face and the second flow face is recessed. Additionally or alternatively, one of the first flow face and the second flow face protrudes outward. Additionally or alternatively, the flute closure is adjacent the second flow face.

Some embodiments of the technology disclosed herein is directed to a filter assembly having a first sheet of filter media and a second sheet of filter media mutually defining a first plurality of flutes, a first flow face, and a second flow face. Each of the first plurality of flutes extends from the first flow face to the second flow face. Each of the first plurality of flutes defines a flute opening at the first flow face and a flute closure towards the second flow face. The first flow face and the second flow face are planar, and the first flow face is non-parallel to the second flow face.

In some such embodiments, the first sheet is a fluted sheet of filter media and the second sheet is a facing sheet of filter media. Additionally or alternatively, both the first sheet and the second sheet are fluted sheets of filter media. Additionally or alternatively, the flute closure is adjacent to the second flow face.

Additionally or alternatively, the filter assembly has a third sheet of filter media, wherein the third sheet of filter media and the second sheet of filter media mutually define a second plurality of flutes, the first flow face, and the second flow face, where each of the second plurality of flutes extends from the first flow face to the second flow face. Each of the second plurality of flutes defines a flute opening at the second flow face and a flute closure towards the first flow face. Additionally or alternatively, the first plurality of flutes has a first flute defining a first flute distance between the first flow face and the second flow face and a second flute defining a second flute distance between the first flow face and the second flow face. The second plurality of flutes has a third flute defining a third flute distance between the first flow face and the second flow face, and each of the first flute distance, second flute distance, and third flute distance differ by greater than 2 mm.

Additionally or alternatively, the filter assembly is a panel filter. Additionally or alternatively, the first sheet of filter media and the second sheet of filter media define a coiled configuration about a z-axis. Additionally or alternatively, a first flute of the first plurality of flutes defines a first flute distance between the first flow face and the second flow face and a second flute of the first plurality of flutes defines a second flute distance between the first flow face and the second flow face, and the first flute distance differs from the second flute distance by greater than 2 mm. Additionally or alternatively, the first sheet and the second sheet are discontinuous. Additionally or alternatively, the first sheet and the second sheet are continuous and separated by a fold. Additionally or alternatively, the first flow face is opposite the second flow face relative to the filter assembly. Additionally or alternatively, the first plurality of flutes are parallel.

BRIEF DESCRIPTION OF THE DRAWINGS

FIG. 1 is a perspective view of an example filter assembly consistent with the technology disclosed herein.

FIG. 2b is a detail view A' of FIG. 2a.

FIG. 4d is an example filter media consistent with some embodiments.

FIG. 6a is a perspective view of another example filter assembly consistent with the technology disclosed herein.

FIG. 6b is a facing view of a first face of the filter assembly of FIG. 6a.

Figure 2A:
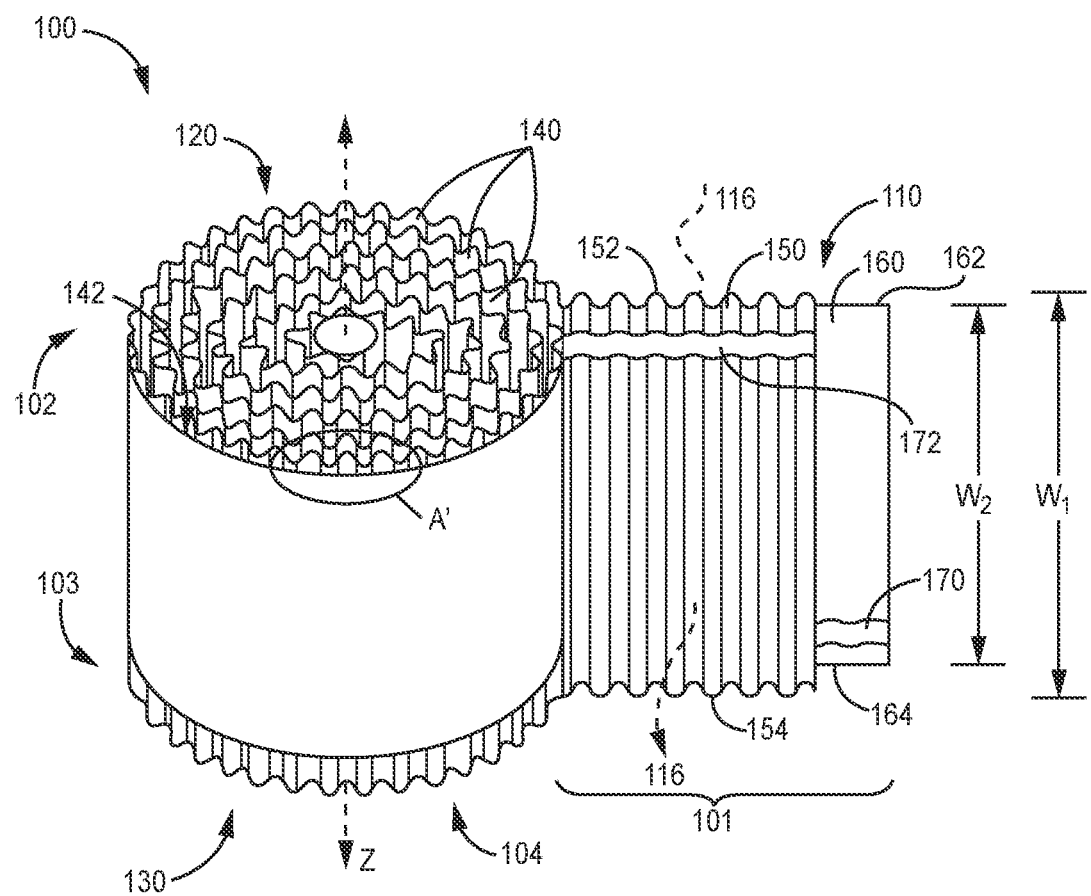
FIG. 2a is a perspective view of another example filter assembly consistent with the technology disclosed herein.

The current technology may be more completely understood and appreciated in consideration of the following detailed description of various embodiments of the current technology in connection with the accompanying drawings.

DETAILED DESCRIPTION

The technology disclosed herein generally relates to fluted filter assemblies, where flutes formed in the filter media extend from a first flow face of the filter assembly to a second flow face of the filter assembly, where one flow face is an inlet and one flow face is the outlet. Some embodiments disclosed herein can increase the amount of filter media that can be accommodated in a particular space of a larger system, which can improve efficiency, filter life, and pressure drop, as examples. Some embodiments disclosed herein can improve fluid flow through the filter assembly, such as increasing fluid flow into the filter assembly. Some embodiments disclosed herein can reduce particulate "caking" over the flow face that forms the inlet of the filter assembly, which can improve fluid flow into the filter assembly over the life of the filter assembly. Other advantages will also be realized by the current technology.

In some embodiments, the technology disclosed herein is directed to a filter assembly having filter media defining a coiled configuration about a z-axis. The filter media defines a first flow face, a second flow face and a plurality of flutes extending from the first flow face to the second flow face. Each of the plurality of flutes defines a flute opening and a flute closure. The plurality of flutes has a first flute defining a first flute distance between the first flow face and the second flow face and a second flute defining a second flute distance between the first flow face and the second flow face, where the first flute distance differs from the second flute distance by greater than 2 mm.

In some embodiments the second flow face is non-parallel to the first flow face. Additionally or alternatively, the first flow face is non-planar and the second flow face is planar. Additionally or alternatively, the first flow face in non-planar and the second flow face is non-planar. Additionally or alternatively, one of the first flow face and the second flow face is recessed. Additionally or alternatively, one of the first flow face and the second flow face protrudes outward.

Additionally or alternatively, the filter assembly has a first sheet of filter media and a second sheet of filter media adjacent to the first sheet of filter media, where the first sheet and the second sheet defines a coiled configuration about the z-axis and the first sheet and the second sheet mutually define the plurality of flutes. Additionally or alternatively, the first sheet and the second sheet are discontinuous. Additionally or alternatively, the first sheet and the second sheet are continuous and separated by a fold that defines the second flow face. Additionally or alternatively, the first sheet of filter media has a first width defined by the first flow face and the second flow face and the second sheet of filter media has a second width defined by the first flow face and the second flow face and the first width differs from the second width by greater than 2 mm. Additionally or alternatively, the first sheet of filter media is a fluted sheet and the second sheet of filter media is a facing sheet.

Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm.

In some embodiments the technology disclosed herein is related to a panel filter assembly having a plurality of sheets of filter media in a stacked configuration mutually defining a first flow face, a second flow face, and a plurality of flutes extending from the first flow face to the second flow face. The plurality of sheets of filter media defines a regularly alternating pattern of first flute layers and second flute layers, where each of the first layers defines a first layer distance between the first flow face and the second flow face and each of the second layers defines a second layer distance between the first flow face and the second flow face. The first layer distance and the second layer distance differ by greater than 2 mm.

In various embodiments, each of the plurality of flutes defines a flute opening and a flute closure. Additionally or alternatively, each of the first layers and second layers is defined by a fluted sheet and an adjacent facing sheet. Additionally or alternatively, each fluted sheet and facing sheet in each flute layer defines substantially equal distances between the first flow face and the second flow face. Additionally or alternatively, each fluted sheet and facing sheet in at least one flute layer defines distances between the first flow face and the second flow face that differ by greater than 2 mm. Additionally or alternatively, each of the first layers and second layers is defined by two adjacent fluted sheets of filter media. Additionally or alternatively, the plurality of sheets of filter media are discontinuous. Additionally or alternatively, the plurality of sheets of filter media are continuous and separated by a first set of folds forming the first flow face and a second set of folds forming the second flow face.

Additionally or alternatively, the plurality of sheets of filter media further defines a regularly alternating pattern of third flute layers, where each third flute layer has a third layer distance between the first flow face and the second flow face, wherein the third layer distance differs from the first layer distance and the second layer distance by greater than 2 mm. Additionally or alternatively, the plurality of sheets of filter media further defines a regularly alternating pattern of fourth flute layers, where each fourth flute layer has a fourth layer distance between the first flow face and the second flow face, wherein the fourth layer distance differs from the first layer distance, the second layer distance, and the third layer distance by greater than 2 mm.

Additionally or alternatively, the second flow face is planar. Additionally or alternatively, the first flow face and the second flow face are non-planar. Additionally or alternatively, one of the first flow face and the second flow face is recessed. Additionally or alternatively, one of the first flow face and the second flow face protrudes outward. Additionally or alternatively, the first layer distance differs from the second layer distance by at least 5 mm. Additionally or alternatively, the first layer distance differs from the second layer distance by 3 mm to 20 mm. Additionally or alternatively, the first layer distance differs from the second layer distance by at least 8 mm. Additionally or alternatively, the first layer distance differs from the second layer distance by at least 14 mm.

In some embodiments the technology disclosed herein relates to a filter assembly having a first sheet of filter media and a second sheet of filter media mutually defining a first plurality of flutes, a first flow face, and a second flow face. Each of the first plurality of flutes extends from the first flow face to the second flow face and each of the first plurality of flutes defines a flute opening at the first flow face and a flute closure towards the second flow face. At least one of the first flow face and the second flow face is non-planar.

In some such embodiments, the first sheet is a fluted sheet of filter media and the second sheet is a facing sheet of filter media. Alternatively, both the first sheet and the second sheet are fluted sheets of filter media. Additionally or alternatively, the flute closure is adjacent to the second flow face.

Additionally or alternatively, the filter assembly has a third sheet of filter media, where the third sheet of filter media and the second sheet of filter media mutually define a second plurality of flutes, the first flow face, and the second flow face. Each of the second plurality of flutes extends from the first flow face to the second flow face and each of the second plurality of flutes defines a flute opening at the second flow face and a flute closure towards the first flow face. Additionally or alternatively, the first plurality of flutes has a first flute that defines a first flute distance between the first flow face and the second flow face and a second flute defining a second flute distance between the first flow face and the second flow face. The second plurality of flutes has a third flute defining a third flute distance between the first flow face and the second flow face, and each of the first flute distance, second flute distance, and third flute distance differ by greater than 2 mm.

Additionally or alternatively, the filter assembly is a panel filter. Additionally or alternatively, the first sheet of filter media and the second sheet of filter media define a coiled configuration about a z-axis. Additionally or alternatively, the first sheet of filter media and the second sheet of filter media are continuous and separated by a fold that defines the second flow face. Additionally or alternatively, a first flute of the first plurality of flutes defines a first flute distance between the first flow face and the second flow face and a second flute of the first plurality of flutes defines a second flute distance between the first flow face and the second flow face, and the first flute distance differs from the second flute distance by greater than 2 mm.

Additionally or alternatively, the first flow face and the second flow face are both non-planar. Additionally or alternatively, one of the first flow face and the second flow face is recessed. Additionally or alternatively, one of the first flow face and the second flow face protrudes outward. Additionally or alternatively, the first sheet and the second sheet are discontinuous. Additionally or alternatively, the first flow face is opposite the second flow face relative to the filter assembly. Additionally or alternatively, the plurality of flutes are parallel.

In some embodiments, the technology disclosed herein relates to filter assembly having a first sheet of filter media and a second sheet of filter media mutually defining a first plurality of flutes, a first flow face on a first end of the filter assembly, and a second flow face on an opposite, second end of the filter assembly. Each of the first plurality of flutes defines a distance from the first flow face to the second flow face and each of the first plurality of flutes defines a flute opening at the first flow face and a flute closure towards the second flow face. A first flute of the first plurality of flutes defines a first flute distance and a second flute of the first plurality of flutes defines a second flute distance, where the first flute distance and the second flute distance differ by greater than 2 mm.

In some such embodiments the first sheet of filter media and the second sheet of filter media are discontinuous, while in other embodiments the first sheet of filter media and the second sheet of filter media are continuous and separated by a fold. Additionally or alternatively, the flute closure is adjacent to the second flow face.

Additionally or alternatively, the filter assembly has a third sheet of filter media, wherein the third sheet of filter media and the second sheet of filter media mutually define a second plurality of flutes, the first flow face, and the second flow face. Each of the second plurality of flutes extend from the first flow face to the second flow face and each of the second plurality of flutes defines a flute opening at the second flow face and a flute closure towards the first flow face. Additionally or alternatively, the second plurality of flutes has a third flute defining a third flute distance from the first flow face to the second flow face, where the third flute distance differs from the first flute distance and the second flute distance by greater than 2 mm.

Additionally or alternatively, the first plurality of flutes has a third flute defining a third flute distance, wherein the third flute distance differs from the first flute distance and the second flute distance by greater than 2 mm. Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm.

Additionally or alternatively, the first flow face and the second flow face are non-parallel. Additionally or alternatively, at least one of the first flow face and the second flow face is non-planar. Additionally or alternatively, one of the first flow face and the second flow face is recessed. Additionally or alternatively, one of the first flow face and the second flow face protrudes outward. Additionally or alternatively, at least one of the first flow face and the second flow face is planar. Additionally or alternatively, the first flow face and the second flow face are both non-planar. Additionally or alternatively, the first sheet is a fluted sheet of filter media and the second sheet is a facing sheet of filter media. Additionally or alternatively, both the first sheet and the second sheet are fluted sheets of filter media.

In some embodiments the technology disclosed herein is directed to a panel filter assembly having a plurality of stacked sheets of filter media each having a width extending in a direction parallel to an x-axis and a length extending in a direction parallel to a z-axis. The plurality of sheets of filter media are stacked in a direction parallel to a y-axis. The plurality of sheets of filter media define a plurality of flutes, a first flow face, and a second flow face and each of the plurality of flutes defines a flute opening at the first flow face and a flute closure towards the second flow face. A first flute of the plurality of flutes defines a first flute distance between the first flow face and the second flow face, a second flute of the plurality of flutes defines a second flute distance between the first flow face and the second flow face, and a third flute of the plurality of flutes defines a third flute distance between the first flow face and the second flow face, where the second flute is adjacent the first flute in an x-axis direction, and the third flute is positioned relative to the first flute in a y-axis direction. The first flute distance differs from the second flute distance by greater than 2 mm and the first flute distance differs from the third flute distance by greater than 2 mm.

In some such embodiments the plurality of stacked sheets of filter media are discontinuous. Additionally or alternatively, the plurality of stacked sheets of filter media are continuous and separated by folds. Additionally or alternatively, the first flute distance, the second flute distance, and the third flute distance differ by greater than 2 mm. Additionally or alternatively, at least one of the first flow face and the second flow face is non-planar. Additionally or alternatively, one of the first flow face and the second flow face is recessed. Additionally or alternatively, one of the first flow face and the second flow face protrudes outward. Additionally or alternatively, the first flow face and the second flow face are both non-planar. Additionally or alternatively, the first flow face and the second flow face are non-parallel.

Additionally or alternatively, the first flute distance differs from the second flute distance and the third flute distance by at least 5 mm. Additionally or alternatively, the first flute distance differs from the second flute distance and the third flute distance by 3 mm to 20 mm. Additionally or alternatively, the first flute distance differs from the second flute distance and the third flute distance by at least 8 mm. Additionally or alternatively, the first flute distance differs from the second flute distance and the third flute distance by at least 15 mm. Additionally or alternatively, the plurality of stacked sheets of filter media has alternating fluted sheets of filter media and facing sheets of filter media. Additionally or alternatively, each of the plurality of stacked sheets of filter media are fluted sheets of filter media.

Some embodiments are directed to a filter assembly having filter media defining a plurality of flutes, a first edge defining a first flow face, and a second flow face opposite the first flow face relative to the filter assembly. Each of the plurality of flutes defines a flute opening at the first flow face and a flute closure towards the second flow face. The plurality of flutes has at least one flute defining a flute opening that is non-planar.

In some such embodiments the filter media is a plurality of sheets of filter media in a stacked configuration. Additionally or alternatively, the plurality of sheets of filter media has alternating fluted sheets of filter media and facing sheets of filter media. Additionally or alternatively, the plurality of sheets of filter media are fluted sheets of filter media. Additionally or alternatively, the filter media has a first sheet of filter media and a second sheet of filter media in a coiled configuration about a z-axis. Additionally or alternatively, the first sheet of filter media is a fluted sheet and the second sheet of filter media is a facing sheet. Additionally or alternatively, the filter assembly is a panel filter.

Additionally or alternatively, the first flute of the plurality of flutes defines a first flute distance between the first flow face and the second flow face and a second flute of the plurality of flutes defines a second flute distance between the first flow face and the second flow face, and the first flute distance differs from the second flute distance by greater than 2 mm. Additionally or alternatively, the first flute distance differs from the second flute distance by at least 5 mm. Additionally or alternatively, the first flute distance differs from the second flute distance by 3 mm to 20 mm. Additionally or alternatively, the first flute distance differs from the second flute distance by at least 8 mm. Additionally or alternatively, the first flute distance differs from the second flute distance by at least 15 mm. Additionally or alternatively, the first flow face and the second flow face are both non-planar. Additionally or alternatively, one of the first flow face and the second flow face is recessed. Additionally or alternatively, one of the first flow face and the second flow face protrudes outward. Additionally or alternatively, the flute closure is adjacent the second flow face.

Some embodiments of the technology disclosed herein is directed to a filter assembly having a first sheet of filter media and a second sheet of filter media mutually defining a first plurality of flutes, a first flow face, and a second flow face. Each of the first plurality of flutes extends from the first flow face to the second flow face. Each of the first plurality of flutes defines a flute opening at the first flow face and a flute closure towards the second flow face. The first flow face and the second flow face are planar, and the first flow face is non-parallel to the second flow face.

In some such embodiments, the first sheet is a fluted sheet of filter media and the second sheet is a facing sheet of filter media. Additionally or alternatively, both the first sheet and the second sheet are fluted sheets of filter media. Additionally or alternatively, the flute closure is adjacent to the second flow face.

Additionally or alternatively, the filter assembly has a third sheet of filter media, wherein the third sheet of filter media and the second sheet of filter media mutually define a second plurality of flutes, the first flow face, and the second flow face, where each of the second plurality of flutes extends from the first flow face to the second flow face. Each of the second plurality of flutes defines a flute opening at the second flow face and a flute closure towards the first flow face. Additionally or alternatively, the first plurality of flutes has a first flute defining a first flute distance between the first flow face and the second flow face and a second flute defining a second flute distance between the first flow face and the second flow face. The second plurality of flutes has a third flute defining a third flute distance between the first flow face and the second flow face, and each of the first flute distance, second flute distance, and third flute distance differ by greater than 2 mm.

Additionally or alternatively, the filter assembly is a panel filter. Additionally or alternatively, the first sheet of filter media and the second sheet of filter media define a coiled configuration about a z-axis. Additionally or alternatively, a first flute of the first plurality of flutes defines a first flute distance between the first flow face and the second flow face and a second flute of the first plurality of flutes defines a second flute distance between the first flow face and the second flow face, and the first flute distance differs from the second flute distance by greater than 2 mm. Additionally or alternatively, the first sheet and the second sheet are discontinuous. Additionally or alternatively, the first sheet and the second sheet are continuous and separated by a fold. Additionally or alternatively, the first flow face is opposite the second flow face relative to the filter assembly. Additionally or alternatively, the first plurality of flutes are parallel.

FIG. 1 depicts one example filter assembly consistent with the technology disclosed herein. The filter assembly 1 is constructed of filter media 10 defining a first flow face 20, a second flow face 30, and a plurality of flutes 40 extending from the first flow face 20 to the second flow face 30. In the current example, the first flow face is defined on a first end 12 of the filter assembly 1 and the second flow face 30 is defined on a second, opposite end 14 of the filter assembly 1. A "flow face" as defined herein is the side of the filter assembly through which fluid is configured to enter or exit the filter assembly.

The filter media 10 is a plurality of sheets of filter media, specifically a first sheet of filter media 50 and a second sheet of filter media 60. The second sheet of filter media 60 is adjacent to the first sheet of filter media 50. The first sheet of filter media 50 and the second sheet of filter media 60 mutually define the plurality of flutes 40. The filter media 10 defines a coiled configuration about a z-axis. Accordingly, each of the first sheet of filter media 50 and the second sheet of filter media 60 defines a coiled configuration around the z-axis. As such, the plurality of flutes 40 are also in a coiled configuration about the z-axis.

The first sheet of filter media 50 and the second sheet of filter media 60 are generally elongate, which enables the first sheet of filter media 50 and the second sheet of filter media 60 to be coiled about the z-axis to form a filter assembly. In this example, the first sheet of filter media 50 and the second sheet of filter media 60 are continuous, meaning that the first sheet of filter media 50 and the second sheet of filter media 60 are portions of a single cohesive sheet of filter media. The first sheet of filter media 50 and the second sheet of filter media 60 are separated by a fold 70. The fold 70 defines the second flow face 30 of the filter assembly. The first sheet of filter media 50 defines a first edge 52 and the second sheet of filter media 60 defines a second edge 62. The first edge 52 and the second edge 62 mutually define the first flow face 20 of the filter assembly 1. An "edge" of a media sheet is defined herein as the outer limit of the media, and is distinguished from the fold 70.

In examples consistent with the current embodiment, both the first sheet of filter media 50 and the second sheet of filter media 60 are each fluted. The term "fluted" as used herein is synonymous with the term "corrugated," which refers to a series of alternating elongate ridges/peaks, and elongate grooves/valleys. The term "flutes" is used herein to refer to the elongate channels mutually defined by adjacent portions of media. In the current embodiment the plurality of flutes are parallel, but in some other embodiments the plurality of flutes are not parallel.

The filter assembly 1 is generally constructed to define a fluid pathway 16 between the first flow face 20 and the second flow face 30 through the filter media 10 such that the fluid is filtered by the filter media 10. In particular, the plurality of flutes 40 defines the fluid pathway 16 either (1) into the filter assembly 1 then to the filter media 10 ("inlet flutes"), or (2) from the filter media 10 out of the filter assembly 1 ("outlet flutes"). While each of the figures provided in the present application depict fluid pathways in a particular direction through the depicted filter assemblies for clarity, it will be understood that the fluid pathways can also be in the reverse direction in various examples.

Each of the plurality of flutes 40 defines a flute opening 42 and a flute closure 70. The flute opening 42 forms an end-most portion of the fluid pathway 16 along the flute, to accommodate fluid flow into or out of the filter assembly 1. The flute closure 70 obstructs fluid flow along the flute, thereby defining a portion of the fluid pathway 16 through the filter media 10. In the current example, a plurality of inlet flutes defines the flute opening 42 at the first flow face 20 and a flute closure 70 is defined towards the second flow face 30. In some embodiments, including the one depicted, the flute closure 70 is adjacent to the second flow face 30. More particularly, the flute closure 70 can abut the second flow face 30. The flute closure 70 can have a variety of different configurations, but in the current embodiment, the flute closure 70 is defined by the fold 70.

In the current embodiment, the volume defined between an outer surface 56 of the first sheet of filter media and the outer surface 66 of the second sheet of filter media defines an outlet pathway of the fluid pathway 16 that is not necessarily characterized as being defined by a plurality of flutes. The phrase "outer surface" is defined as the surfaces of the first sheet of filter media and the second sheet of filter media that are facing away from each other if the filter media 10 were arranged as a flat sheet (when uncoiled. The outlet pathway extends from an obstruction 72 to an opening defined at the second end 14 of the filter assembly 1 between the coiled fold 70.

The obstruction 72 can be disposed within the coil and outside of the plurality of flutes 40 such that fluids passing through the first flow face 20 and second flow face 30 of the filter assembly 1 must first pass through the filter media 10. Additional obstructions can also be disposed in any other gaps in the filter media to prevent fluid flow there-through, such as around the outer perimeter of the filter assembly 1 and in a central opening of the filter assembly 1. An obstruction can be formed through depositing an adhesive, such as a glue bead at the relevant location.

Each of the plurality of flutes 40 defines a flute distance between the first flow face 20 and the second flow face 30. The "flute distance" as defined herein is the distance between a first end of a particular flute at the first flow face of the filter assembly and the second end of the particular flute at the second flow face of the filter assembly. In the current embodiment each of the plurality of flutes 40 are straight and, as such, the length of the flute is equal to the "flute distance" as defined herein. However, in some alternative embodiments, the "flute distance" is unequal to the length of the flute, such as in embodiments where the flutes are curved or otherwise do not form a single straight line. Furthermore, the "flute distance" is defined to be the maximum distance between the ends of the flute, in embodiments where the ends of the flute are not a consistent distance apart.

In the current embodiment, a first flute 44 of the plurality of flutes 40 defines a first flute distance $D_1$ between the first flow face 20 and the second flow face 30 and a second flute 46 of the plurality of flutes 40 defines a second flute distance $D_2$ between the first flow face 20 and the second flow face 30. In some examples, the first flute distance $D_1$ is less than the second flute distance $D_2$, as currently depicted. In some other examples, the first flute distance $D_1$ is greater than the second flute distance $D_2$. In certain embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 48 of the plurality of flutes 40 defines a third flute distance $D_3$ between the first flow face 20 and the second flow face 30. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above. In the current example, the third flute distance $D_3$ is greater than the first flute distance $D_1$ and the second flute distance $D_2$. In some other examples, the third flute distance $D_3$ is greater than one of the first flute distance $D_1$ and the second flute distance $D_2$, and less than the other of the first flute distance $D_1$ and the second flute distance $D_2$, as will be appreciated.

The differences in flute distances between the first flow face 20 of the filter assembly 1 and the second flow face 30 of the filter assembly 1 is also evidenced by the shapes of the flow faces relative to each other. In various embodiments, at least one of the first flow face 20 and the second flow face 30 is non-planar. In various embodiments, at least one of the first flow face 20 and the second flow face 30 is substantially planar. A "planar" flow face as defined herein means that the surface(s) of the media defining the flow face form an imaginary plane within a 2 mm margin of error.

In some examples consistent with this particular embodiment, the first flow face 20 is non-planar and the second flow face 30 is planar. In some other examples consistent with this particular embodiment, the first flow face 20 is non-planar and the second flow face 30 non-planar. Here the first flow face 20 defines a spiral about the Z-axis that extends in the axial direction. While the second flow face 30 is obstructed from view in the current illustration, it will be appreciated that the second flow face 30 can be non-planar or planar. For example, in some embodiments the second flow face 30 can be recessed and extend inward relative to the filter assembly, similar to the flow faces depicted in FIG. 15.

It will be appreciated that, in some alternative embodiments, the first flow face 20 can be planar and the second flow face 30 can be non-planar. In some embodiments at least one flute in the plurality of flutes 40 defines a flute opening that is non-planar, where "non-planar" means that the flute opening does not define a plane within a 2 mm margin of error.

In examples consistent with the current embodiment, the obstruction 72 is disposed adjacent to the second edge 62 of the second sheet of filter media 60 along the length of the second sheet of filter media 60. As the second edge 62 of the second sheet of filter media 60 is non-planar, the obstruction 72 also is non-planar. In some embodiments where a filter face is non-planar, an obstruction disposed adjacent to the filter face is also non-planar. However, in other embodiments, where a filter face is non-planar, an obstruction disposed adjacent to that filter face is planar, such as in the embodiment depicted in FIG. 2a.

FIG. 2a depicts another example filter assembly 100 consistent with the technology disclosed herein. The filter assembly 100 is constructed of filter media 110 defining a first flow face 120, a second flow face 130, and a plurality of flutes 140 extending from the first flow face 120 to the second flow face 130. In the current example, the first flow face 120 is defined on a first end 102 of the filter assembly 100 and the second flow face 130 is defined on a second, opposite end 104 of the filter assembly 100.

The filter media 110 is a plurality of sheets of filter media, specifically a first sheet of filter media 150 and a second sheet of filter media 160. The second sheet of filter media 160 is adjacent to the first sheet of filter media 150. The first sheet of filter media 150 and the second sheet of filter media 160 mutually define the plurality of flutes 140. The filter media 110 defines a coiled configuration about a z-axis. Accordingly, each of the first sheet of filter media 150 and the second sheet of filter media 160 defines a coiled configuration about the z-axis. As such, the plurality of flutes 140 are also in a coiled configuration about the z-axis. To depict components not otherwise visible, an end portion 101 of the filter media 110 is depicted in a cut-away view that extends outward from the coil, but generally the substantial length of the filter media 110 is in a coiled configuration. In this example, the plurality of flutes 140 are generally parallel.

The first sheet of filter media 150 and the second sheet of filter media 160 are generally elongate. In this example, the first sheet of filter media 150 and the second sheet of filter media 160 are discontinuous, meaning that the first sheet of filter media 150 and the second sheet of filter media 160 are separate sheets of filter media. In examples consistent with the current embodiment, the first sheet of filter media 150 is a fluted sheet and the second sheet of filter media 160 is a facing sheet, where a "facing sheet" is generally defined as a planar, unfluted sheet.

The first sheet of filter media 150 defines a first edge 152 and a second edge 154 that is opposite the first edge 152. The first edge 152 defines the first flow face 120 and the second edge 154 defines the second flow face 130. The first sheet of filter media 150 has a first width $W_1$ that is defined by the perpendicular distance from first edge 152—or first flow face 120—to the second edge 154—or second flow face 130, where the first width $W_1$ is substantially constant along the length of the first sheet of filter media 150. Similarly, the second sheet of filter media 160 defines a third edge 162 and a fourth edge 164 that is opposite the third edge 162. The third edge 162 defines the first flow face 120 and the fourth edge 164 defines the second flow face 130. The second sheet of filter media 160 has a second width $W_2$ that is defined by the perpendicular distance from the third edge 162—or the first flow face 120—to the fourth edge 164—or the second flow face 130, where the width is substantially constant along the length of the second sheet of filter media 160. In the current embodiment, the first width $W_1$ differs from the second width $W_2$ by greater than 2 mm.

The filter assembly 100 is generally constructed to define a fluid pathway 116 between the first flow face 120 and the second flow face 130 through the filter media 110 such that the fluid is filtered by the filter media 110. Each of the plurality of flutes 140 defines a flute opening 142, which is more clearly visible in FIG. 2b as a detail view of FIG. 2a. Each of the plurality of flutes 140 defines a flute closure 170, which is visible in FIG. 2a because a portion of the first sheet of filter media 150 is cut away for clarity. In the current example, the flute opening 142 is defined at the first flow face 120 and the flute closure 170 is defined towards the second flow face 130. In some embodiments, including the one depicted, the flute closure 170 is adjacent to the second flow face 130. More particularly, the flute closure 170 can abut the second flow face 130. The flute closure 170 can have a variety of different configurations, but in the current embodiment, the flute closure 170 is a physical barrier such as a glue bead disposed between the first sheet of filter media 150 and the second sheet of filter media 160 towards the second flow face.

An obstruction 172 can be disposed within the coil and outside of the plurality of flutes 140 such that fluids passing through the first flow face 120 and second flow face 130 of the filter assembly 100 must first pass through the filter media 110. Additional obstructions can also be disposed in any other gaps in the filter media to prevent fluid flow therethrough, such as around the outer perimeter of the filter assembly 100 and in a central opening of the filter assembly 100. An obstruction can be formed through depositing an adhesive, such as a glue bead or other barrier at the relevant location.

In various embodiments, including the one depicted, at least one of the first flow face 120 and the second flow face 130 is non-planar. In examples consistent with this particular embodiment, the first flow face 120 is non-planar and the second flow face 130 is non-planar. In particular, the first edge 152 and the third edge 162 (particularly visible in FIG. 2b) that define the first flow face 120 are non-planar, even though the first edge 152 is planar and the third edge 162 is planar. The second edge 154 and fourth edge 164 that define the second flow face 130 are similarly non-planar, even though the second edge 154 is planar and the fourth edge 164 is planar. In the current embodiment the flute closure 170 is disposed adjacent to the fourth edge 164 of the second sheet of filter media 160 and, as such, the flute closure 170 is generally planar, but in some alternate examples the flute closure 170 is non planar. Similarly, the obstruction 172 is disposed adjacent to the third edge 162 of the second sheet of filter media 160 and so the obstruction 172 is also planar, but in some alternate examples the obstruction is non-planar 172.

In various embodiments, at least one flute of the plurality of flutes defines an opening that is non-planar, such as a first flute 144 (FIG. 2b) in this example embodiment. In particular, in the current embodiment all of the plurality of flutes 140 define a non-planar opening, by virtue of the first edge 152 and third edge 162 defining one flute opening and the second edge 154 and fourth edge 164 defining the other flute opening.

Figure 2B:
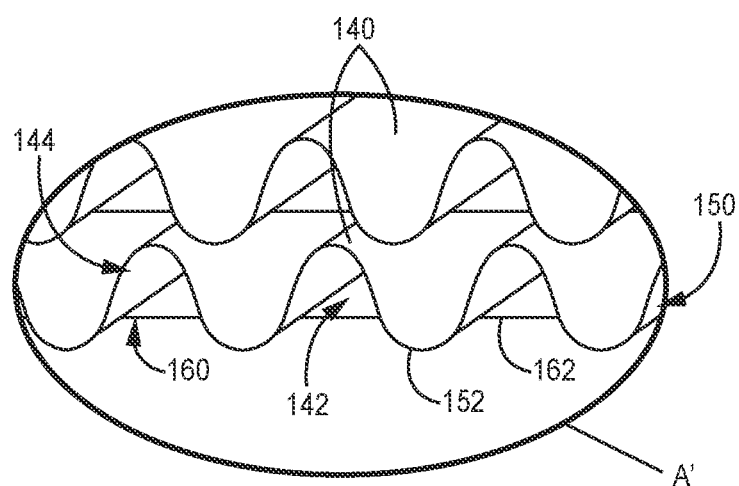
Figure 3:
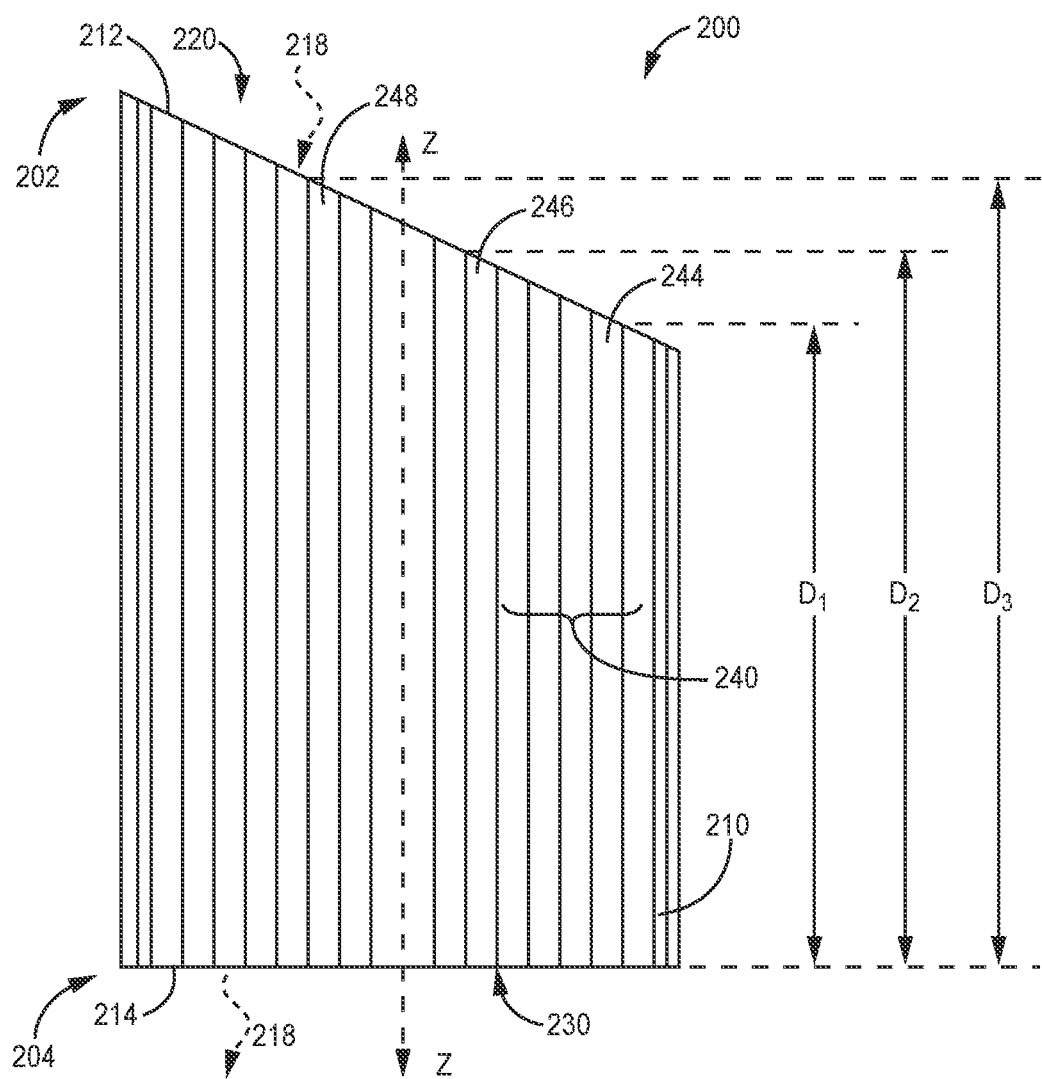
FIG. 3 is a side cut-away view of another example filter assembly consistent with the technology disclosed herein.

FIG. 3 depicts a side cut-away view of yet another example filter assembly 200 consistent with the technology disclosed herein. The filter assembly 200 is constructed of filter media 210 having a first elongate edge 212 defining a first flow face 220, a second elongate edge 214 defining a second flow face 230, and a plurality of flutes 240 extending from the first flow face 220 to the second flow face 230. In the current example, the first flow face 220 is defined on a first end 202 of the filter assembly 200 and the second flow face 230 is defined on a second, opposite end 204 of the filter assembly 200. Similar to the embodiments depicted in FIGS. 1-2b, the filter assembly 200 is generally constructed to define a fluid pathway 218 between the first flow face 220 and the second flow face 230 through the filter media 210 such that the fluid is filtered by the filter media 210. As such, each of the plurality of flutes 240 defines a flute opening and a flute closure. Also similar to the embodiments depicted in FIGS. 1-2b, the filter assembly 200 is constructed of filter media 210 that is in a coiled configuration about a z-axis. Example filter media 210 configurations consistent with FIG. 3 and other embodiments disclosed herein will be described in more detail below with reference to FIGS. 4a-4d.

Returning to FIG. 3, each of the plurality of flutes 240 defines a flute distance between the first flow face 220 and the second flow face 230. In the current embodiment, a first flute 244 of the plurality of flutes 240 defines a first flute distance $D_1$ between the first flow face 220 and the second flow face 230 and a second flute 246 of the plurality of flutes 240 defines a second flute distance $D_2$ between the first flow face 220 and the second flow face 230. In the current embodiment the first flute distance $D_1$ is less than the second flute distance $D_2$, but in other embodiments the first flute distance $D_1$ is greater than the second flute distance $D_2$. In a variety of embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 248 of the plurality of flutes 240 defines a third flute distance $D_3$ between the first flow face 220 and the second flow face 230. In the current embodiment the third flute distance $D_3$ is greater than the first flute distance $D_1$ and the second flute distance $D_2$, but flute distances can have other relative relationships, as has been described above. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above.

In various embodiments, at least one of the first flow face 220 and the second flow face 230 is planar. In examples consistent with this particular embodiment, the first flow face 220 is planar and the second flow face 230 is planar, and the first flow face 220 is non-parallel to the second flow face 230. In some embodiments one or both of the first flow face 220 and the second flow face can be non-planar. For example, one or both of the first flow face and the second flow face can be cut to be a three-dimensional surface.

Figure 4A:
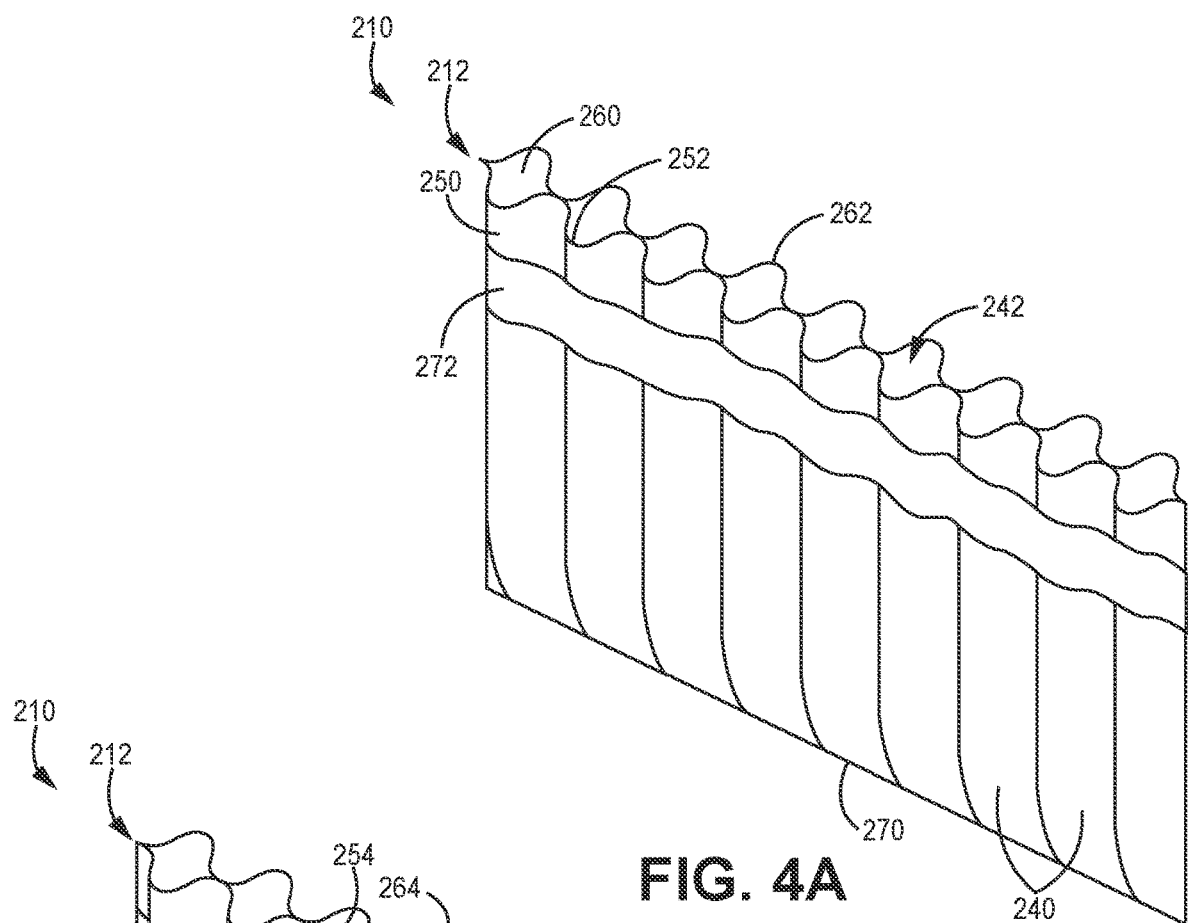
FIG. 4a is example filter media consistent with some embodiments.

The filter assembly 200 of FIG. 3 can be constructed from variety of configurations of filter media 210, examples of which are depicted and described in association with FIGS. 4a-4d and also described in general later in this document. Referring first to FIG. 4a, the example filter media 210 is a plurality of sheets of filter media, specifically a first sheet of filter media 250 and a second sheet of filter media 260. The second sheet of filter media 260 is adjacent to the first sheet of filter media 250. The first sheet of filter media 250 and the second sheet of filter media 260 mutually define the plurality of flutes 240. While currently depicted in an uncoiled arrangement, to be consistent with FIG. 3, the filter media 210 is arranged in a coiled configuration about a z-axis (FIG. 3). Accordingly, each of the first sheet of filter media 250 and the second sheet of filter media 260 are arranged to define a coiled configuration about the z-axis. As such, the plurality of flutes 240 are also in a coiled configuration about the z-axis. In this example, the plurality of flutes 240 are generally parallel. In examples consistent with the embodiment of FIG. 4a, the first sheet of filter media 250 is a fluted sheet and the second sheet of filter media 260 is a fluted sheet.

The first sheet of filter media 250 and the second sheet of filter media 260 are generally elongate. In this example, the first sheet of filter media 250 and the second sheet of filter media 260 are continuous and separated by a fold 270. The fold 270 defines the second flow face 230 and the second elongate edge 214 of the filter assembly 200 depicted in FIG. 3. The first sheet of filter media 250 defines a first edge 252 and the second sheet of filter media 260 defines a second edge 262. The first edge 252 and the second edge 262 are configured to mutually define the first flow face 220, and therefore the first elongate edge 212, of the filter assembly 200 (FIG. 3).

In the current example filter media 210, flute openings 242 (visible in FIG. 4a) of the plurality of flutes 240 is defined at the first flow face 220 (visible in FIG. 3) and a flute closure 270 (visible in FIG. 4a) is defined towards the second flow face 230 (visible in FIG. 3). In some embodiments, including the one depicted, the flute closure 270 is adjacent to the second flow face 230 (FIG. 3). More particularly, the flute closure 270 can abut the second flow face 230. The flute closure 270 can have a variety of different configurations, but in the embodiment of FIG. 4a, the flute closure 270 is the fold 270 between the first sheet of filter media 250 and the second sheet of filter media 260.

An obstruction 272 can be disposed outside of the plurality of flutes 240 such that fluids passing through the first flow face 220 and second flow face 230 of the filter assembly 200 (FIG. 3) must first pass through the filter media 210. The obstruction can be disposed towards the first elongate edge 212 of the filter media 210 during construction of the filer assembly 200 of FIG. 3. As has been described, additional obstructions can also be disposed in any other gaps in the filter media 210 to prevent fluid flow therethrough, such as around the outer perimeter of the filter assembly 200 and in a central opening of the filter assembly 200. An obstruction can be formed through depositing an adhesive, such as a glue bead at the relevant location.

As has been mentioned, to construct the filter assembly 200 of FIG. 3, the filter media 210 of FIG. 4a is coiled around a z-axis, and obstructions 272 are disposed in contact with the filter media 210 at relevant locations to elicit the desired fluid flow through the media. In various embodiments, after the filter media 210 is coiled into a cylindrical shape, the filter media 210 is cut to form the desired shape of the first flow face 220. In the embodiment depicted in FIG. 3, the first flow face 220 can be cut with a cutting tool to form a plane that is non-parallel to the second flow face 230. In examples consistent with the current embodiment the second flow face 230 is generally not cut due to the presence of the fold 270, which forms an obstruction that guides fluid flow. The filter media 210 can be cut using laser cutting, in some examples, and in other examples the filter media 210 can be cut using a sharp edge, such as a saw or knife blade. In such embodiments, the obstructions 272 can be disposed in contact with the filter media 210 at locations that will not be cut and removed.

In some alternative embodiments, the first elongate edge 212 of the filter media 210 is cut before being coiled to form the intended shape of the relevant flow face(s) after the filter media 210 is coiled.

Figure 4B:
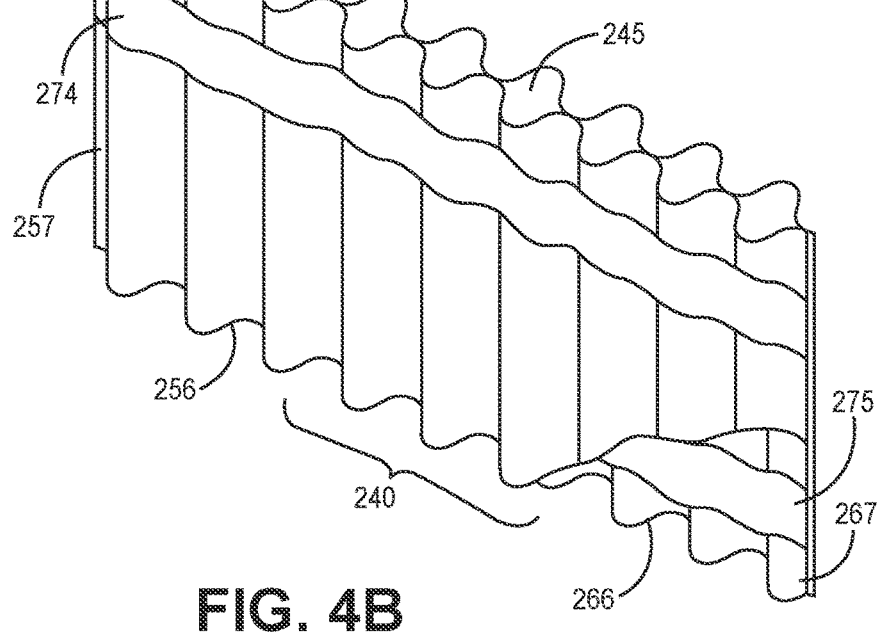
FIG. 4b is another example filter media consistent with some embodiments.

FIG. 4b depicts another filter media 210 consistent with the embodiment depicted in FIG. 3 before the filter media is coiled and cut. The filter media 210 is a plurality of sheets of filter media, specifically a first sheet of filter media 257 and a second sheet of filter media 267. The second sheet of filter media 267 is adjacent to the first sheet of filter media 257. The first sheet of filter media 257 and the second sheet of filter media 267 mutually define the plurality of flutes 240 depicted in FIG. 3.

The first sheet of filter media 257 and the second sheet of filter media 267 are generally elongate. In this example, the first sheet of filter media 257 and the second sheet of filter media 267 are discontinuous. The first sheet of filter media 257 defines a first edge 254 and the second sheet of filter media 267 defines a second edge 264. The first edge 254 and the second edge 264 are configured to mutually define the first flow face 220, and therefore the first elongate edge 212, of the filter assembly 200 (FIG. 3). The first sheet of filter media 257 defines a third edge 256 and the second sheet of filter media 267 defines a fourth edge 266. The third edge 256 and the fourth edge 266 are configured to mutually define the second flow face 230, and therefore the second elongate edge 214, of the filter assembly 200 (FIG. 3).

For construction of the filter assembly 200 of FIG. 3, the filter media 210 is arranged in a coiled configuration about a z-axis (FIG. 3). Accordingly, each of the first sheet of filter media 257 and the second sheet of filter media 267 are arranged to define a coiled configuration about the z-axis. As such, the plurality of flutes 240 are also in a coiled configuration about the z-axis. In this example, the plurality of flutes 240 are generally parallel. In examples consistent with the embodiment of FIG. 4b, the first sheet of filter media 257 is a fluted sheet and the second sheet of filter media 267 is also a fluted sheet.

In the current example filter media 210, the flute opening 245 (visible in FIG. 4b) is defined at the first flow face 220 (visible in FIG. 3) and a flute closure 275 (visible in FIG. 4b in a tear-away section) is defined towards the second flow face 230 (visible in FIG. 3). In some embodiments, including the one depicted in FIG. 4b, the flute closure 275 is adjacent to the second flow face 230 (FIG. 3). More particularly, the flute closure 275 can abut the second flow face 230. The flute closure 275 can have a variety of different configurations, but in the embodiment of FIG. 4b, the flute closure 275 is a physical obstruction, such as a glue bead deposited between the first sheet of filter media 257 and the second sheet of filter media 267.

An obstruction 273 can be disposed outside of the plurality of flutes 240 such that fluids passing through the first flow face 220 and second flow face 230 of the filter assembly 200 (FIG. 3) must first pass through the filter media 210. The obstruction can be disposed towards the first elongate edge 212 of the filter media 210 during construction of the filter assembly 200 of FIG. 3. As has been described, additional obstructions can also be disposed in any other gaps in the filter media 210 to prevent fluid flow therethrough, such as around the outer perimeter of the filter assembly 200 and in a central opening of the filter assembly 200.

The filter media 210 of FIG. 4b can be cut and formed into a filter assembly 200 similarly to the filter media described in FIG. 4a, above.

Figure 4C:
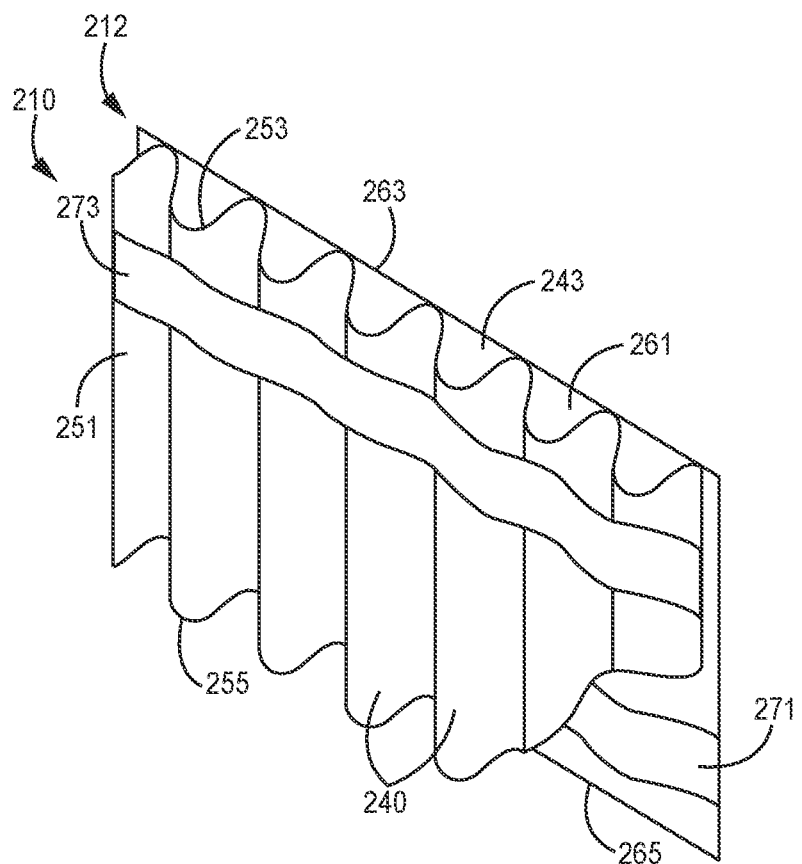
FIG. 4c is yet another example filter media consistent with some embodiments.

FIG. 4c depicts yet another filter media 210 consistent with the embodiment depicted in FIG. 3 before the filter media is coiled and cut. The filter media 210 is a plurality of sheets of filter media, specifically a first sheet of filter media 251 and a second sheet of filter media 261. The second sheet of filter media 261 is adjacent to the first sheet of filter media 251. The first sheet of filter media 251 and the second sheet of filter media 261 mutually define the plurality of flutes 240.

The first sheet of filter media 251 and the second sheet of filter media 261 are generally elongate. In this example, the first sheet of filter media 251 and the second sheet of filter media 261 are discontinuous. The first sheet of filter media 251 defines a first edge 253 and the second sheet of filter media 261 defines a second edge 263. The first edge 253 and the second edge 263 are configured to mutually define the first flow face 220, and therefore the first elongate edge 212, of the filter assembly 200 (FIG. 3). The first sheet of filter media 251 defines a third edge 255 and the second sheet of filter media 261 defines a fourth edge 265. The third edge 255 and the fourth edge 265 are configured to mutually define the second flow face 230, and therefore the second elongate edge 214, of the filter assembly 200 (FIG. 3).

For construction of the filter assembly 200 of FIG. 3, the filter media 210 is arranged in a coiled configuration about a z-axis (FIG. 3). Accordingly, each of the first sheet of filter media 251 and the second sheet of filter media 261 are arranged to define a coiled configuration about the z-axis. As such, the plurality of flutes 240 are also in a coiled configuration about the z-axis. In this example, the plurality of flutes 240 are generally parallel. In examples consistent with the embodiment of FIG. 4c, the first sheet of filter media 251 is a fluted sheet and the second sheet of filter media 261 is a facing sheet.

In the current example filter media 210, the flute opening 243 (visible in FIG. 4c) is defined at the first flow face 220 (visible in FIG. 3), and a flute closure 271 (visible in FIG. 4b in a tear-away section) is defined towards the second flow face 230 (visible in FIG. 3). In some embodiments, including the one depicted in FIG. 4c, the flute closure 271 is adjacent to the second flow face 230 (FIG. 3). More particularly, the flute closure 271 can abut the second flow face 230. The flute closure 271 can have a variety of different configurations, but in the embodiment of FIG. 4c, the flute closure 271 is a physical obstruction, such as a glue bead deposited between the first sheet of filter media 251 and the second sheet of filter media 261.

An obstruction 273 can be disposed outside of the plurality of flutes 240 such that fluids passing through the first flow face 220 and second flow face 230 of the filter assembly 200 (FIG. 3) must first pass through the filter media 210. The obstruction can be disposed towards the first elongate edge 212 of the filter media 210 during construction of the filter assembly 200 of FIG. 3. As has been described, additional obstructions can also be disposed in any other gaps in the filter media 210 to prevent fluid flow therethrough, such as around the outer perimeter of the filter assembly 200 and in a central opening of the filter assembly 200.

The filter media 210 of FIG. 4c can be cut and formed into a filter assembly 200 similarly to the filter media described in FIG. 4a, above.

FIG. 4d is a facing view of a relatively larger elongate segment of the filter media 210 than those depicted in FIGS. 4a-4c to convey an understanding of the general overall shape of the filter media 210 in an uncoiled configuration. FIG. 4d can generally be consistent with the medias depicted in each of FIGS. 4a-4c. FIG. 4d shows that the filter media 210 has a first elongate edge 280, a second elongate edge 282, a first terminal edge 284, and a second terminal edge 286. The first elongate edge 280 corresponds to the first edge of the first sheet of filter media and the second edge of the second sheet of filter media in FIGS. 4a-4c, described above. As such, the first elongate edge 280 also defines the first flow face 220 of the filter assembly (FIG. 3). The second elongate edge 282 can correspond to the fold 270 between the first sheet of filter media and the second sheet of filter media in FIG. 4a, or the third edge of the first sheet of filter media and the fourth edge of the second sheet of filter media of FIGS. 4b-4c.

The first elongate edge 280 generally forms a sine wave pattern having an increasing or decreasing frequency across the length of the filter media 210. The second elongate edge 282 extends in a generally straight line. Similarly, the first terminal edge 284 and the second terminal edge 286 extend in straight lines, and each are perpendicular to the second elongate edge 282. In the current example, the filter media 210 does not form a trapezoidal shape at least due to the wave pattern of the first elongate edge 280.

Figure 5:
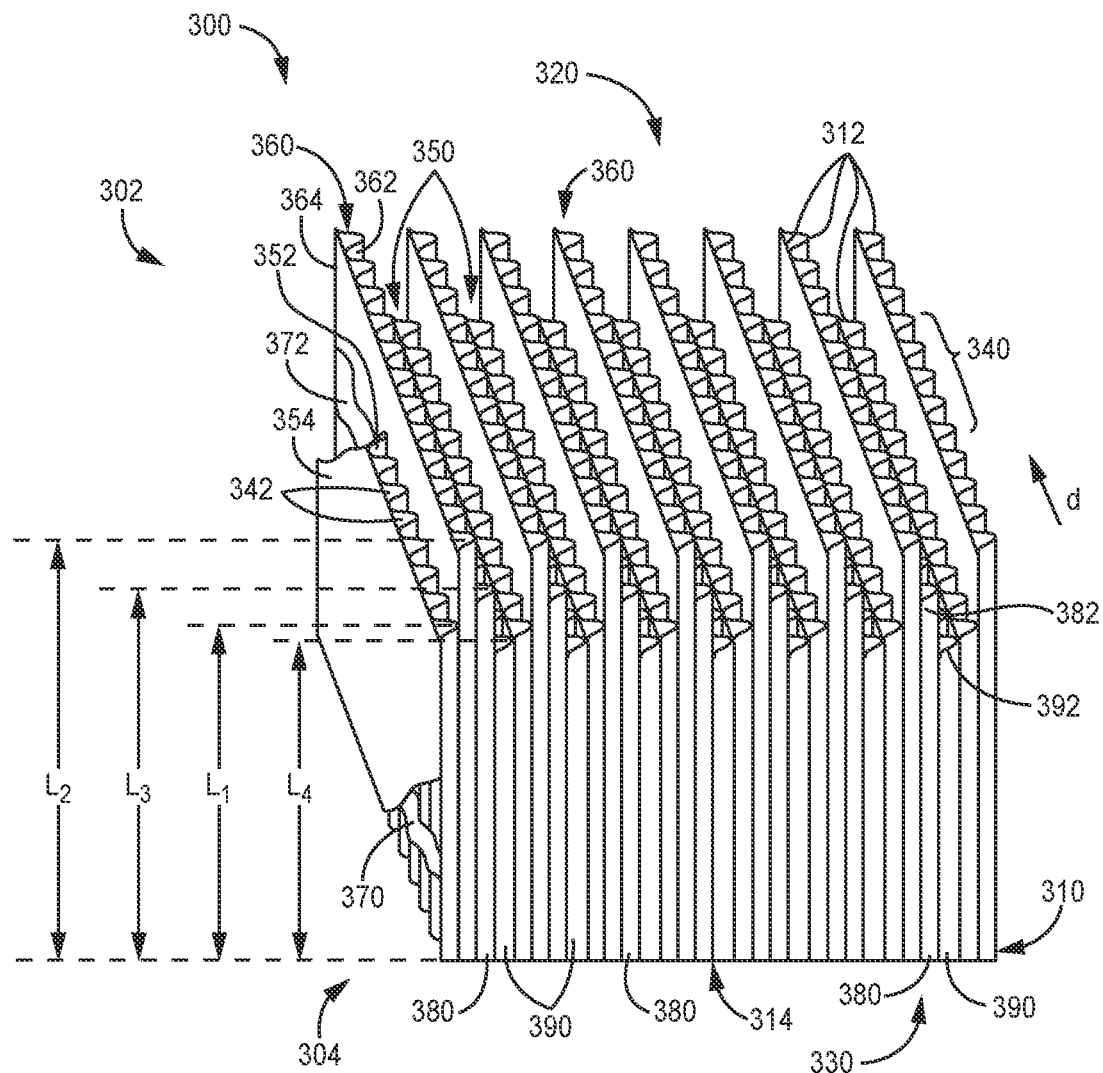
FIG. 5 is a perspective view of another example filter assembly consistent with the technology disclosed herein.

FIG. 5 depicts another example filter assembly 300 consistent with the technology disclosed herein. The filter assembly 300 is a panel filter assembly. The filter assembly 300 is constructed of filter media 310 defining a first flow face 320, a second flow face 330, and a plurality of flutes 340 extending from the first flow face 320 to the second flow face 330. In the current example of FIG. 5, the first flow face 320 is defined on a first end 302 of the filter assembly 300 and the second flow face 330 is defined on a second, opposite end 304 of the filter assembly 300. In the current example of FIG. 5, the first flow face 320 is non-planar and the second flow face 330 is substantially planar, but in some other embodiments, each of the first flow face 320 and the second flow face 330 can be non-planar.

The filter media 310 is a plurality of sheets of filter media. In particular, the plurality of sheets of filter media has alternating fluted sheets 352 of filter media and alternating facing sheets 354 of filter media. The plurality of sheets of filter media are in a stacked configuration. Each of the plurality of sheets of filter media are discontinuous. Each sheet of filter media has a first edge 312 defining the first flow face 320 of the filter assembly 300. In the current embodiment, each sheet of filter media has a second edge 314 defining the second flow face 330 of the filter assembly 300. The plurality of sheets of filter media cumulatively define the plurality of flutes 340. Each of the plurality of flutes 340 defines a flute opening 342 and a flute closure 370, where an example flute closure 370 is visible where a portion of a facing sheet 354 is torn away from a fluted sheet 352. Each of the plurality of flutes 340 defines a flute distance extending from the first flow face 320 to the second flow face 330. In this example, the plurality of flutes 340 are generally parallel. The plurality of flutes 340 can be upstream flutes or downstream flutes.

The plurality of flutes 340 defined by the plurality of sheets of filter media are arranged in a regularly alternating pattern of flute layers. A first flute layer 350 regularly alternates with a second flute layer 360. The first flute layers 350 each have a first layer distance $L_1$ between the first flow face 320 and the second flow face 330. Each of the second layers has a second layer distance $L_2$ between the first flow face 320 and the second flow face 330. In the current example, the first layer distance $L_1$ is less than the second layer distance $L_2$, but in other examples, the first layer distance $L_1$ is greater than the second layer distance $L_2$. The first layer distance $L_1$ and the second layer distance $L_2$ generally differ by greater than 2 mm. In various embodiments, the first layer distance $L_1$ differs from the second layer distance $L_2$ by at least 5 mm. In some embodiments, the first layer $L_1$ differs from the second layer distance $L_2$ by 3 mm to 20 mm. In some embodiments, the first layer distance $L_1$ differs from the second layer distance $L_2$ by at least 8 mm. In some such embodiments, the first layer distance $L_1$ differs from the second layer distance $L_2$ by at least 14 mm.

Each individual flute in the first flute layers 350 is defined by a fluted sheet 352 and an adjacent facing sheet 354. Similarly, each of the second layers 360 is defined by a fluted sheet 362 and an adjacent facing sheet 364. In the example of FIG. 5 each fluted sheet and facing sheet in each flute layer define substantially equal distances between the first flow face 320 and the second flow face 330; however, in some embodiments, each fluted sheet and facing sheet in at least one flute layer define distances that differ by greater than 2 mm. Also, in the embodiment of FIG. 5, each flute layer defines a substantially constant distance between the first flow face 320 and the second flow face 330 in the depth direction d (represented in FIG. 5 by an arrow); this means that the distance defined by each flute layer between the first flow face 320 and the second flow face 330 is equal to the flute distance between the first flow face 320 and the second flow face 330 for each flute in the flute layer. In some embodiments, however, the distance defined between the first flow face and the second flow face for one or more sheets of filter media can vary in the depth direction, in which case the flute distances between the first flow face and the second flow face can be used to characterize the flute layers.

In some embodiments, including that depicted in FIG. 5, the plurality of sheets of filter media further defines third flute layers 380 that regularly alternate with the first flute layers 350 and second flute layers 360. Each third flute layer 380 defines a third layer distance $L_3$ between the first flow face 320 and the second flow face 330. In the current embodiment, the third layer distance $L_3$ is greater than the first layer distance $L_1$ and the third layer distance $L_3$ is less than the second layer distance $L_2$, although other relative relationships are possible, which has been described. In the presently-depicted example, the third layer distance $L_3$ differs from the first layer distance $L_1$ and the second layer distance $L_2$ by greater than 2 mm.

Furthermore, in the current example of FIG. 5, the plurality of sheets of filter media defines a regularly alternating pattern of fourth flute layers 390, where each fourth flute layer defines a fourth layer distance $L_4$ between the first flow face 320 and the second flow face 330. The fourth layer distance $L_4$ is less than each of the first layer distance $L_1$, the second layer distance $L_2$, and the third layer distance $L_3$, although other relative relationships are possible, as previously described. The fourth layer distance $L_4$ differs from the first layer distance $L_1$, the second layer distance $L_2$, and the third layer distance $L_3$ by greater than 2 mm. Similar to the first flute layers 350 and second flute layers 360, the third flute layers 380 and the fourth flute layers 390 have a fluted sheet 382, 392 and a facing sheet (not visible), respectively. In alternative embodiments, additional or fewer flute layers can be incorporated in filter assemblies consistent with the current technology. While in the current example (and the example discussed with reference to FIG. 6a, below) each regularly alternating layer defines a different distance between the first flow face 320 and the second flow face 330, in some examples two or more regularly alternating layers can define the same distance between the first flow face and the second flow face.

FIG. 6a depicts a perspective view of another example filter assembly 400 consistent with the technology disclosed herein, and FIG. 6b depicts a facing view at a first flow face 420 of the example filter assembly 400. The filter assembly 400 is a panel filter assembly. The filter assembly 400 is constructed of filter media 410 defining the first flow face 420, a second flow face 430, and a plurality of flutes 440 extending from the first flow face 420 to the second flow face 430. The first flow face 420 is defined on a first end 402 of the filter assembly 400 and the second flow face 430 is defined on a second, opposite end 404 of the filter assembly 400. In the current example of FIG. 6, both the first flow face 420 is non-planar and the second flow face 430 is non-planar, but in some other embodiments, only one of the first flow face 420 and the second flow face 430 is non-planar and the other of the first flow face 420 and the second flow face 430 is planar.

The filter media 410 is a plurality of sheets of filter media. In particular, the plurality of sheets of filter media has fluted sheets of filter media. The plurality of sheets of filter media are in a stacked configuration. The plurality of sheets of filter media are continuous relative to each other. Each sheet of filter media has a first fold 412 defining the first flow face 420 of the filter assembly 400. In the current embodiment, each sheet of filter media has a second fold 414 defining the second flow face 430 of the filter assembly 400. The plurality of sheets 410 of filter media cumulatively define the plurality of flutes 440. Each of the plurality of flutes 440 defines a flute opening 442 and a flute closure 470, where the flute closures 470 are defined between pairs of the first folds 412 at the first flow face 420 and pairs of the second folds 414 at the second flow face 430. In some alternative embodiments the flute closure can be defined by a single fold line that separates adjacent sheets of filter media. In this example, the plurality of flutes 440 are generally parallel. The plurality of flutes 440 can be upstream flutes or downstream flutes.

The plurality of sheets of filter media define a regularly alternating pattern of first flute layers 450 and second flute layers 460. The first flute layers 450 each have a first layer distance $L_1$ between the first flow face 420 and the second flow face 430. Each of the second flute layers 460 has a second layer distance $L_2$ between the first flow face 420 and the second flow face 430. The second layer distance $L_2$ is less than the first layer distance $L_1$ in the current example, although in some embodiments the second layer distance $L_2$ is greater than the first layer distance $L_1$. The first layer distance $L_1$ and the second layer distance $L_2$ generally differ by greater than 2 mm. In various embodiments, the first layer distance $L_1$ differs from the second layer distance $L_2$ by at least 5 mm. In some embodiments, the first layer $L_1$ differs from the second layer distance $L_2$ by 4 mm to 20 mm. In some embodiments, the first layer distance $L_1$ differs from the second layer distance $L_2$ by at least 8 mm. In some such embodiments, the first layer distance $L_1$ differs from the second layer distance $L_2$ by at least 14 mm.

Each of the first flute layers 450 is defined by a first fluted sheet 452 and an adjacent second fluted sheet 454. Similarly, each of the second flute layers 460 is defined by a third fluted sheet 462 and an adjacent fourth fluted sheet 464. Similar to the embodiment described above with respect to FIG. 5, in the current embodiment of FIG. 6a, each flute layer defines a substantially constant distance between the first flow face 420 and the second flow face 430 in the depth direction d2; this means that the distance defined by each flute layer is equal to the flute distance between the first flow face 420 and the second flow face 430 of each flute in the flute layer. In some embodiments, however, the distance that one or more sheets of filter media defines between the first flow face 420 and the second flow face 430 can vary in the depth direction $d_2$.

Additional alternating flute layers can be incorporated into filter assemblies consistent with the technology disclosed herein, similar to the previous example reflected in FIG. 5.

Figure 7:
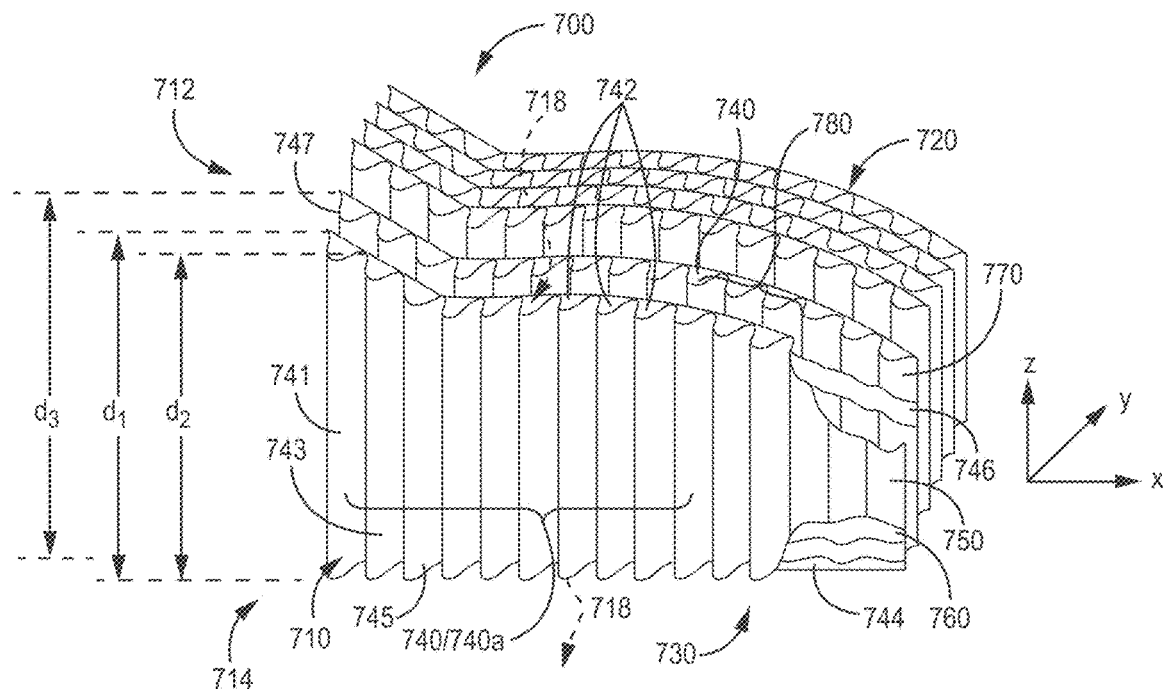
FIG. 7 is a perspective view of yet another example filter assembly consistent with the technology disclosed herein.

FIG. 7 depicts a perspective view of yet another example filter assembly 700 consistent with the technology disclosed herein. The filter assembly 700 is a panel filter that is constructed of a plurality of sheets of filter media 710 in a stacked configuration that cumulatively define a first plurality of flutes 740, a first flow face 720 and a second flow face 730 opposite the first flow face relative to the filter assembly 700. The plurality of stacked sheets of filter media 710 are alternating fluted sheets of filter media and facing sheets of filter media. The plurality of stacked sheets of filter media 710 are discontinuous. In various embodiments, at least one of the first flow face 720 and the second flow face 730 is non-planar.

Each of the first plurality of flutes 740 defines a flute opening 742 at the first flow face 720 and a flute closure 744 towards the second flow face 730. In some embodiments, at least one flute 745 of the plurality of flutes 740 defines a flute opening 742 that is non-planar. Each of the first plurality of flutes 740 defines a flute distance from the first flow face 720 to the second flow face 730. Each sheet of filter media 710 can be characterized as having a width extending in a direction parallel to an x-axis and a length extending in a direction parallel to a z-axis. The plurality of sheets of filter media 710 are stacked in a direction parallel to a y-axis.

In a number of embodiments, the filter assembly 700 at least has a first sheet of filter media 750 and a second sheet of filter media 760 mutually defining the first flow face 720, the second flow face 730, and a portion of the first plurality of flutes 740. In this example the first sheet of filter media 750 is a fluted sheet and the second sheet of filter media 760 is a facing sheet. A first flute 741 of the first plurality of flutes 740 defines a first flute distance $d_1$ and a second flute 743 of the first plurality of flutes 740 defines a second flute distance $d_2$. In the current example, the first flute distance $d_1$ is greater than the second flute distance $d_2$, although in some other examples, the first flute distance $d_1$ is less than the second flute distance $d_2$. The first flute distance $d_1$ and the second flute distance $d_2$ differ by greater than 2 mm. In some embodiments the first flute distance $d_1$ and the second flute distance $d_2$ differ by at least 5 mm. In some embodiments the first flute distance $d_1$ and the second flute distance $d_2$ differ by 3 mm to 20 mm. In some embodiments the first flute distance $d_1$ and the second flute distance $d_2$ differ by at least 8 mm. In some embodiments the first flute distance $d_1$ and the second flute distance $d_2$ differ by at least 15 mm.

The filter assembly 700 also has a third sheet of filter media 770, where the third sheet of filter media and the second sheet of filter media 760 mutually define a second plurality of flutes 780, the first flow face 720 and the second flow face 730. Each of the second plurality of flutes 780 extends from the first flow face 720 to the second flow face 730. Each of the second plurality of flutes 780 defines a flute opening at the second flow face 730 (not visible in this view) and a flute closure towards the first flow face 720. The flute closure can be an obstruction disposed between the second sheet of filter media 760 and the third sheet of filter media 770 towards the first flow face 720. The second plurality of flutes 780 can have a third flute 747 that defines a third flute distance $d_3$ between the first flow face 720 and the second flow face 730. In the current example, the third flute distance $d_3$ is greater than the first flute distance $d_1$ and the second flute distance $d_2$, although alternate relative relationships among the flute distances are contemplated, as well, which has been previously discussed. The first flute distance $d_1$ differs from the third flute distance $d_3$ by greater than 2 mm. In some embodiments, each of the first flute distance $d_1$, second flute distance $d_2$, and third flute distance $d_3$ differ by greater than 2 mm. In some embodiments the first flute distance $d_1$ differs from the second flute distance $d_2$ and the third flute distance $d_3$ by amounts and ranges previously described herein.

In the current example of FIG. 7, the second flute 743 is adjacent the first flute 741 in the x-axis direction, although in some other embodiments the second flute 743 is not adjacent the first flute 741. In some embodiments, the third flute 747 is positioned relative to the first flute 741 in the y-axis direction, but in other embodiments the third flute 747 is not positioned relative to the first flute 741 in the y-axis direction. In some alternative embodiments the third flute 747 can be a flute in the first plurality of flutes 740.

In the current example, the first flow face 720 is non-planar and the second flow face 730 is planar. In an alternative example embodiment, both the first flow face and the second flow face are non-planar. In some embodiments, the first flow face and the second flow face are planar and non-parallel to each other. In various embodiments, the plurality of flutes 740 are parallel, although in some embodiments, the plurality of flutes 740 are not parallel.

Similar to the embodiments depicted in FIGS. 1-2b, the filter assembly 700 is generally constructed to define a fluid pathway 718 between the first flow face 720 and the second flow face 730 through the filter media 710 such that the fluid is filtered by the filter media 710.

In various embodiments, at least one of the first flow face 720 and the second flow face 730 is planar. In examples consistent with the particular embodiment of FIG. 7, the first flow face 720 is planar and the second flow face 730 is planar, and the first flow face 720 is non-parallel to the second flow face 730. In alternative embodiments one or both of the first flow face and the second flow face can be non-planar. For example, one or both of the first flow face and the second flow face can be cut to be a three-dimensional surface.

Figure 8:
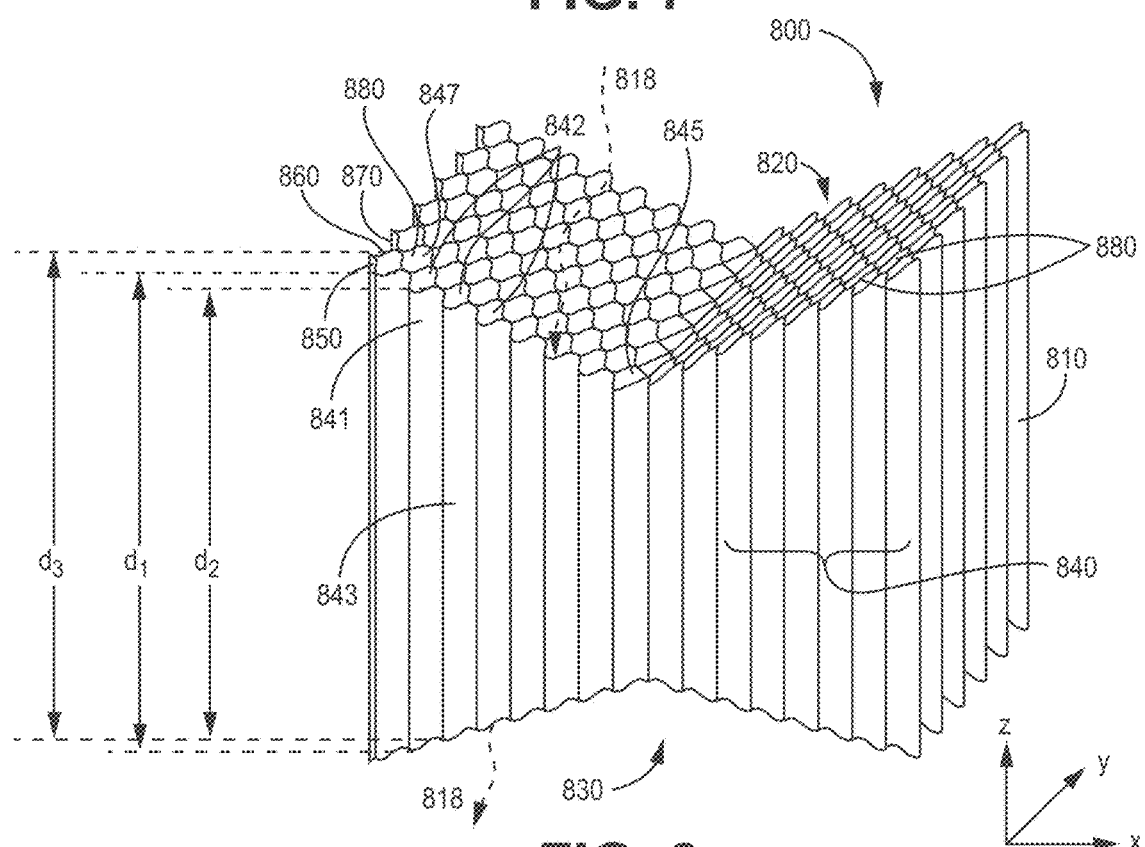
FIG. 8 is a perspective view of yet another example filter assembly consistent with the technology disclosed herein.

FIG. 8 depicts a perspective view of yet another example filter assembly 800 consistent with the technology disclosed herein. The filter assembly 800 is a panel filter that is constructed of a plurality of sheets of filter media 810 in a stacked configuration that define a first plurality of flutes 840, a first flow face 820 and a second flow face 830 opposite the first flow face relative to the filter assembly 800. The plurality of stacked sheets of filter media 810 are fluted sheets of filter media. The plurality of stacked sheets of filter media 810 are discontinuous. In various embodiments, at least one of the first flow face 820 and the second flow face 830 is non-planar, and in the current embodiment, both the first flow face 820 and the second flow face 830 are non-planar.

The plurality of sheets of filter media 810 cumulatively define a plurality of flutes 840. Each of the first plurality of flutes 840 defines a flute opening 842 at the first flow face 820 and a flute closure (not shown) towards the second flow face 830, where the flute closure is similar to those described above and depicted at least in FIGS. 2a and 4b. In some embodiments, at least one flute 845 of the plurality of flutes 840 defines a flute opening 842 that is non-planar. Each of the first plurality of flutes 840 defines a flute distance from the first flow face 820 to the second flow face 830. Each sheet of filter media 810 can be characterized as having a width extending in a direction parallel to an x-axis and a length extending in a direction parallel to a z-axis. The plurality of sheets of filter media 810 are stacked in a direction parallel to a y-axis.

In a number of embodiments, the filter assembly 800 at least has a first sheet of filter media 850 and a second sheet of filter media 860 mutually defining the first flow face 820, the second flow face 830, and a portion of the first plurality of flutes 840. In this example both the first sheet of filter media 850 and the second sheet of filter media 860 are fluted sheets. A first flute 841 of the portion of the first plurality of flutes 840 defines a first flute distance $d_1$ and a second flute 843 of the first plurality of flutes 840 defines a second flute distance $d_2$. In the current example, the first flute distance $d_1$ is greater than the second flute distance $d_2$, although in some other examples, the first flute distance $d_1$ is less than the second flute distance $d_2$. The first flute distance $d_1$ and the second flute distance $d_2$ differ by greater than 2 mm and can further differ by amounts and ranges previously discussed.

The filter assembly 800 also has a third sheet of filter media 870, where the third sheet of filter media and the second sheet of filter media 860 mutually define a second plurality of flutes 880, the first flow face 820 and the second flow face 830. Each of the second plurality of flutes 880 extends from the first flow face 820 to the second flow face 830. Each of the second plurality of flutes 880 defines a flute opening at the second flow face 830 (not visible in this view) and a flute closure towards the first flow face 820. The flute closure can be an obstruction disposed between the second sheet of filter media 860 and the third sheet of filter media 870 towards the first flow face 820.

The second plurality of flutes 880 can have a third flute 847 that defines a third flute distance $d_3$ between the first flow face 820 and the second flow face 830. In the current example, the third flute distance $d_3$ is greater than the first flute distance $d_1$ and the second flute distance $d_2$, although alternate relative relationships among the flute distances are contemplated. The first flute distance $d_1$ differs from the third flute distance $d_3$ by greater than 2 mm. In some embodiments, each of the first flute distance $d_1$, second flute distance $d_2$, and third flute distance $d_3$ differ by greater than 2 mm. In some embodiments the first flute distance $d_1$ differs from the second flute distance $d_2$ and the third flute distance $d_3$ by amounts and ranges previously described herein.

In the current example the second flute 843 is adjacent the first flute 841 in the x-axis direction, although in some other embodiments the second flute 843 is not adjacent the first flute 841. In some embodiments, the third flute 847 is positioned relative to the first flute 841 in the y-axis direction, but in other embodiments the third flute 847 is not positioned relative to the first flute 841 in the y-axis direction. In some alternative embodiments the third flute 847 can be a flute in the first plurality of flutes 840.

In the current example, the first flow face 820 is non-planar and the second flow face 830 is non-planar. In particular, the first flow face 820 is recessed relative to the filter assembly 800. Similarly, the second flow face 830 is recessed relative to the filter assembly. In an alternative example, both the first flow face and the second flow face are planar and non-parallel to each other. In some embodiments, the first plurality of flutes 840 are parallel, although in some embodiments, the first plurality of flutes 840 are not parallel.

Similar to the embodiments described above, the filter assembly 800 is generally constructed to define a fluid pathway 818 between the first flow face 820 and the second flow face 830 through the filter media 810 such that the fluid is filtered by the filter media 810.

The example filter assemblies described and depicted in FIGS. 7 and 8 can be constructed through a variety of different approaches. In at least one embodiment, flute obstructions are deposited between the adjacent sheets of filter media at relevant locations and the sheets of filter media are stacked. The stacked media is then cut with a cutting tool (examples of which have been mentioned above with respect FIG. 3) to form the first flow face and/or the second flow face into the desired configuration. In an alternative embodiment, the edges of the sheets of filter media corresponding to flow faces are cut to the desired configuration, and the cut sheets of media are then stacked to form into a filter assembly. The flute obstructions can be deposited on the sheets of filter media before or after the sheets of filter media are cut.

Figure 9:
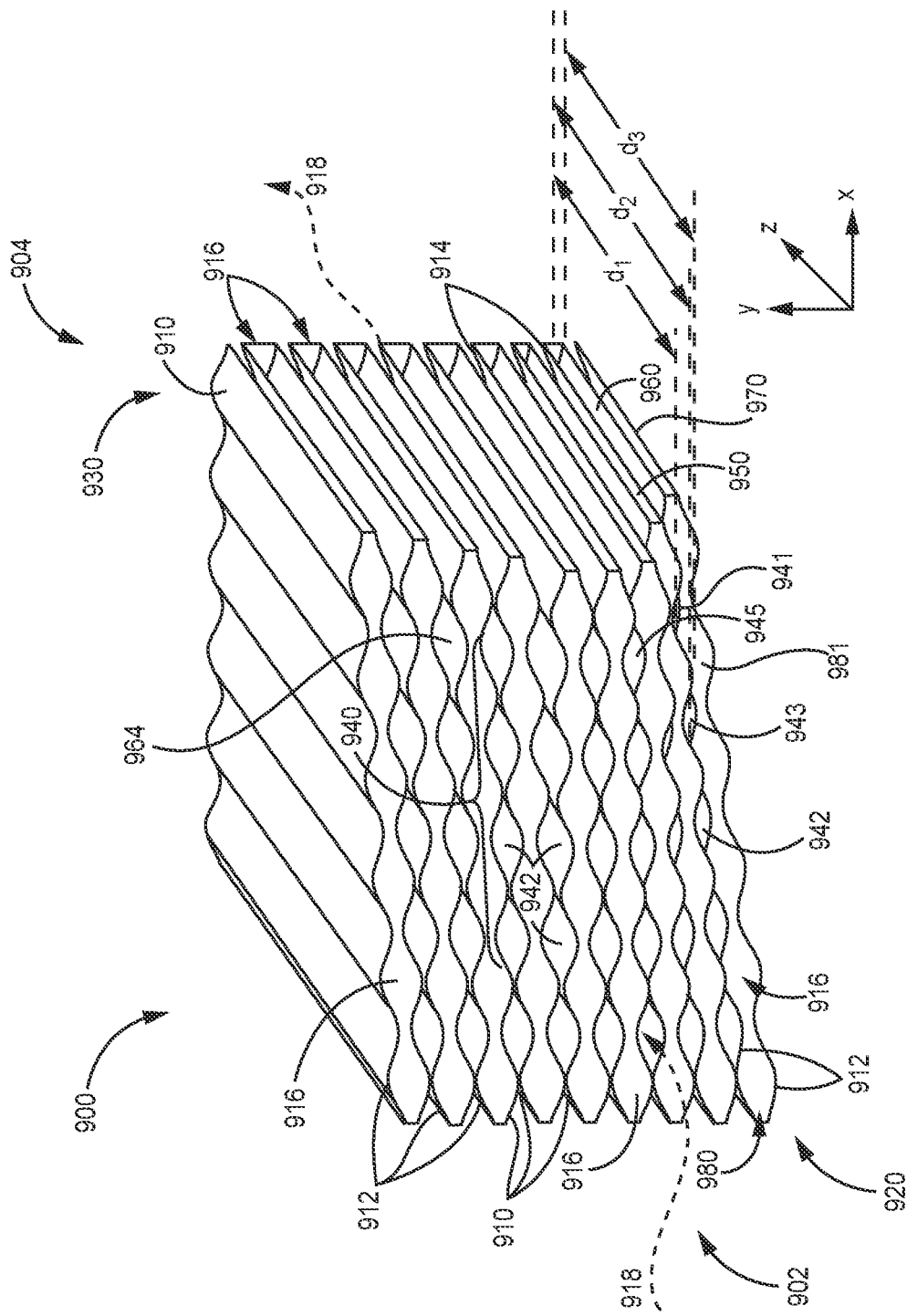
FIG. 9 is a perspective view of yet another example filter assembly consistent with the technology disclosed herein.

FIG. 9 depicts a perspective view of yet another example filter assembly 900 consistent with the technology disclosed herein. The filter assembly 900 is a panel filter that is constructed of a plurality of sheets of filter media 910 in a stacked configuration that define a first plurality of flutes 940, a first flow face 920 of the filter assembly 900 and a second flow face 930 opposite the first flow face 920 relative to the filter assembly 900. The plurality of sheets of filter media 910 are fluted sheets of filter media. In various embodiments, at least one of the first flow face 920 and the second flow face 930 is non-planar, and in the current embodiment, the first flow face 920 is non-planar and the second flow face 930 is planar.

The plurality of sheets of filter media 910 are continuous relative to each other. Each sheet of filter media has a first fold 912 defining the first flow face 920 of the filter assembly 900. Each sheet of filter media 910 has a second fold 914 (only a small portion of which is visible) defining the second flow face 930 of the filter assembly 900. Each of the first plurality of flutes 940 defines a flute opening 942 at the first flow face 920 and a flute closure 916 towards the second flow face 930. The flute closure 916 is defined by the filter media on the second flow face 930, where the filter media extends between adjacent second folds 914 on the second flow face 930.

In some embodiments, at least one flute 945 of the plurality of flutes 940 defines a flute opening 942 that is non-planar. Each of the first plurality of flutes 940 defines a flute distance from the first flow face 920 to the second flow face 930. Each sheet of filter media 910 can be characterized as having a width extending in a direction parallel to an x-axis and a length extending in a direction parallel to a z-axis. The plurality of sheets of filter media 910 are stacked in a direction parallel to a y-axis.

In a number of embodiments, the filter assembly 900 at least has a first sheet of filter media 950 and a second sheet of filter media 960 mutually defining the first flow face 920, the second flow face 930, and a portion of the first plurality of flutes 940. In this example both the first sheet of filter media 950 and the second sheet of filter media 960 are fluted sheets. A first flute 941 of the portion of the first plurality of flutes 940 defines a first flute distance $d_1$ and a second flute 943 of the first plurality of flutes 940 defines a second flute distance $d_2$. In the current example, the first flute distance $d_1$ is less than the second flute distance $d_2$, although in some other examples, the first flute distance $d_1$ is greater than the second flute distance $d_2$. The first flute distance $d_1$ and the second flute distance $d_2$ differ by greater than 2 mm and can further differ by amounts and ranges previously discussed.

The filter assembly 900 also has a third sheet of filter media 970, where the third sheet of filter media and the second sheet of filter media 960 mutually define a second plurality of flutes 980, the first flow face 920 and the second flow face 930. Each of the second plurality of flutes 980 extends from the first flow face 920 to the second flow face 930. Each of the second plurality of flutes 980 defines a flute opening at the second flow face 930 (not visible in this view) and a flute closure 916 towards the first flow face 920. The flute closure can be an obstruction disposed between the second sheet of filter media 960 and the third sheet of filter media 970 towards the first flow face 920. In the current embodiment the flute closure 916 is a portion of filter media defined by one or more folds 912, similar to as described with respect to FIGS. 6a and 6b. The second plurality of flutes 980 can have a third flute 981 that defines a third flute distance $d_3$ between the first flow face 920 and the second flow face 930. In the current example, the third flute distance $d_3$ is greater than the first flute distance $d_1$ and the second flute distance $d_2$ (although not clear from the current viewing angle), although alternate relative relationships among the flute distances are contemplated. The first flute distance $d_1$ differs from the third flute distance $d_3$ by greater than 2 mm. In some embodiments, each of the first flute distance $d_1$, second flute distance $d_2$, and third flute distance $d_3$ differ by greater than 2 mm. In some embodiments the first flute distance $d_1$ differs from the second flute distance $d_2$ and the third flute distance $d_3$ by amounts and ranges previously described herein.

In the current example of FIG. 9, the second flute 943 is adjacent the first flute 941 in the x-axis direction, although in some other embodiments the second flute 943 is not adjacent the first flute 941. In some embodiments, the third flute 981 is positioned relative to the first flute 941 in the y-axis direction, but in other embodiments the third flute 981 is not positioned relative to the first flute 941 in the y-axis direction. In some alternative embodiments the third flute 981 can be a flute in the first plurality of flutes 940.

In the current example of FIG. 9, the first flow face 920 is non-planar and the second flow face 930 is planar. In an alternative example embodiment, both the first flow face and the second flow face are planar and non-parallel to each other. In some embodiments, the first plurality of flutes 940 are parallel, although in some alternative embodiments, the first plurality of flutes 940 are not parallel. Also, while in the current embodiment the filter media is pleated, in some other embodiments the media is not pleated.

Similar to the embodiments described above, the filter assembly 900 is generally constructed to define a fluid pathway 918 between the first flow face 920 and the second flow face 930 through the filter media 910 such that the fluid is filtered by the filter media 910.

Figure 10:
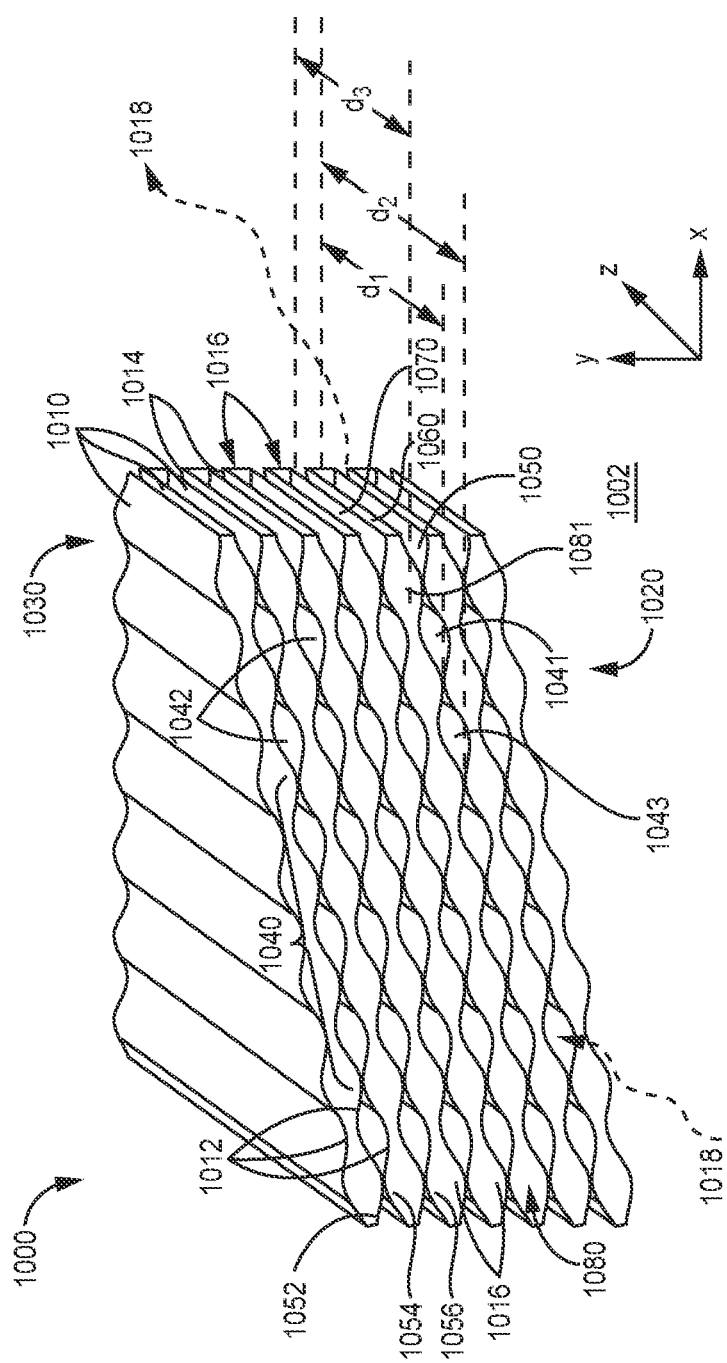
FIG. 10 is a perspective view of yet another example filter assembly consistent with the technology disclosed herein.

FIG. 10 depicts a perspective view of yet another example filter assembly 1000 consistent with the technology disclosed herein. The filter assembly 1000 is a panel filter that is constructed of a plurality of sheets of filter media 1010 in a stacked configuration that define a first plurality of flutes 1040, a first flow face 1020 of the filter assembly 1000 and a second flow face 1030 opposite the first flow face 1020 relative to the filter assembly 1000. The plurality of sheets of filter media 1010 are fluted sheets of filter media. In the current embodiment, the first flow face 1020 is planar and the second flow face 1030 is planar, and the first flow face 1020 is non-parallel to the second flow face 1030.

The plurality of sheets of filter media 1010 are continuous relative to each other. Each sheet of filter media has a first fold 1012 defining the first flow face 1020 of the filter assembly 1000. Each sheet of filter media 1010 has a second fold 1014 (only a small portion of which is visible) defining the second flow face 1030 of the filter assembly 1000. Each of the first plurality of flutes 1040 defines a flute opening 1042 at the first flow face 1020 and a flute closure 1016 towards the second flow face 1030. The flute closure 1016 is defined by the filter media on the second flow face 1030, where the filter media extends between adjacent second folds 1014 on the second flow face 1030. The flute closure 1016 can be similar to that described in the discussion of FIGS. 6a and 6b.

Each of the first plurality of flutes 1040 defines a flute distance from the first flow face 1020 to the second flow face 1030. Each sheet of filter media 1010 can be characterized as having a width extending in a direction parallel to an x-axis and a length extending in a direction parallel to a z-axis. The plurality of sheets of filter media 1010 are stacked in a direction parallel to a y-axis.

In a number of embodiments, the filter assembly 1000 at least has a first sheet of filter media 1050 and a second sheet of filter media 1060 mutually defining the first flow face 1020, the second flow face 1030, and a portion of the first plurality of flutes 1040. In this example both the first sheet of filter media 1050 and the second sheet of filter media 1060 are fluted sheets. A first flute 1041 of the portion of the first plurality of flutes 1040 defines a first flute distance $d_1$ and a second flute 1043 of the first plurality of flutes 1040 defines a second flute distance $d_2$. In the current example, the first flute distance $d_1$ is less than the second flute distance $d_2$, although in some other examples, the first flute distance $d_1$ is greater than the second flute distance $d_2$. The first flute distance $d_1$ and the second flute distance $d_2$ differ by greater than 2 mm and can further differ by amounts and ranges previously discussed.

The filter assembly 1000 also has a third sheet of filter media 1070, where the third sheet of filter media and the second sheet of filter media 1060 mutually define a second plurality of flutes 1080, the first flow face 1020 and the second flow face 1030. Each of the second plurality of flutes 1080 extends from the first flow face 1020 to the second flow face 1030. Each of the second plurality of flutes 1080 defines a flute opening at the second flow face 1030 (not visible in this view) and a flute closure 1016 towards the first flow face 1020. The flute closure can be an obstruction disposed between the second sheet of filter media 1060 and the third sheet of filter media 1070 towards the first flow face 1020. In the current embodiment the flute closure 1016 is a portion of filter media defined by one or more folds 1012.

The second plurality of flutes 1080 can have a third flute 1081 that defines a third flute distance $d_3$ between the first flow face 1020 and the second flow face 1030. In the current example, the third flute distance $d_3$ is less than the first flute distance $d_1$ and the second flute distance $d_2$, but in some embodiments the third flute distance $d_3$ is greater than one or both of the first flute distance $d_1$ and the second flute distance $d_2$. The first flute distance $d_1$ differs from the third flute distance $d_3$ by greater than 2 mm. In some embodiments, each of the first flute distance $d_1$, second flute distance $d_2$, and third flute distance $d_3$ differ by greater than 2 mm. In some embodiments the first flute distance $d_1$ differs from the second flute distance $d_2$ and the third flute distance $d_3$ by amounts and ranges previously described herein.

In the current example of FIG. 10, the second flute 1043 is adjacent the first flute 1041 in the x-axis direction, although in some other embodiments the second flute 1043 is not adjacent the first flute 1041. In some embodiments, the third flute 1081 is positioned relative to the first flute 1041 in the y-axis direction, but in other embodiments the third flute 1081 is not positioned relative to the first flute 1041 in the y-axis direction. In some alternative embodiments the third flute 1081 can be a flute in the first plurality of flutes 1040.

In some embodiments, the first plurality of flutes 1040 are parallel, although in some embodiments, the first plurality of flutes 1040 are not parallel. Also, while in the current embodiment the filter media is pleated, in some other embodiments the pleated media is not pleated and obstructions are positioned between sheets of filter media to close off ends of flutes.

Similar to the embodiments described above, the filter assembly 1000 is generally constructed to define a fluid pathway 1018 between the first flow face 1020 and the second flow face 1030 through the filter media 1010 such that the fluid is filtered by the filter media 1010.

Figure 11A:
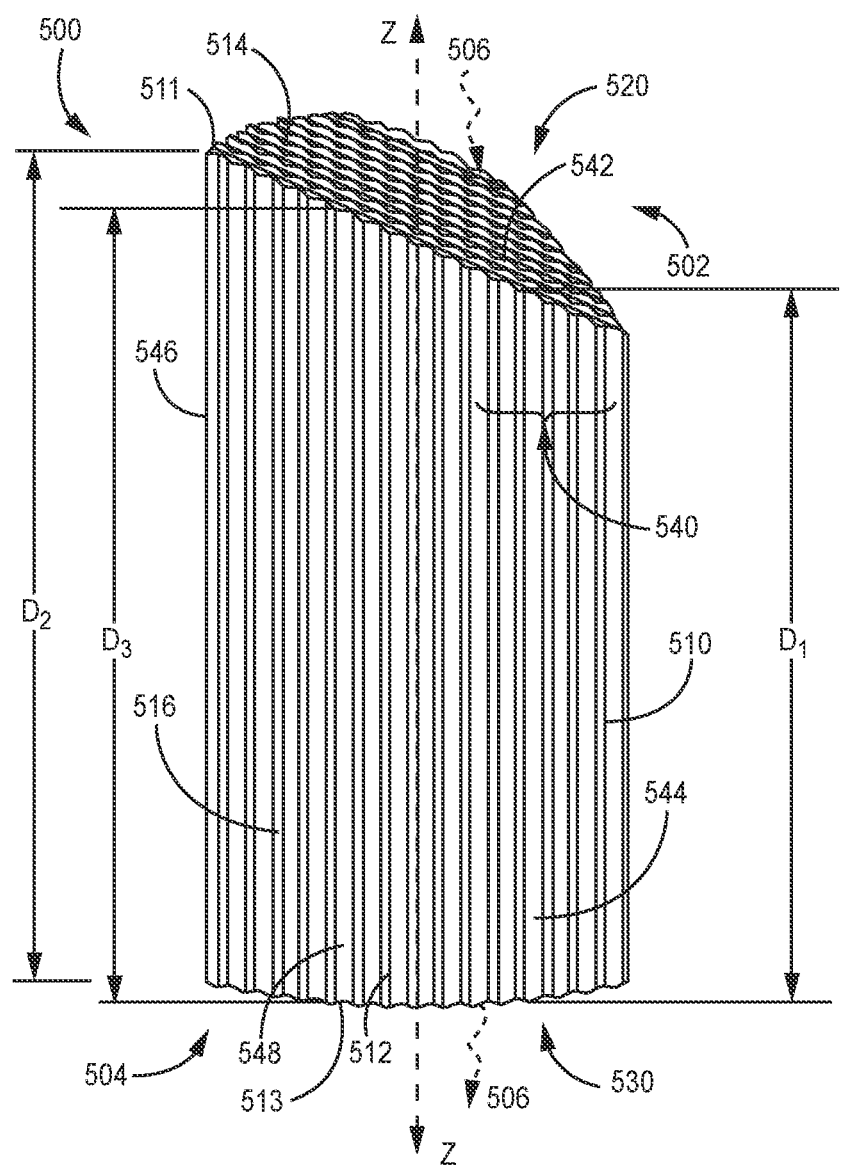
FIG. 11A is a side view of another example filter assembly consistent with the technology disclosed herein.

FIG. 11A depicts one example filter assembly consistent with the technology disclosed herein. The filter assembly 500 is constructed of filter media 510 defining a first flow face 520, a second flow face 530, and a plurality of flutes 540 extending from the first flow face 520 to the second flow face 530. In the current example, the first flow face 510 is defined on a first end 502 of the filter assembly 500 and the second flow face 530 is defined on a second, opposite end 504 of the filter assembly 500.

Figure 11B:
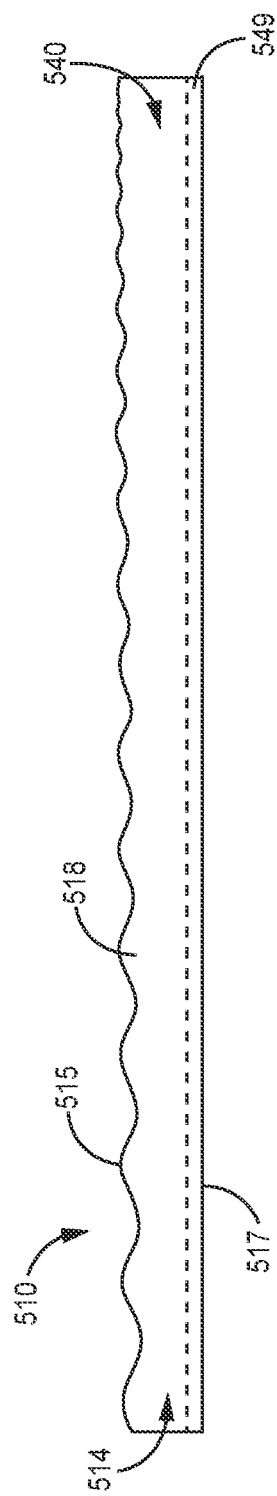
FIG. 11B is a facing view of filter media consistent with FIG. 11A.

The filter media 510 is a plurality of sheets of filter media, specifically a first sheet of filter media 512 and a second sheet of filter media 514. The second sheet of filter media 514 is visible in FIG. 11B, which depicts a portion of the filter media 510 in a flat, uncoiled arrangement, distinguished from the coiled filter media 510 in the filter assembly 500 consistent with FIG. 11A. FIG. 11B is a facing view of the second sheet of filter media 514. The second sheet of filter media 514 is adjacent the first sheet of filter media 512. The first sheet of filter media 512 and the second sheet of filter media 514 mutually define the plurality of flutes 540. The filter media 510 defines a coiled configuration about a z-axis. Accordingly, each of the first sheet of filter media 512 and the second sheet of filter media 514 defines a coiled configuration around the z-axis. As such, the plurality of flutes 540 are also in a coiled configuration about the z-axis.

As visible in FIG. 11B, the filter media 510 (particularly the first sheet of filter media 512 and the second sheet of filter media 514) are generally elongate, which enables the first sheet of filter media 512 and the second sheet of filter media 514 to be coiled about the z-axis to form a filter assembly. In this example, the first sheet of filter media 512 and the second sheet of filter media 514 are discontinuous. The first sheet of filter media 512 defines a first edge 511 and a second edge 513 (FIG. 11A). The second sheet of filter media 514 defines a third edge 515 and a fourth edge 517 (FIG. 11B). The first edge 511 and the third edge 515 mutually define the first flow face 520 of the filter assembly 500. The second edge 513 and the fourth edge 517 mutually define the second flow face 530 of the filter assembly 500. The first edge 511 and third edge 515 each individually form an undulating or wavy line. The second edge 513 and the fourth edge 517 each individually form a straight line. The filter media 510 in examples consistent with the current embodiment has four edges. The shape of the filter media 510 is generally non-rectangular and non-trapezoidal due to the undulating/wavy edge. In particular, the first edge 511 and third edge 515 mutually define multiple concave and convex shapes.

In examples consistent with the current embodiment, the first sheet of filter media 512 is fluted, and the second sheet of filter media 514 is a facing sheet. In the current embodiment the plurality of flutes are parallel, but in some other embodiments the plurality of flutes are not parallel.

The filter assembly 500 is generally constructed to define a fluid pathway 506 between the first flow face 520 and the second flow face 530 through the filter media 510 such that the fluid is filtered by the filter media 510. In particular, the plurality of flutes 540 defines either inlet flutes, or outlet flutes, similar to as-described in FIG. 1.

Each of the plurality of flutes 540 defines a flute opening 542 and a flute closure (not visible). The flute opening 542 forms an end-most portion of the fluid pathway 506 along the flutes to accommodate fluid flow into or out of the filter assembly 500. The flute closure obstructs fluid flow along the flute, thereby defining a portion of the fluid pathway 506 through the filter media 510. So, for example, a plurality of inlet flutes can define the flute opening 542 at the first flow face 520 and a flute closure is defined across the plurality of inlet flutes towards the second flow face 530. In some embodiments, the flute closure is adjacent to the second flow face 530. More particularly, the flute closure can abut the second flow face 530. The flute closure can be similar to flute closures discussed above.

In the current embodiment, the volume defined between an outer surface 516 of the first sheet of filter media 512 (FIG. 11A) and an outer surface 518 of the second sheet of filter media 514 (FIG. 11B) when the filter media is coiled (FIG. 11A) defines a fluid pathway 506 that is not necessarily characterized as being defined by a plurality of flutes.

An obstruction can be disposed within the coil and outside of the plurality of flutes 540 such that fluids passing through the first flow face 520 and second flow face 530 of the filter assembly 500 must first pass through the filter media 510. Additional obstructions can also be disposed in any other gaps in the filter media to prevent fluid flow there-through, such as around the outer perimeter of the filter assembly 500 and in a central opening of the filter assembly 500. An obstruction can be formed through depositing an adhesive, such as a glue bead at the relevant location.

Each of the plurality of flutes 540 defines a flute distance between the first flow face 520 and the second flow face 530. In the current embodiment, a first flute 544 of the plurality of flutes 540 defines a first flute distance $D_1$ between the first flow face 520 and the second flow face 530 and a second flute 546 of the plurality of flutes 540 defines a second flute distance $D_2$ between the first flow face 520 and the second flow face 530. In some examples, the first flute distance $D_1$ is less than the second flute distance $D_2$, as currently depicted. In some other examples, the first flute distance $D_1$ is greater than the second flute distance $D_2$. In certain embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 520 mm, 510 mm to 520 mm, or 15 mm to 25 mm.

In some embodiments, a third flute 548 of the plurality of flutes 540 defines a third flute distance $D_3$ between the first flow face 520 and the second flow face 530. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above. In the current example, the third flute distance $D_3$ is greater than the first flute distance $D_1$ and less than the second flute distance $D_2$.

The differences in flute distances between the first flow face 520 of the filter assembly 500 and the second flow face 530 of the filter assembly 500 is also evidenced by the shapes of the flow faces relative to each other. In various embodiments, at least one of the first flow face 520 and the second flow face 530 is non-planar. In various embodiments, at least one of the first flow face 520 and the second flow face 530 is substantially planar. In examples consistent with this particular embodiment, the first flow face 520 is non-planar and the second flow face 530 is planar. Further, in this particular embodiment, the first flow face 520 is configured such that it protrudes outward from the filter assembly in the z direction. The shape of the first flow face 520 is generally asymmetrical relative to the Z-axis.

It will be appreciated that, in some alternative embodiments, the first flow face 520 can be planar and the second flow face 530 can be non-planar. In some embodiments at least one flute in the plurality of flutes 540 defines a flute opening that is non-planar.

In examples consistent with the current embodiment, an obstruction 549 is disposed adjacent to the fourth edge 517 of the second sheet of filter media 514 along the length of the second sheet of filter media 514. The fourth edge 515 of the second sheet of filter media 514 is generally planar when the filter media 510 is in a coiled configuration. Here the obstruction 549 also is generally planar when the filter media 510 is in a coiled configuration.

Figure 12A:
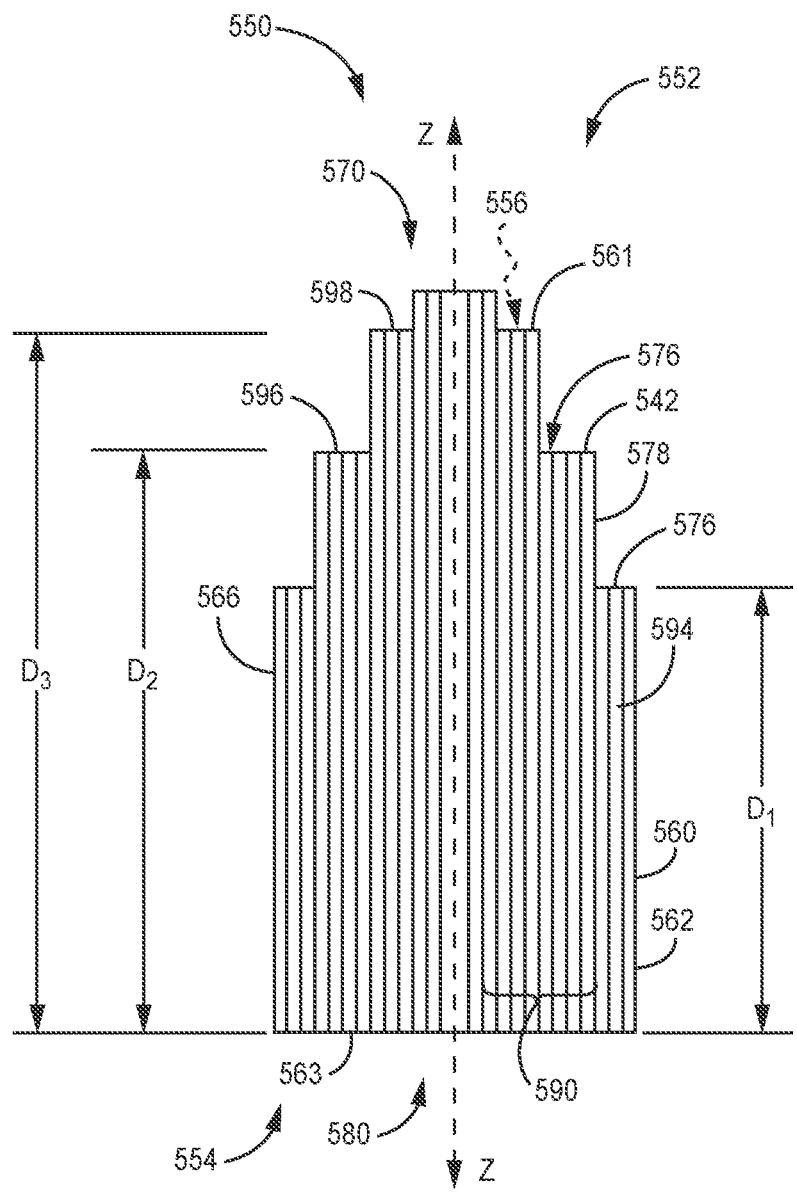
FIG. 12A is a cross-sectional view of another example filter assembly consistent with the technology disclosed herein.
Figure 12B:
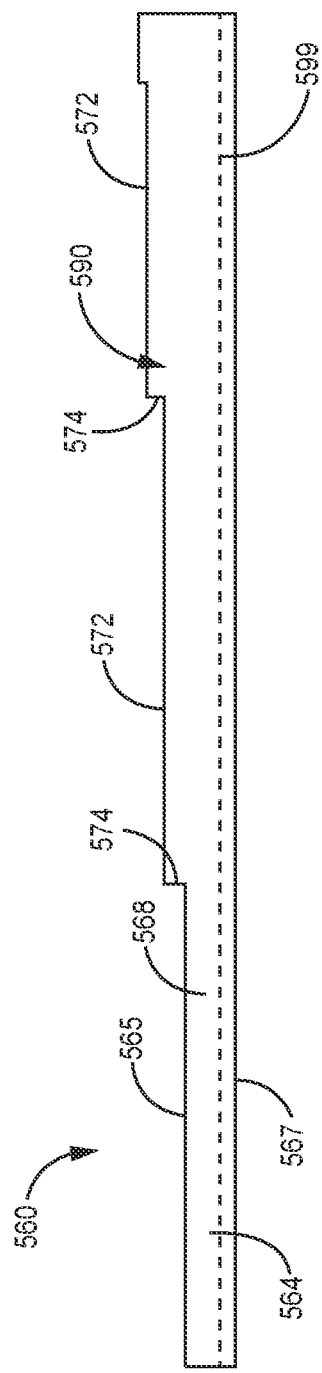
FIG. 12B is a facing view of filter media consistent with FIG. 12A.

FIG. 12A depicts an example filter assembly 550 consistent with the technology disclosed herein, and FIG. 12B depicts a facing view of corresponding filter media 560, which is in an uncoiled, or planar arrangement. The filter assembly 550 is constructed of filter media 560 defining a first flow face 570, a second flow face 580, and a plurality of flutes 590 extending from the first flow face 570 to the second flow face 580. In the current example, the first flow face 560 is defined on a first end 552 of the filter assembly 550 and the second flow face 580 is defined on a second, opposite end 554 of the filter assembly 550.

The filter media 560 is a plurality of sheets of filter media, specifically a first sheet of filter media 562 and a second sheet of filter media 564. The second sheet of filter media 564 is visible in FIG. 12B, which is a portion of the filter media 560 in a flat, uncoiled arrangement, distinguished from the coiled filter media 560 forming the filter assembly 550 consistent with FIG. 12A. FIG. 12B is a facing view of the second sheet of filter media 564. The second sheet of filter media 564 is adjacent to the first sheet of filter media 562. The first sheet of filter media 562 and the second sheet of filter media 564 mutually define the plurality of flutes 590. The filter media 562 can have a variety of configurations, some examples of which are described in association with FIGS. 4a-4d, and also described below. In the current embodiment the plurality of flutes are parallel, but in some other embodiments the plurality of flutes are not parallel.

The filter media 560 defines a coiled configuration about a z-axis. Accordingly, each of the first sheet of filter media 562 and the second sheet of filter media 564 defines a coiled configuration around the z-axis. As such, the plurality of flutes 590 are also in a coiled configuration about the z-axis.

As visible in FIG. 12B, the filter media 560 (particularly the first sheet of filter media 562 and the second sheet of filter media 564) are generally elongate, which enables the first sheet of filter media 562 and the second sheet of filter media 564 to be coiled about the z-axis to form a filter assembly. In this example, the first sheet of filter media 562 and the second sheet of filter media 564 can be continuous or discontinuous. In embodiments where the sheets are discontinuous, the first sheet of filter media 562 defines a first edge 561 and a second edge 563 (FIG. 12A) and the second sheet of filter media 564 defines a third edge 565 and a fourth edge 567 (FIG. 12B). The first edge 561 and the third edge 565 mutually define the first flow face 570 of the filter assembly 550. The second edge 563 and the fourth edge 567 mutually define the second flow face 580 of the filter assembly 550. The second edge 593 and the fourth edge 567 each individually form a straight line that defines the edge of the filter media 550.

The first edge 561 and third edge 565 mutually and individually form a stepped line. The stepped line has horizontal segments 572 joined by vertical segments 574. The shape of the filter media 550 is generally non-rectangular and non-trapezoidal based on the stepped edge.

The filter assembly 550 is generally constructed to define a fluid pathway 556 between the first flow face 570 and the second flow face 580 through the filter media 560 such that the fluid is filtered by the filter media 560. In particular, the plurality of flutes 590 defines either inlet flutes or outlet flutes, similar to as described above.

Each of the plurality of flutes 590 defines a flute opening 592 and a flute closure (not visible). The flute opening 592 forms an end-most portion of the fluid pathway 556 along the flutes to accommodate fluid flow into or out of the filter assembly 550. The flute closure obstructs fluid flow along the flute, thereby defining a portion of the fluid pathway 556 through the filter media 560. So, for example, a plurality of inlet flutes can define the flute opening 592 at the first flow face 570 and a flute closure is defined across the plurality of inlet flutes towards the second flow face 580. In some embodiments, the flute closure is adjacent to the second flow face 580. More particularly, the flute closure can abut the second flow face 580. The flute closure can be similar to flute closures discussed above.

In the current embodiment, the volume defined between an outer surface 566 of the first sheet of filter media 562 (FIG. 12A) and an outer surface 568 of the second sheet of filter media 564 (FIG. 12B) when the filter media is coiled (FIG. 12A) defines a fluid pathway 556 that is not necessarily characterized as being defined by a plurality of flutes.

An obstruction can be disposed within the coil and outside of the plurality of flutes 590 such that fluids passing through the first flow face 570 and second flow face 580 of the filter assembly 550 must first pass through the filter media 560. Additional obstructions can also be disposed in any other gaps in the filter media to prevent fluid flow there-through, such as around the outer perimeter of the filter assembly 550 and in a central opening of the filter assembly 550. An obstruction can be formed through depositing an adhesive, such as a glue bead at the relevant location.

Each of the plurality of flutes 590 defines a flute distance between the first flow face 570 and the second flow face 580. In the current embodiment, a first flute 594 of the plurality of flutes 590 defines a first flute distance $D_1$ between the first flow face 570 and the second flow face 580 and a second flute 596 of the plurality of flutes 590 defines a second flute distance $D_2$ between the first flow face 570 and the second flow face 580. In some examples, the first flute distance $D_1$ is less than the second flute distance $D_2$, as currently depicted. In some other examples, the first flute distance $D_1$ is greater than the second flute distance $D_2$. In certain embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 570 mm, 560 mm to 570 mm, or 15 mm to 25 mm.

In some embodiments, a third flute 598 of the plurality of flutes 590 defines a third flute distance $D_3$ between the first flow face 570 and the second flow face 580. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above. In the current example, the third flute distance $D_3$ is greater than the first flute distance $D_1$ and the second flute distance $D_2$. In some other examples, the third flute distance $D_3$ is greater than one of the first flute distance $D_1$ and the second flute distance $D_2$, and less than the other of the first flute distance $D_1$ and the second flute distance $D_2$, as will be appreciated.

The differences in flute distances between the first flow face 570 of the filter assembly 550 and the second flow face 580 of the filter assembly 550 is also evidenced by the shapes of the flow faces relative to each other. In various embodiments, at least one of the first flow face 570 and the second flow face 580 is non-planar. In various embodiments, at least one of the first flow face 570 and the second flow face 580 is substantially planar. In examples consistent with this particular embodiment, the first flow face 570 is non-planar and the second flow face 580 is planar. Further, in this particular embodiment, the first flow face 570 has a stepped configuration where the first flow face 570 defines multiple planes 576. Each plane can be offset from other planes forming the first flow face 570 in the z direction. The general shape of the first flow face 520 can be radially symmetrical relative to the z-axis, although in some embodiments the general shape of the first flow face is asymmetrical to the z-axis.

It will be appreciated that, in some alternative embodiments, the first flow face 570 can be planar and the second flow face 580 can be non-planar. In some embodiments at least one flute in the plurality of flutes 590 defines a flute opening that is non-planar.

In examples consistent with the current embodiment, an obstruction 599 is disposed adjacent to the fourth edge 567 of the second sheet of filter media 564 along the length of the second sheet of filter media 564. As the fourth edge 565 of the second sheet of filter media 564 is generally planar when the filter media 560 is in a coiled configuration, the obstruction 599 also is generally planar when the filter media 560 is in a coiled configuration.

Figure 13A:
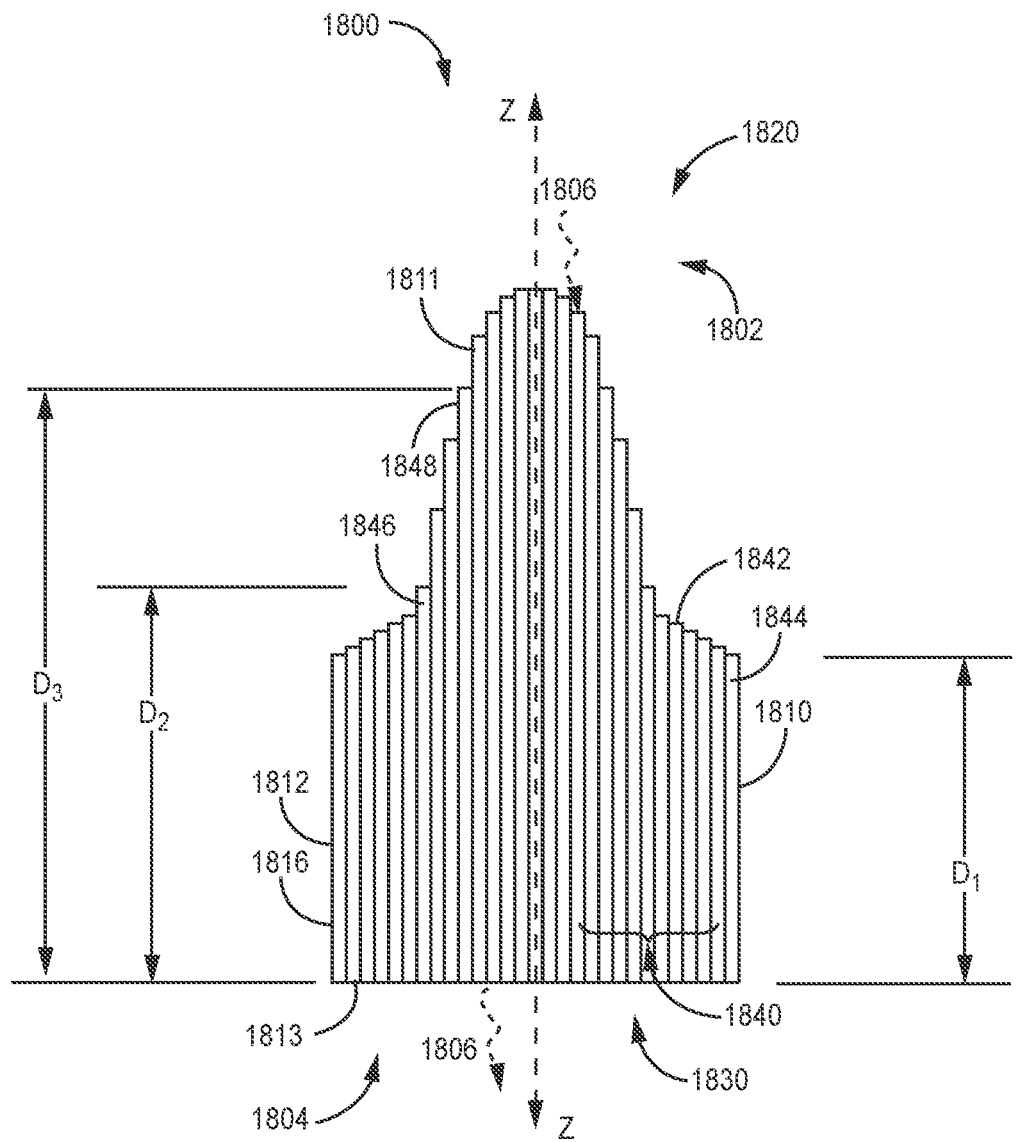
FIG. 13A is a cross-sectional view of another example filter assembly consistent with the technology disclosed herein.
Figure 13B:
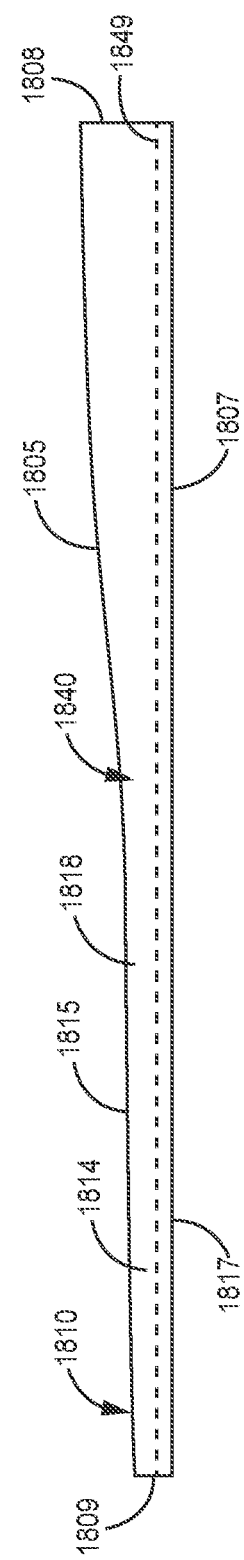
FIG. 13B is a facing view of filter media consistent with FIG. 13A.

Similar to the previous two examples, FIG. 13A depicts one example filter assembly 1800 consistent with the technology disclosed herein, where the filter assembly 1800 is coiled filter media 1810, and FIG. 13B depicts a facing view of the filter media 1810 in an uncoiled arrangement. The filter assembly 1800 is constructed of filter media 1810 defining a first flow face 1820, a second flow face 1830, and a plurality of flutes 1840 extending from the first flow face 1820 to the second flow face 1830. In the current example, the first flow face 1810 is defined on a first end 1802 of the filter assembly 1800 and the second flow face 1830 is defined on a second, opposite end 1804 of the filter assembly 1800.

The filter media 1810 is a plurality of sheets of filter media, specifically a first sheet of filter media 1812 and a second sheet of filter media 1814. The second sheet of filter media 1814 is visible in FIG. 13B, which is a portion of the filter media 1810 in a planar, uncoiled arrangement. FIG. 13B is a facing view of the second sheet of filter media 1814. The second sheet of filter media 1814 is adjacent to the first sheet of filter media 1812. The first sheet of filter media 1812 and the second sheet of filter media 1814 mutually define the plurality of flutes 1840. The filter media 1810 can have a variety of configurations, some examples of which are described in association with FIGS. 4a-4d, and also described below.

The filter media 1810 defines a coiled configuration about a z-axis. Accordingly, each of the first sheet of filter media 1812 and the second sheet of filter media 1814 defines a coiled configuration around the z-axis. As such, the plurality of flutes 1840 are also in a coiled configuration about the z-axis. In the current embodiment the plurality of flutes are parallel, but in some other embodiments the plurality of flutes are not parallel.

As visible in FIG. 13B, the filter media 1810 (particularly the first sheet of filter media 1812 and the second sheet of filter media 1814) are generally elongate, which enables the first sheet of filter media 1812 and the second sheet of filter media 1814 to be coiled about the z-axis to form a filter assembly. In this example, the first sheet of filter media 1812 and the second sheet of filter media 1814 can be discontinuous. In such embodiments, the first sheet of filter media 1812 defines a first edge 1811 and a second edge 1813 (FIG. 13A) and the second sheet of filter media 1814 defines a third edge 1815 and a fourth edge 1817 (FIG. 13B). The first edge 1811 and the third edge 1815 mutually define the first flow face 1820 of the filter assembly 1800. The second edge 1813 and the fourth edge 1817 mutually define the second flow face 1830 of the filter assembly 1800. The first edge 1811 and third edge 1815 mutually and individually form a curved line, which has convex and concave portions. The second edge 1813 and the fourth edge 1817 mutually and individually form a straight line.

The filter media 1810 in examples consistent with the current embodiment has four edges: a first elongate edge 1805 (corresponding to the first edge 1811 and the third edge 1815), a second elongate edge 1807 (corresponding to the second edge 1811 and the fourth edge 1815), a first terminal edge 1808, and a second terminal edge 1809. The shape of the filter media 1810 is generally non-rectangular and non-trapezoidal at least based on the curve defined by the first elongate edge 1805.

The filter assembly 1800 is generally constructed to define a fluid pathway 1806 between the first flow face 1820 and the second flow face 1830 through the filter media 1810 such that the fluid is filtered by the filter media 1810. In particular, the plurality of flutes 1840 defines either inlet flutes, or outlet flutes, similar to as-described in FIG. 1.

Each of the plurality of flutes 1840 defines a flute opening 1842 and a flute closure (not visible). The flute opening 1842 forms an end-most portion of the fluid pathway 1806 along the flutes to accommodate fluid flow into or out of the filter assembly 1800. The flute closure obstructs fluid flow along the flute, thereby defining a portion of the fluid pathway 1806 through the filter media 1810. So, for example, a plurality of inlet flutes can define the flute opening 1842 at the first flow face 1820 and a flute closure is defined across the plurality of inlet flutes towards the second flow face 1830. In some embodiments, the flute closure is adjacent to the second flow face 1830. More particularly, the flute closure can abut the second flow face 1830. The flute closure can be similar to flute closures discussed above.

In the current embodiment, the volume defined between an outer surface 1816 of the first sheet of filter media 1812 (FIG. 13A) and an outer surface 1818 of the second sheet of filter media 1814 (FIG. 13B) when the filter media is coiled (FIG. 13A) defines a fluid pathway 1806 that is not necessarily characterized as being defined by a plurality of flutes.

An obstruction can be disposed within the coil and outside of the plurality of flutes 1840 such that fluids passing through the first flow face 1820 and second flow face 1830 of the filter assembly 1800 must first pass through the filter media 1810. Additional obstructions can also be disposed in any other gaps in the filter media to prevent fluid flow there-through, such as around the outer perimeter of the filter assembly 1800 and in a central opening of the filter assembly 1800. An obstruction can be formed through depositing an adhesive, such as a glue bead at the relevant location.

Each of the plurality of flutes 1840 defines a flute distance between the first flow face 1820 and the second flow face 1830. In the current embodiment, a first flute 1844 of the plurality of flutes 1840 defines a first flute distance $D_1$ between the first flow face 1820 and the second flow face 1830 and a second flute 1846 of the plurality of flutes 1840 defines a second flute distance $D_2$ between the first flow face 1820 and the second flow face 1830. In some examples, the first flute distance $D_1$ is less than the second flute distance $D_2$, as currently depicted. In some other examples, the first flute distance $D_1$ is greater than the second flute distance $D_2$. In certain embodiments, the first flute distance $D_1$ and the second flute distance $D_2$ differ by greater than 2 mm. In some embodiments, the first flute distance $D_1$ differs from the second flute distance $D_2$ by at least 10 mm, at least 8 mm or even at least 15 mm. In some embodiments, the first flute distance $D_1$ differs from the second flute distance $D_2$ by 3 mm to 1020 mm, 1010 mm to 1020 mm, or 15 mm to 25 mm.

In some embodiments, a third flute 1848 of the plurality of flutes 1840 defines a third flute distance $D_3$ between the first flow face 1820 and the second flow face 1830. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above. In the current example, the third flute distance $D_3$ is greater than the first flute distance $D_1$ and the second flute distance $D_2$. In some other examples, the third flute distance $D_3$ is greater than one of the first flute distance $D_1$ and the second flute distance $D_2$, and less than the other of the first flute distance $D_1$ and the second flute distance $D_2$, as will be appreciated.

The differences in flute distances between the first flow face 1820 of the filter assembly 1800 and the second flow face 1830 of the filter assembly 1800 is also evidenced by the shapes of the flow faces relative to each other. In various embodiments, at least one of the first flow face 1820 and the second flow face 1830 is non-planar. In various embodiments, at least one of the first flow face 1820 and the second flow face 1830 is substantially planar. In examples consistent with this particular embodiment, the first flow face 1820 is non-planar and the second flow face 1830 is planar. Further, in this particular embodiment, the first flow face 1820 is configured such that it protrudes outward from the filter assembly in the z direction. The general shape of the first flow face 1820 can be considered radially symmetrical relative to the z-axis.

It will be appreciated that, in some alternative embodiments, the first flow face 1820 can be planar and the second flow face 1830 can be non-planar. In some embodiments at least one flute in the plurality of flutes 1840 defines a flute opening that is non-planar.

In examples consistent with the current embodiment, an obstruction 1849 is disposed adjacent to the fourth edge 1817 of the second sheet of filter media 1814 along the length of the second sheet of filter media 1814. As the fourth edge 1815 of the second sheet of filter media 1814 is generally planar when the filter media 1810 is in a coiled configuration, the obstruction 1849 also is generally planar when the filter media 1810 is in a coiled configuration.

Figure 14A:
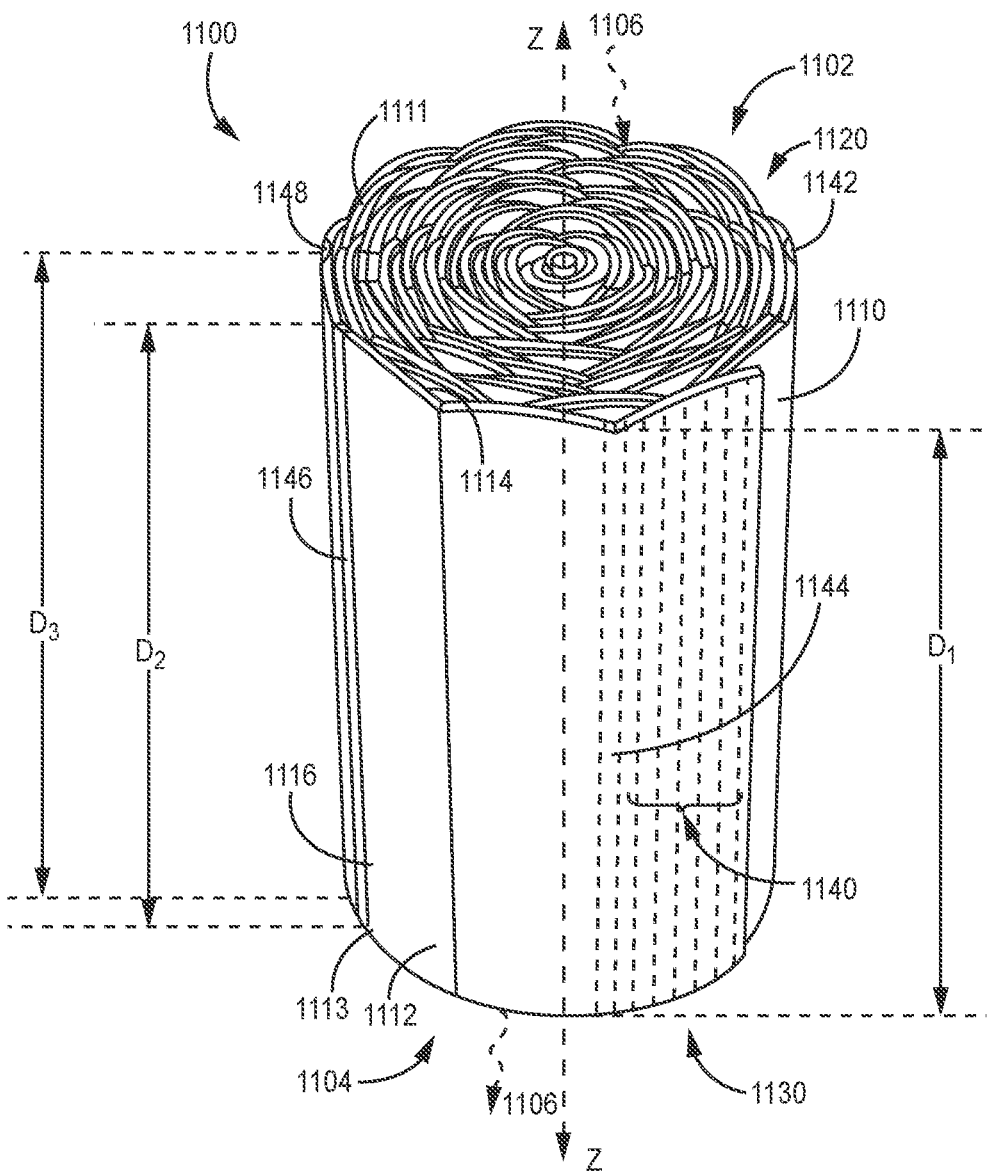
FIG. 14A is a perspective view of another example filter assembly consistent with the technology disclosed herein.
Figure 14B:
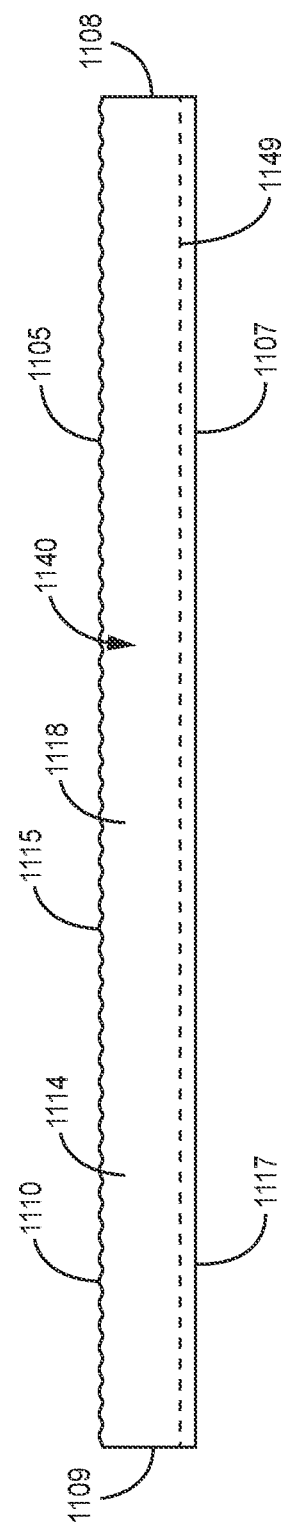
FIG. 14B is a facing view of filter media consistent with FIG. 14A.

FIG. 14A depicts yet another example filter assembly 1100 consistent with the technology disclosed herein, where the filter assembly 1100 is coiled filter media 1110, and FIG. 14B depicts a facing view of the filter media 1110 in an uncoiled arrangement. The filter assembly 1100 is constructed of filter media 1110 defining a first flow face 1120, a second flow face 1130, and a plurality of flutes 1140 extending from the first flow face 1120 to the second flow face 1130. In the current example, the first flow face 1110 is defined on a first end 1102 of the filter assembly 1100 and the second flow face 1130 is defined on a second, opposite end 1104 of the filter assembly 1100.

The filter media 1110 is a plurality of sheets of filter media, specifically a first sheet of filter media 1112 and a second sheet of filter media 1114. The second sheet of filter media 1114 is visible in FIG. 14B, which is a portion of the filter media 1110 in a planar arrangement. FIG. 14B is a facing view of the second sheet of filter media 1114. The second sheet of filter media 1114 is adjacent to the first sheet of filter media 1112. The first sheet of filter media 1112 and the second sheet of filter media 1114 mutually define the plurality of flutes 1140. The filter media 1110 can have a variety of configurations, some examples of which are described in association with FIGS. 4a-4d, and also described below.

It is noted that the totality of the flutes that would be defined in an actual implementation of this design have been omitted from FIG. 14A to simplify the drawing and provide clarity regarding the relatively complex shape of the first flow face 1120.

The filter media 1110 defines a coiled configuration about a z-axis. Accordingly, each of the first sheet of filter media 1112 and the second sheet of filter media 1114 defines a coiled configuration around the z-axis. As such, the plurality of flutes 1140 are also in a coiled configuration about the z-axis. In the current embodiment the plurality of flutes are parallel, but in some other embodiments the plurality of flutes are not parallel.

As visible in FIG. 14B, the filter media 1110 (particularly the first sheet of filter media 1112 and the second sheet of filter media 1114) are generally elongate, which enables the first sheet of filter media 1112 and the second sheet of filter media 1114 to be coiled about the z-axis to form a filter assembly. In this example, the first sheet of filter media 1112 and the second sheet of filter media 1114 are continuous or discontinuous. In embodiments where the sheets are discontinuous, the first sheet of filter media 1112 defines a first edge 1111 and a second edge 1113 (FIG. 14A), and the second sheet of filter media 1114 defines a third edge 1115 and a fourth edge 1117 (FIG. 14B). The first edge 1111 and the third edge 1115 mutually define the first flow face 1120 of the filter assembly 1100. The second edge 1113 and the fourth edge 1117 mutually define the second flow face 1130 of the filter assembly 1100. The first edge 1111 and third edge 1115 each individually forms a sine wave pattern having a constant frequency across the length of the filter media 1110. The second edge 1113 and the fourth edge 1117 each individually forms a straight line.

The filter media 1110 in examples consistent with the current embodiment has four edges: a first elongate edge 1105 (corresponding to the first edge 1111 and the third edge 1115), a second elongate edge 1107 (corresponding to the second edge 1111 and the fourth edge 1115), a first terminal edge 1108, and a second terminal edge 1109. The shape of the filter media 1110 is generally non-rectangular and non-trapezoidal at least based on the wave pattern defined by the first elongate edge, which defines a plurality of convex and concave portions.

The filter assembly 1100 is generally constructed to define a fluid pathway 1106 between the first flow face 1120 and the second flow face 1130 through the filter media 1110 such that the fluid is filtered by the filter media 1110. In particular, the plurality of flutes 1140 defines either inlet flutes, or outlet flutes, similar to as-described in FIG. 1.

Each of the plurality of flutes 1140 defines a flute opening 1142 and a flute closure (not visible). The flute opening 1142 forms an end-most portion of the fluid pathway 1106 along the flutes to accommodate fluid flow into or out of the filter assembly 1100. The flute closure obstructs fluid flow along the flute, thereby defining a portion of the fluid pathway 1106 through the filter media 1110. So, for example, a plurality of inlet flutes can define the flute opening 1142 at the first flow face 1120 and a flute closure is defined across the plurality of inlet flutes towards the second flow face 1130. In some embodiments, the flute closure is adjacent to the second flow face 1130. More particularly, the flute closure can abut the second flow face 1130. The flute closure can be similar to flute closures discussed above.

In the current embodiment, the volume defined between an outer surface 1116 of the first sheet of filter media 1112 (FIG. 14A) and an outer surface 1118 of the second sheet of filter media 1114 (FIG. 14B) when the filter media is coiled (FIG. 14A) defines a fluid pathway 1106 that is not necessarily characterized as being defined by a plurality of flutes.

An obstruction can be disposed within the coil and outside of the plurality of flutes 1140 such that fluids passing through the first flow face 1120 and second flow face 1130 of the filter assembly 1100 must first pass through the filter media 1110. Additional obstructions can also be disposed in any other gaps in the filter media to prevent fluid flow there-through, such as around the outer perimeter of the filter assembly 1100 and in a central opening of the filter assembly 1100. An obstruction can be formed through depositing an adhesive, such as a glue bead at the relevant location.

Each of the plurality of flutes 1140 defines a flute distance between the first flow face 1120 and the second flow face 1130. In the current embodiment, a first flute 1144 of the plurality of flutes 1140 defines a first flute distance $D_1$ between the first flow face 1120 and the second flow face 1130 and a second flute 1146 of the plurality of flutes 1140 defines a second flute distance $D_2$ between the first flow face 1120 and the second flow face 1130. In some examples, the first flute distance $D_1$ is less than the second flute distance $D_2$, as currently depicted. In some other examples, the first flute distance $D_1$ is greater than the second flute distance $D_2$. In certain embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 1148 of the plurality of flutes 1140 defines a third flute distance $D_3$ between the first flow face 1120 and the second flow face 1130. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above. In the current example, the third flute distance $D_3$ is greater than the first flute distance $D_1$ and the second flute distance $D_2$. In some other examples, the third flute distance $D_3$ is greater than one of the first flute distance $D_1$ and the second flute distance $D_2$, and less than the other of the first flute distance $D_1$ and the second flute distance $D_2$, as will be appreciated.

The differences in flute distances between the first flow face 1120 of the filter assembly 1100 and the second flow face 1130 of the filter assembly 1100 is also evidenced by the shapes of the flow faces relative to each other. In various embodiments, at least one of the first flow face 1120 and the second flow face 1130 is non-planar. In various embodiments, at least one of the first flow face 1120 and the second flow face 1130 is substantially planar. In examples consistent with this particular embodiment, the first flow face 1120 is non-planar and the second flow face 1130 is planar. Further, in this particular embodiment, the first flow face 1120 is configured such that the first elongate edge of the filter media 1110 undulates circumferentially about the z-axis.

It will be appreciated that, in some alternative embodiments, the first flow face 1120 can be planar and the second flow face 1130 can be non-planar. In some embodiments at least one flute in the plurality of flutes 1140 defines a flute opening that is non-planar.

In examples consistent with the current embodiment, an obstruction 1149 is disposed adjacent to the fourth edge 1117 of the second sheet of filter media 1114 along the length of the second sheet of filter media 1114. As the fourth edge 1115 of the second sheet of filter media 1114 is generally planar when the filter media 1110 is in a coiled configuration, the obstruction 1149 also is generally planar when the filter media 1110 is in a coiled configuration.

Figure 15:
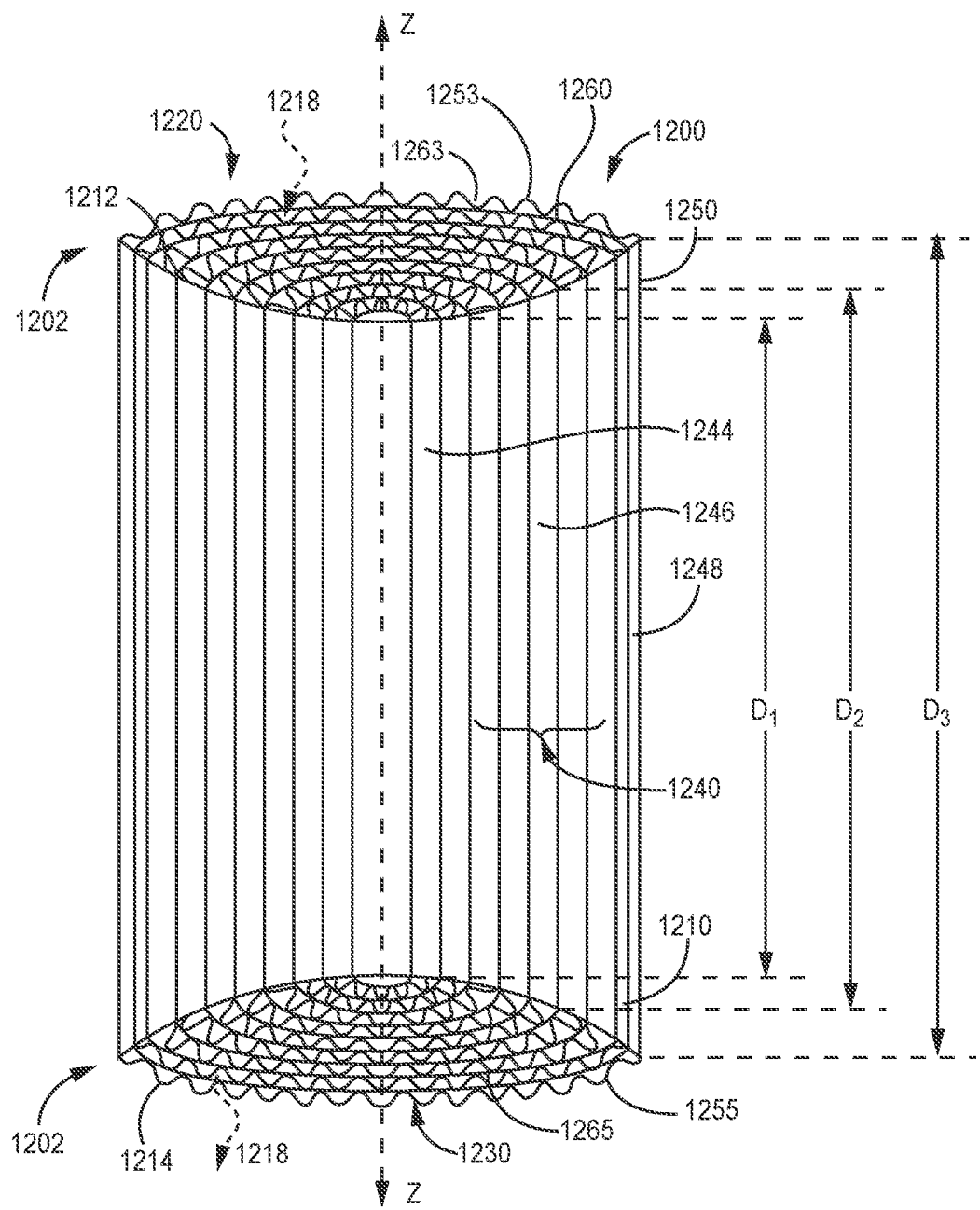
FIG. 15 is a side cut-away of a filter assembly consistent with the technology disclosed herein.

FIG. 15 depicts a side cut-away view of yet another example filter assembly 1200 consistent with the technology disclosed herein. The filter assembly 1200 is constructed of filter media 1210 having a first elongate edge 1212 defining a first flow face 1220, a second elongate edge 1214 defining a second flow face 1230, and a plurality of flutes 1240 extending from the first flow face 1220 to the second flow face 1230. In the current example, the first flow face 1220 is defined on a first end 1202 of the filter assembly 1200 and the second flow face 1230 is defined on a second, opposite end 1204 of the filter assembly 1200.

Similar to other embodiments described herein, the filter assembly 1200 is generally constructed to define a fluid pathway 1218 between the first flow face 1220 and the second flow face 1230 through the filter media 1210 such that the fluid is filtered by the filter media 1210. As such, each of the plurality of flutes 1240 defines a flute opening and a flute closure, as described with reference to previous figures. Also similar to some other embodiments, the filter assembly 1200 is constructed of filter media 1210 that is in a coiled configuration about a z-axis. The first sheet of filter media 1250 and the second sheet of filter media 1260 mutually define the plurality of flutes 1240. The filter media 1210 has a first sheet of filter media 1250 that is fluted and a second sheet of filter media 1260 that is a facing sheet adjacent to the first sheet of filter media 1250. The filter assembly 1200 of FIG. 15 can be constructed from variety of configurations of filter media 1210, examples of which are described in association with FIGS. 4a-4d, and also as-described below.

The first sheet of filter media 1250 and the second sheet of filter media 1260 are generally elongate. In this example, the first sheet of filter media 1250 and the second sheet of filter media 1260 are discontinuous. The first sheet of filter media 1250 defines a first edge 1253 and the second sheet of filter media 1260 defines a second edge 1263. The first edge 1253 and the second edge 1263 are configured to mutually define the first flow face 1220, and therefore the first elongate edge 1212, of the filter assembly 1200. The first sheet of filter media 1250 defines a third edge 1255 and the second sheet of filter media 1260 defines a fourth edge 1265. The third edge 1255 and the fourth edge 1265 are configured to mutually define the second flow face 1230, and therefore the second elongate edge 1214, of the filter assembly 1200.

Each of the first sheet of filter media 1250 and the second sheet of filter media 1260 are arranged to define a coiled configuration about the z-axis. As such, the plurality of flutes 1240 are also in a coiled configuration about the z-axis. In this example, the plurality of flutes 1240 are generally parallel.

Each of the plurality of flutes 1240 defines a flute distance between the first flow face 1220 and the second flow face 1230. In the current embodiment, a first flute 1244 of the plurality of flutes 1240 defines a first flute distance $D_1$ between the first flow face 1220 and the second flow face 1230 and a second flute 1246 of the plurality of flutes 1240 defines a second flute distance $D_2$ between the first flow face 1220 and the second flow face 1230. In the current embodiment the first flute distance $D_1$ is less than the second flute distance $D_2$, but in other embodiments the first flute distance $D_1$ is greater than the second flute distance $D_2$. In a variety of embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 1248 of the plurality of flutes 1240 defines a third flute distance $D_3$ between the first flow face 1220 and the second flow face 1230. In the current embodiment the third flute distance $D_3$ is greater than the first flute distance $D_1$ and the second flute distance $D_2$, but flute distances can have other relative relationships, as has been described above. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above.

In examples consistent with this particular embodiment, the first flow face 1220 is non-planar and the second flow face 1230 is non-planar. One or both of the first flow face and the second flow face can be cut to be a three-dimensional surface. In the current example, at least one of the first flow face 1220 and the second flow face 1230 is recessed and, as such, defines a void that projects inward relative to the filter assembly 1200. In the current example, the first flow face 1220 and the second flow face 1230 each define a depression and are each recessed. In some other embodiments, one of the first flow face 1220 and the second flow face 1230 is recessed relative to the filter assembly, and the other of the first flow face 1220 and the second flow face 1230 is planar or protrudes. In the current example, the general shape of the first flow face 1220 and the second flow face 1230 are symmetrical relative to the z-axis. In some other embodiments, the first flow face 1220 and the second flow face 1230 are asymmetrical relative to the z-axis. In some embodiments the first flow face 1220 and the second flow face 1230 have similar shapes, and in other embodiments the first flow face 1220 and the second flow face 1230 have dissimilar shapes.

Figure 16:
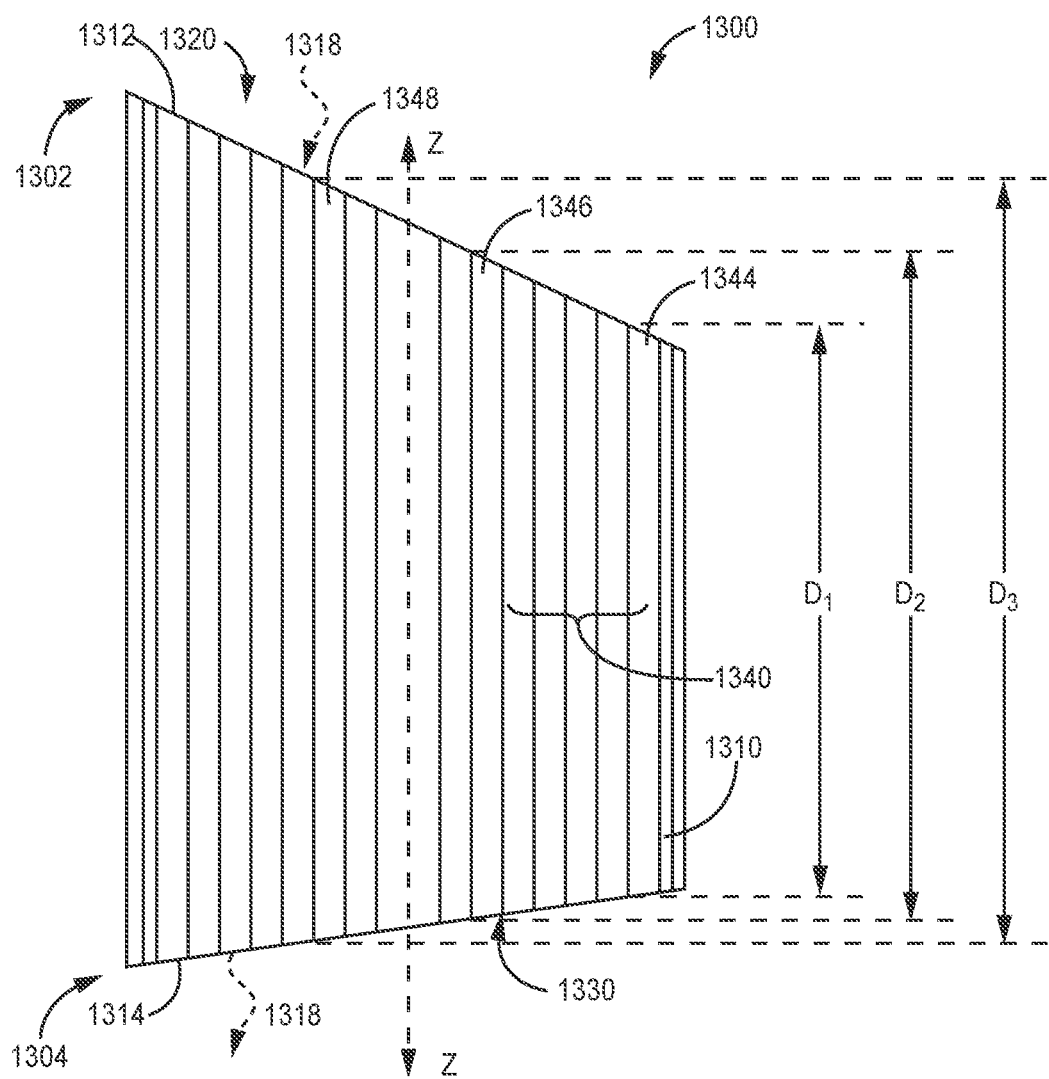
FIG. 16 is another side cut-away view of a filter assembly consistent with the technology disclosed herein.

FIG. 16 depicts a side cut-away view of yet another example filter assembly 1300 consistent with the technology disclosed herein. The filter assembly 1300 is constructed of filter media 1310 having a first elongate edge 1312 defining a first flow face 1320, a second elongate edge 1314 defining a second flow face 1330, and a plurality of flutes 1340 extending from the first flow face 1320 to the second flow face 1330. In the current example, the first flow face 1320 is defined on a first end 1302 of the filter assembly 1300 and the second flow face 1330 is defined on a second, opposite end 1304 of the filter assembly 1300.

Similar to other embodiments described herein, the filter assembly 1300 is generally constructed to define a fluid pathway 1318 between the first flow face 1320 and the second flow face 1330 through the filter media 1310 such that the fluid is filtered by the filter media 1310. As such, each of the plurality of flutes 1340 defines a flute opening and a flute closure, as described with reference to previous figures. Also similar to some other embodiments, the filter assembly 1300 is constructed of filter media 1310 that is in a coiled configuration about a z-axis. The filter media 1310 has a first sheet of filter media that is fluted and a second sheet of filter media adjacent to the first sheet of filter media (not currently distinguishable from this view). The first sheet of filter media and the second sheet of filter media mutually define the plurality of flutes. The filter assembly 1300 of FIG. 16 can be constructed from variety of alternate configurations of filter media 1310, examples of which are described in association with FIGS. 4a-4d, and also as described below.

Each of the first sheet of filter media and the second sheet of filter media are arranged to define a coiled configuration about the z-axis. As such, the plurality of flutes are also in a coiled configuration about the z-axis. In this example, the plurality of flutes 1340 are generally parallel.

Each of the plurality of flutes 1340 defines a flute distance between the first flow face 1320 and the second flow face 1330. In the current embodiment, a first flute 1344 of the plurality of flutes 1340 defines a first flute distance $D_1$ between the first flow face 1320 and the second flow face 1330 and a second flute 1346 of the plurality of flutes 1340 defines a second flute distance $D_2$ between the first flow face 1320 and the second flow face 1330. In the current embodiment the first flute distance $D_1$ is less than the second flute distance $D_2$, but in other embodiments the first flute distance $D_1$ is greater than the second flute distance $D_2$. In a variety of embodiments, the first flute distance $D_1$ and the second flute distance $D_2$ differ by greater than 13 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 1348 of the plurality of flutes 1340 defines a third flute distance $D_3$ between the first flow face 1320 and the second flow face 1330. In the current embodiment the third flute distance $D_3$ is greater than the first flute distance $D_1$ and the second flute distance $D_2$, but flute distances can have other relative relationships, as has been described above. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above.

In various embodiments, at least one of the first flow face 1320 and the second flow face 1330 is planar. In examples consistent with this particular embodiment, the first flow face 1320 is planar and the second flow face 1330 is planar, and the first flow face 1320 is non-parallel and non-perpendicular to the second flow face 1330. Unlike the example of FIG. 3, here each of the flow faces are not perpendicular to the flutes.

Figure 17:
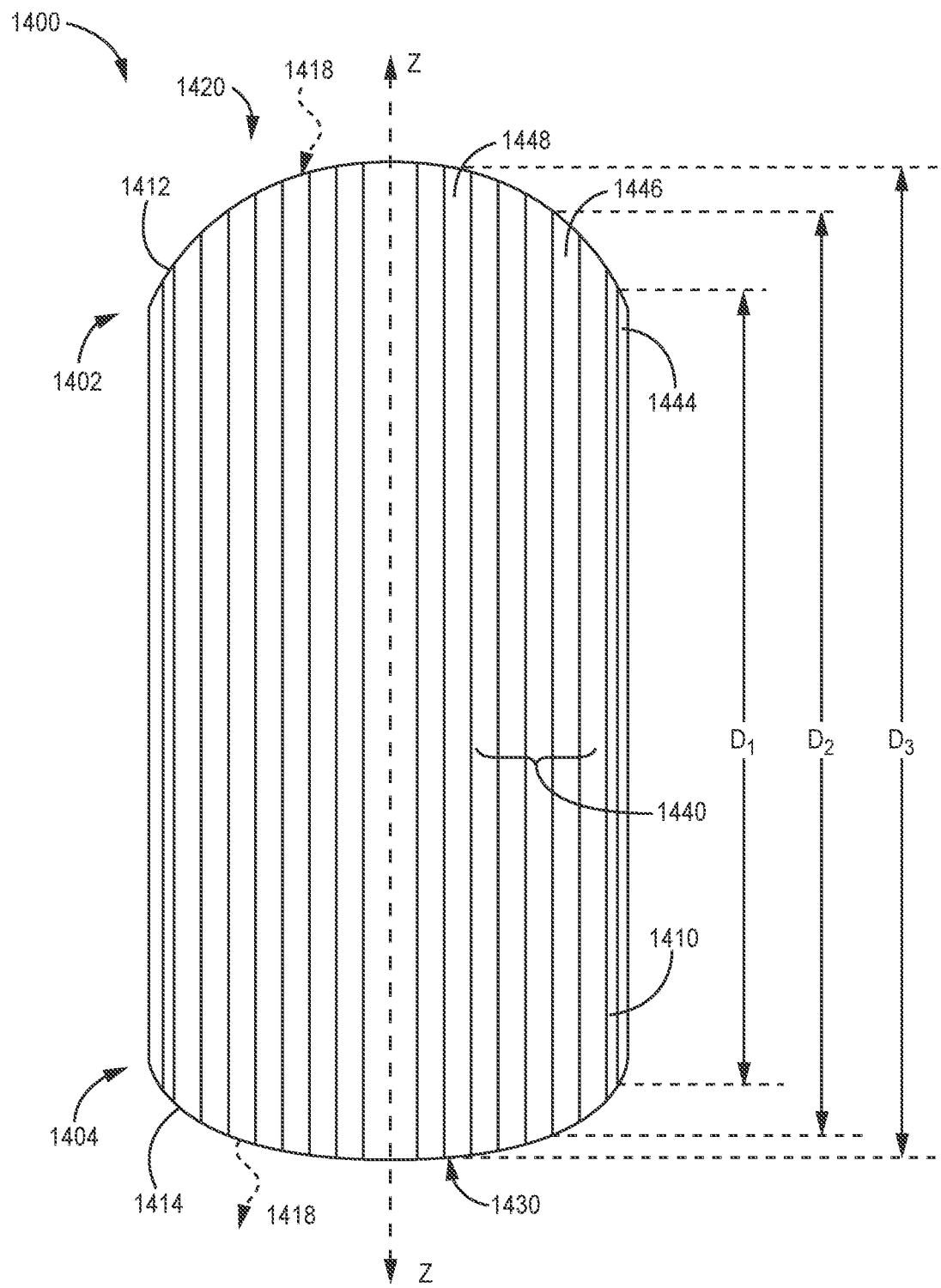
FIG. 17 is another side cut-away view of a filter assembly consistent with the technology disclosed herein.

FIG. 17 depicts a side cut-away view of yet another example filter assembly 1400 consistent with the technology disclosed herein. The filter assembly 1400 is constructed of filter media 1410 having a first elongate edge 1412 defining a first flow face 1420, a second elongate edge 1414 defining a second flow face 1430, and a plurality of flutes 1440 extending from the first flow face 1420 to the second flow face 1430. In the current example, the first flow face 1420 is defined on a first end 1402 of the filter assembly 1400 and the second flow face 1430 is defined on a second, opposite end 1404 of the filter assembly 1400.

Similar to other embodiments described herein, the filter assembly 1400 is generally constructed to define a fluid pathway 1418 between the first flow face 1420 and the second flow face 1430 through the filter media 1410 such that the fluid is filtered by the filter media 1410. As such, each of the plurality of flutes 1440 defines a flute opening and a flute closure, as described with reference to previous figures. Also similar to some other embodiments, the filter assembly 1400 is constructed of filter media 1410 that is in a coiled configuration about a z-axis. The filter media 1410 has a first sheet of filter media that is fluted and a second sheet of filter media adjacent to the first sheet of filter media (not discernable in this view). The first sheet of filter media and the second sheet of filter media can be consistent with examples described in association with FIGS. 4a-4d, and also examples as-described below.

Each of the first sheet of filter media and the second sheet of filter media are arranged to define a coiled configuration about the z-axis. As such, the plurality of flutes 1440 are also in a coiled configuration about the z-axis. In this example, the plurality of flutes 1440 are generally parallel.

Each of the plurality of flutes 1440 defines a flute distance between the first flow face 1420 and the second flow face 1430. In the current embodiment, a first flute 1444 of the plurality of flutes 1440 defines a first flute distance $D_1$ between the first flow face 1420 and the second flow face 1430 and a second flute 1446 of the plurality of flutes 1440 defines a second flute distance $D_2$ between the first flow face 1420 and the second flow face 1430. In the current embodiment the first flute distance $D_1$ is less than the second flute distance $D_2$, but in other embodiments the first flute distance $D_1$ is greater than the second flute distance $D_2$. In a variety of embodiments, the first flute distance $D_1$ and the second flute distance $D_2$ differ by greater than 2 mm. In some embodiments, the first flute distance $D_1$ differs from the second flute distance $D_2$ by at least 5 mm, at least 8 mm or even at least 15 mm. In some embodiments, the first flute distance $D_1$ differs from the second flute distance $D_2$ by 3 mm to 20 mm, 10 mm to 20 mm, or 15 mm to 25 mm.

In some embodiments, a third flute 1448 of the plurality of flutes 1440 defines a third flute distance $D_3$ between the first flow face 1420 and the second flow face 1430. In the current embodiment the third flute distance $D_3$ is greater than the first flute distance $D_1$ and the second flute distance $D_2$, but flute distances can have other relative relationships, as has been described above. The third flute distance $D_3$ will generally differ from at least one of the first flute distance $D_1$ and the second flute distance $D_2$ by greater than 2 mm. In some embodiments the third flute distance $D_3$ differs from both the first flute distance $D_1$ and the second flute distance $D_2$ by greater than 2 mm. The third flute distance $D_3$ can differ from one or both the first flute distance $D_1$ and the second flute distance $D_2$ by similar ranges described above.

In examples consistent with this particular embodiment, the first flow face 1420 is non-planar and the second flow face 1430 is non-planar. One or both of the first flow face and the second flow face can be cut to be a three-dimensional surface. In the current example, at least one of the first flow face 1420 and the second flow face 1430 protrudes relative to the filter assembly 1400. In the current example, the first flow face 1420 and the second flow face 1430 each protrude outward from the filter assembly 1400 in the z-direction. In some alternate embodiments, at least one of the first flow face 1420 and the second flow face 1430 protrudes outward and the other of the first flow face 1420 and the second flow face 1430 is recessed or is planar.

Additional Media Configurations

The filter assemblies described herein can be constructed of filter media having a variety of different configurations, including those already depicted herein. Various embodiments, including in any of the example filter assemblies disclosed herein, can incorporate filter media constructed of a fluted sheet and a facing sheet adjacent to the fluted sheet, where a plurality of flutes is defined that extend between the fluted sheet and facing sheet. In some of those embodiments, the fluted sheet defines a plurality of protrusions that contact the facing sheet. Example filter medias are described, for example, in U.S. Pat. No. 9,623,362, which is incorporated by reference herein.

Also, in some of those embodiments, the fluted sheet defines a ridge along at least a portion of the length of a portion of the flutes, where a ridge is a line of intersection between differently-sloped portions of media forming the particular flute. Also, in some of those embodiments, at least a portion of the flutes can define flute peaks that are sharp, meaning the flute peak is not curved. Also, in some of those embodiments, at least a portion of the flutes can be tapered from a first flow face of the media assembly to the second flow face of the media assembly. The above and other flute configuration are certainly contemplated, such as disclosed in U.S. Pat. Nos. 7,959,702 and 8,545,589, which are each incorporated by reference herein.

Filter assemblies constructed of fluted media consistent with the technology disclosed herein can incorporate different types of filter media arranged in parallel or in a series, where "different types of filter media" is used to mean that the filter media is constructed of different materials, or has flutes that exhibit differences in flute shape, flute size, flute height, flute width, flute length, cross-flute area, and/or filter media. Such configurations are described in PCT Pub. No. WO 2008/111923 and U.S. Pat. App. No. 62/683,542, which are incorporated herein by reference.

In some embodiments, where the filter media is constructed of a fluted sheet and a facing sheet that mutually defines a plurality of flutes, the plurality of flutes has at least a first group of flutes and a second group of flutes, where the first and second group of flutes exhibit differences in flute shape, flute size, flute height, flute width, flute length, cross-flute area, and/or filter media.

Figure 18:
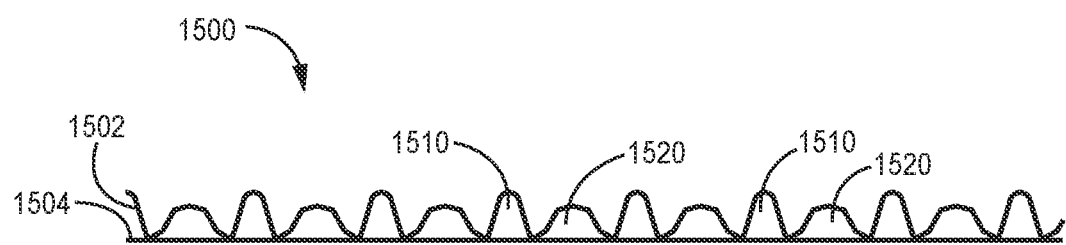
FIG. 18 is a cross-sectional view of filter media consistent with various embodiments.

FIG. 18 depicts a cross-sectional view of an example filter media 1500 consistent with various embodiments. A first sheet of filter media 1502 and a second sheet of filter media 1504 mutually define a plurality of flutes 1506. The filter assembly 1500 has two types of flutes: first flutes 1510, and second flutes 1520. The first flutes 1510 and second flutes 1520 are arranged in parallel flow. The filter media 1500 can be used to form coiled filter assemblies (as has been described), or the filter media 1500 can be stacked with similar or different filter media to form panel filter assemblies consistent with embodiments herein. In example constructions having two types of flutes, as currently depicted, the first and second flutes can be selected such that the first plurality of flutes comprises 20 to 50 percent of the volume of the filter assembly, such as 20, 30, 40, or 50 percent the volume of filter assembly; the second 20 plurality of flutes comprises 20 to 50 percent the volume of the pack, such as 20, 30, 40 or 50 percent of the volume of filter assembly.

In an example construction having two types of flutes, the first and second flutes can be selected such that the first plurality of flutes comprises 20 to 50 percent of the media surface area of the filter assembly, such as 20, 30, 40, or 50 percent of the media surface area of the filter assembly; and the second plurality of flutes comprises 20 to 50 percent of the media surface area of the filter assembly, such as 20, 30, 40 or 50 percent of the media surface area of the filter assembly.

In an example construction having two types of flutes, the first and second flutes can be selected such that the first plurality of flutes comprises 20 to 50 percent of the inlet face of the filter assembly, such as 20, 30, 40, or 50 percent of the inlet face of the filter assembly; and the second plurality of flutes comprises 20 to 50 percent of the inlet face of the filter assembly, such as 20, 30, 40 or 50 percent of the inlet face of the filter assembly.

While FIG. 18 depicts two different types of flutes, other embodiments can have additional different types of flutes incorporated in the filter media.

Figure 19:
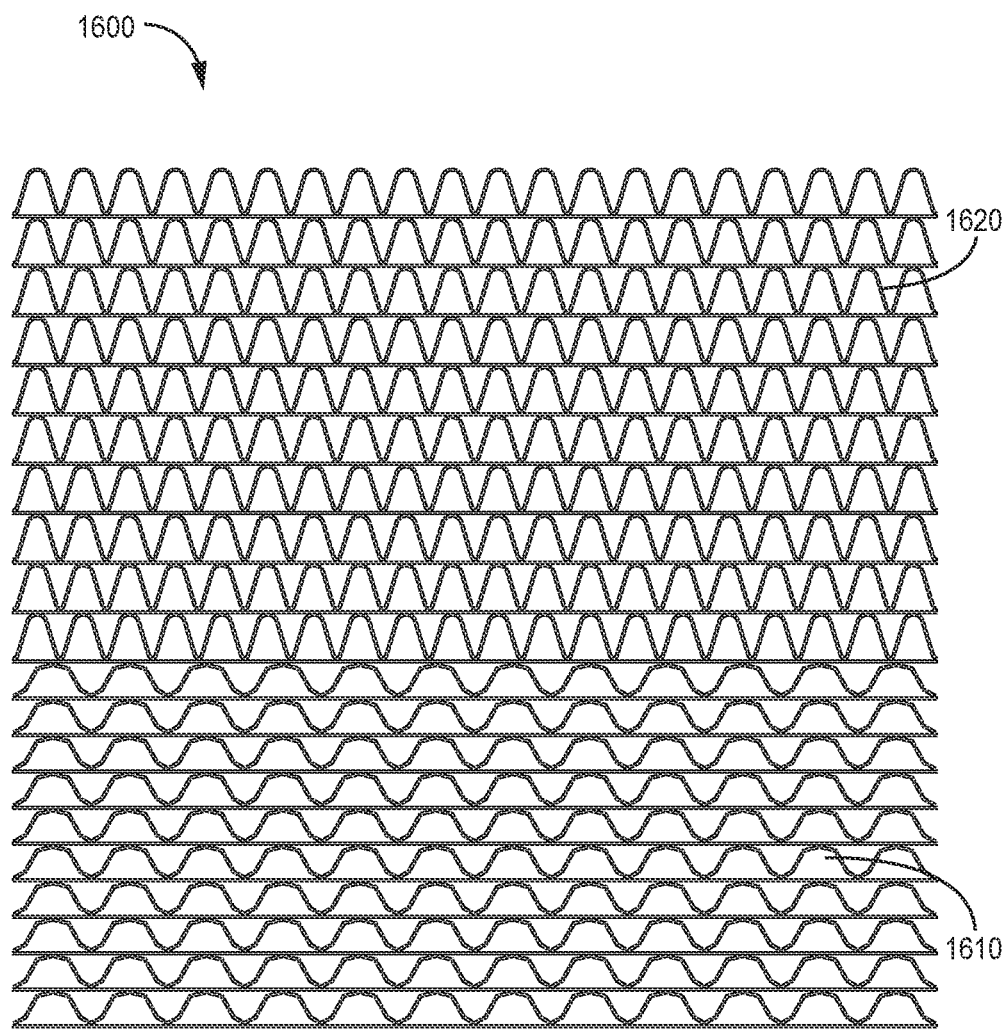
FIG. 19 is a facing schematic view of a flow face of an example filter assembly consistent with the technology disclosed herein.

Filter assemblies having a stacked configuration as described herein can be constructed of multiple different types of filter media in the stack. FIG. 19 is a facing schematic view of an example filter assembly 1600, showing a stacked configuration with two types of filter media. The two types of filter media are first media 1610 and a second media 1620. The filter media are arranged in a series. The media is shown in a stacked configuration with the two types of filter media being segregated by media type rather than intermixed. In this example embodiment the ratio of filter media 1610 to 820 to 830 is approximately 4:3, based upon filter assembly inlet (or outlet) area.

Figure 20:
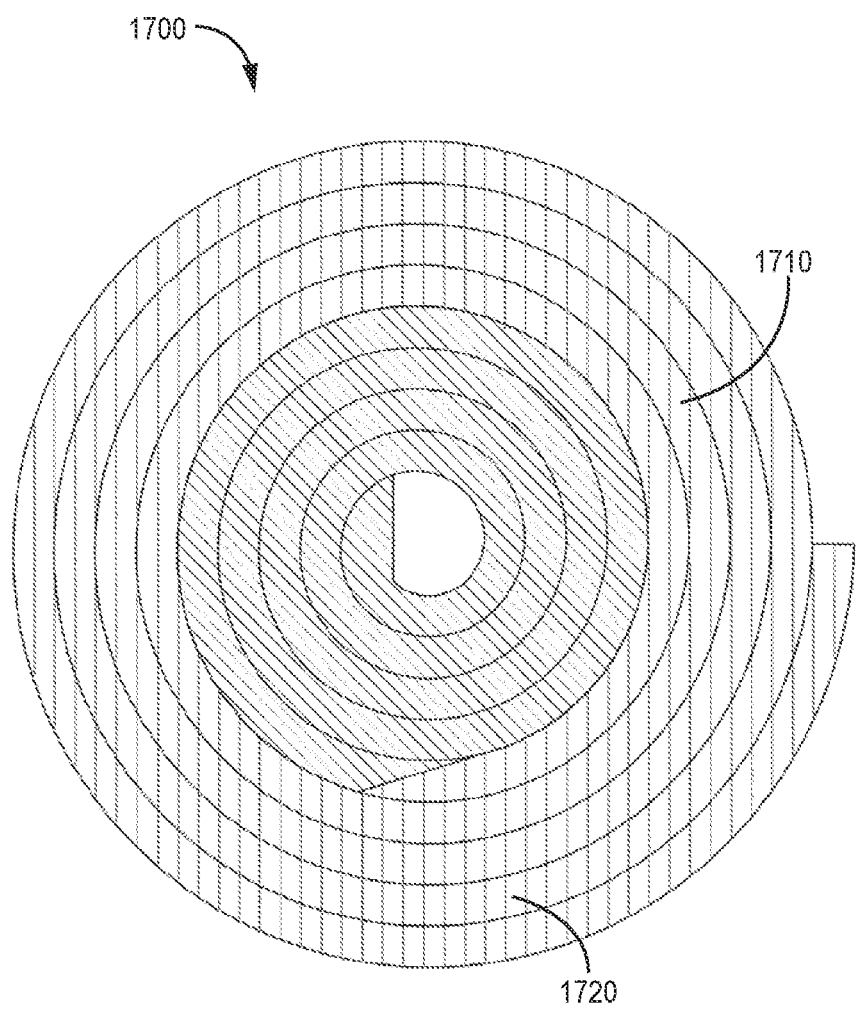
FIG. 20 is a cross-sectional schematic view of a filter assembly consistent with the technology disclosed herein.

In some implementations the first media (having a first plurality of flutes) defines from 10 to 90 percent of the inlet face of the media assembly, such as 10, 20, 30, 40, 50, 60, 70, 80 or 90 percent of the inlet face of the filter assembly; and the second filter assembly (having a second plurality of flutes) defines from 90 to 10 percent of the inlet face of the media assembly, such as 90, 80, 70, 60, 50, 40, 30, 20 or 10 percent of the inlet face of the media assembly. Alternatively, the first plurality of flutes comprises from 20 to 40 percent of the inlet face of the media assembly, and the second plurality of flutes comprises from 60 to 80 percent of the inlet face of the media assembly. In other implementations the first plurality of flutes comprises from 40 to 60 percent of the inlet face of the media assembly, and the second plurality of flutes comprises from 60 to 40 percent of the inlet face of the media assembly. In yet another implementation the first plurality of flutes comprises from 60 to 90 percent of the inlet face of the media assembly, and the second plurality of flutes comprises from 40 to 10 percent of the inlet face of the media assembly. Media assemblies having a coiled media arrangement consistent with the present disclosure can also be constructed of multiple types of filter media arranged in a series. FIG. 20 is a schematic cross-sectional view of an example filter assembly 1700, showing a wound configuration with two types of filter media 1710 and 1720. The media is coiled with the first media 1710 on the inside and the second media 1720 on the outside. The first and second medias 1710, 1720 are spliced together. While the flutes are not currently depicted, it should be understood that each of the first and second media is generally fluted media. The first 1710 and second 1720 medias can have ratios and parameters consistent with that described above with reference to FIG. 19.

It should also be noted that, as used in this specification and the appended claims, the phrase "configured" describes a system, apparatus, or other structure that is constructed to perform a particular task or adopt a particular structure. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

I claim:

1. A filter assembly comprising:
a first sheet of filter media and a second sheet of filter media mutually defining a first plurality of flutes, a first flow face on a first end of the filter assembly, and a second flow face on an opposite, second end of the filter assembly,
wherein each of the first plurality of flutes defines a distance from the first flow face to the second flow face and each of the first plurality of flutes defines a flute opening at the first flow face and a flute closure towards the second flow face, where a first flute of the first plurality of flutes defines a first flute distance and a second flute of the first plurality of flutes defines a second flute distance, wherein the first flute distance and the second flute distance differ by greater than 2 mm, and wherein the first sheet of filter media and the second sheet of filter media are continuous and separated by a fold.

2. The filter assembly of claim 1, wherein the flute closure is adjacent to the second flow face.

3. The filter assembly of claim 1, further comprising a third sheet of filter media, wherein the third sheet of filter media and the second sheet of filter media mutually define a second plurality of flutes, the first flow face, and the second flow face, wherein each of the second plurality of flutes extends from the first flow face to the second flow face and each of the second plurality of flutes defines a flute opening at the second flow face and a flute closure towards the first flow face.

4. The filter assembly of claim 3, wherein the second plurality of flutes comprises a third flute defining a third flute distance from the first flow face to the second flow face, wherein the third flute distance differs from the first flute distance and the second flute distance by greater than 2 mm.

5. The filter assembly of claim 1, wherein the first plurality of flutes comprises a third flute defining a third flute distance, wherein the third flute distance differs from the first flute distance and the second flute distance by greater than 2 mm.

6. The filter assembly of claim 1, wherein the first flute distance differs from the second flute distance by at least 8 mm.

7. The filter assembly of claim 1, wherein at least one of the first flow face and the second flow face is non-planar.

8. The filter assembly of claim 1, wherein at least one of the first flow face and the second flow face is recessed.

9. The filter assembly of claim 1, wherein the first flow face and the second flow face are both non-planar.

10. The filter assembly of claim 1, wherein both the first sheet and the second sheet are fluted sheets of filter media.

11. A panel filter assembly comprising:
a plurality of sheets of filter media in a stacked configuration mutually defining a first flow face, a second flow face, and a plurality of flutes extending from the first flow face to the second flow face, wherein:
the plurality of sheets of filter media defines a regularly alternating pattern of first flute layers and second flute layers, where each of the first layers defines a first layer distance between the first flow face and the second flow face and each of the second layers defines a second layer distance between the first flow face and the second flow face, and
the first layer distance and the second layer distance differ by greater than 2 mm.

12. The panel filter assembly of claim 11, wherein each of the plurality of flutes defines a flute opening and a flute closure.

13. The panel filter assembly of claim 11, wherein each of the first layers and second layers is defined by a fluted sheet and an adjacent facing sheet.

14. The panel filter assembly of claim 13, wherein each fluted sheet and facing sheet in each flute layer defines substantially equal distances between the first flow face and the second flow face.

15. The panel filter assembly of claim 13, wherein each fluted sheet and facing sheet in at least one flute layer defines distances between the first flow face and the second flow face that differ by greater than 2 mm.

16. The panel filter assembly of claim 11, wherein each of the first layers and second layers is defined by two adjacent fluted sheets of filter media.

17. The panel filter assembly of claim 11, wherein the plurality of sheets of filter media are discontinuous.

18. The panel filter assembly of claim 11, wherein the plurality of sheets of filter media are continuous and separated by a first set of folds forming the first flow face and a second set of folds forming the second flow face.

19. The panel filter assembly of claim 11, wherein the plurality of sheets of filter media further defines a regularly alternating pattern of third flute layers, where each third flute layer has a third layer distance between the first flow face and the second flow face, wherein the third layer distance differs from the first layer distance and the second layer distance by greater than 2 mm.

20. The panel filter assembly of claim 19, wherein the plurality of sheets of filter media further defines a regularly alternating pattern of fourth flute layers, where each fourth flute layer has a fourth layer distance between the first flow face and the second flow face, wherein the fourth layer distance differs from the first layer distance, the second layer distance, and the third layer distance by greater than 2 mm.

21. A panel filter assembly comprising:
a plurality of stacked sheets of filter media each having a width extending in a direction parallel to an x-axis and a length extending in a direction parallel to a z-axis, wherein:
the plurality of sheets of filter media are stacked in a direction parallel to a y-axis,
the plurality of sheets of filter media define a plurality of flutes, a first flow face, and a second flow face,
each of the plurality of flutes defines a flute opening at the first flow face and a flute closure towards the second flow face,
a first flute of the plurality of flutes defines a first flute distance between the first flow face and the second flow face, a second flute of the plurality of flutes defines a second flute distance between the first flow face and the second flow face, and a third flute of the plurality of flutes defines a third flute distance between the first flow face and the second flow face, the second flute is adjacent the first flute in an x-axis direction, and the third flute is positioned relative to the first flute in a y-axis direction, and
the first flute distance differs from the second flute distance by greater than 2 mm and the first flute distance differs from the third flute distance by greater than 2 mm.

22. A filter assembly comprising:
a first sheet of filter media and a second sheet of filter media mutually defining a first plurality of flutes, a first flow face on a first end of the filter assembly, and a second flow face on an opposite, second end of the filter assembly, wherein each of the first plurality of flutes defines a distance from the first flow face to the second flow face and each of the first plurality of flutes defines a flute opening at the first flow face and a flute closure towards the second flow face, where a first flute of the first plurality of flutes defines a first flute distance and a second flute of the first plurality of flutes defines a second flute distance, wherein the first flute distance and the second flute distance differ by greater than 2 mm; and a third sheet of filter media, wherein the third sheet of filter media and the second sheet of filter media mutually define a second plurality of flutes, the first flow face, and the second flow face, wherein each of the second plurality of flutes extends from the first flow face to the second flow face and each of the second plurality of flutes defines a flute opening at the second flow face and a flute closure towards the first flow face.

23. A filter assembly comprising:

a first sheet of filter media and a second sheet of filter media mutually defining a first plurality of flutes, a first flow face on a first end of the filter assembly, and a second flow face on an opposite, second end of the filter assembly, wherein each of the first plurality of flutes defines a distance from the first flow face to the second flow face and each of the first plurality of flutes defines a flute opening at the first flow face and a flute closure towards the second flow face, where a first flute of the first plurality of flutes defines a first flute distance and a second flute of the first plurality of flutes defines a second flute distance, wherein the first flute distance and the second flute distance differ by greater than 2 mm, wherein both the first sheet and the second sheet are fluted sheets of filter media.

* * * * *